(12) United States Patent
Ryu

(10) Patent No.: US 12,084,890 B2
(45) Date of Patent: Sep. 10, 2024

(54) DEVICE FOR SUPPLYING EMERGENCY POWER TO DIGITAL DOOR LOCK, AND METHOD FOR DRIVING SAME

(71) Applicant: Dae Young Ryu, Incheon (KR)

(72) Inventor: Dae Young Ryu, Incheon (KR)

( * ) Notice: Subject to any disclaimer, the term of this patent is extended or adjusted under 35 U.S.C. 154(b) by 500 days.

(21) Appl. No.: 17/617,222

(22) PCT Filed: Dec. 11, 2019

(86) PCT No.: PCT/KR2019/017424
§ 371 (c)(1),
(2) Date: Dec. 7, 2021

(87) PCT Pub. No.: WO2021/117923
PCT Pub. Date: Jun. 17, 2021

(65) Prior Publication Data
US 2022/0235578 A1    Jul. 28, 2022

(51) Int. Cl.
*E05B 47/00*    (2006.01)
*E05B 15/10*    (2006.01)
*H02J 7/00*    (2006.01)

(52) U.S. Cl.
CPC ............. *E05B 47/00* (2013.01); *E05B 15/10* (2013.01); *H02J 7/00* (2013.01); *E05B 2047/0058* (2013.01); *E05Y 2900/132* (2013.01)

(58) Field of Classification Search
CPC .. E05B 47/00; E05B 15/10; E05B 2047/0058; E05B 2047/0087; H02J 7/0024; E05Y 2900/132
USPC .......................................................... 320/117
See application file for complete search history.

(56) References Cited

U.S. PATENT DOCUMENTS

| | | | |
|---|---|---|---|
| 9,725,925 B1* | 8/2017 | Shen | E05B 47/0001 |
| 10,024,081 B2* | 7/2018 | Li | E05B 49/00 |
| 10,106,110 B1* | 10/2018 | Ganiere | B60R 16/03 |
| 10,208,508 B2* | 2/2019 | Tien | G07C 9/00563 |
| 10,597,904 B2* | 3/2020 | Hintz | A47L 15/4259 |
| 10,994,632 B2* | 5/2021 | Kahnt | B60L 50/64 |

FOREIGN PATENT DOCUMENTS

| | | | |
|---|---|---|---|
| JP | 05-038064 A | | 2/1993 |
| KR | 20-0327491 Y1 | | 9/2003 |
| KR | 10-2009-0058188 A | | 6/2009 |
| KR | 20-2017-0000948 U | | 3/2017 |
| KR | 10-2018-0067011 A | | 6/2018 |
| KR | 2019001526 | * | 6/2019 |

* cited by examiner

*Primary Examiner* — Richard V Muralidar
(74) *Attorney, Agent, or Firm* — NKL Law; Jae Youn Kim

(57) ABSTRACT

Proposed is a device for supplying emergency power to a digital door lock, which supplies emergency power by switching a connection method of a battery holder provided in the digital door lock from parallel to series or series to parallel by rotating a door lock opening/closing means.

20 Claims, 39 Drawing Sheets

DEVICE FOR SUPPLYING EMERGENCY POWER TO DIGITAL DOOR LOCK, AND METHOD FOR DRIVING SAME

TECHNICAL FIELD

The present invention switches the connection of the battery holders provided inside the digital door lock from parallel to series or from series to parallel by rotating the door lock opening/closing means or turning the emergency switch on/off.

Specifically, when the battery inside the digital door lock device is discharged all, the remaining battery level provided inside the battery holder is used after the connection of the battery holder is temporarily switched from series to parallel or parallel to series. Then temporarily activate the digital door lock.

BACKGROUND ART

A digital door lock refers to a high-tech locking device that uses digitized information such as passwords, semiconductor chips, smart cards, and fingerprints as keys.
The digital door lock provides high convenience in that it does not need to carry a separate key, and is gradually becoming a popular locking device.

In addition, in recent years, the convenience of digital door locks has been improved by fusion with fingerprint recognition technology and Internet of Things (IOT) technology.
The digital door lock is mainly driven by the power of the battery inserted therein.
Therefore, the battery must be periodically replaced so that the battery inserted in the digital door lock do not discharge all.

If the battery provided inside the digital door lock is not replaced and discharged all, the digital door lock cannot be driven, so that the lock device cannot be released and the front door cannot be accessed.

In order to solve this problem, a product that exposes terminals so that power can be supplied by contacting a battery of 9 volts (V. Volt) to the outside of the digital door lock has been released.

Therefore, it was possible to drive the digital door lock by receiving power from the outside when the battery of the digital door lock discharged all.

However, there is a problem in that the digital door lock that exposes the terminal to the outside is vulnerable to a new criminal method of unauthorized opening the digital door lock through an electric shock.

DETAILED DESCRIPTION OF THE INVENTION

Technical Problem

The present invention has been proposed to solve the above problems.

When rotating and/or moving the door lock opening/closing means upward to the digital door lock, the connection of the battery provided inside the digital door lock is changed, and the remaining battery level provided inside the battery holder is used to driving a digital door lock to improve convenience.

With the movement of the emergency switch provided outside the digital door lock, the connection of the battery provided inside the digital door lock is changed, and the remaining battery level provided inside the battery holder is used to driving the digital door lock to improve convenience.

The present invention is tough against crimes that do not expose the terminals to the outside and apply an electric shock to the external terminals.
By not providing any terminals on the outer surface, the digital door lock can be provided with a beautiful appearance as it is.

After consuming all the remaining battery power, the present invention can produce and supply electricity by itself through its own power generation means.
The present invention operates by supplying emergency power even with a single battery inserted in the external battery insertion holder.

Technical Solution

In order to achieve the above object, a emergency power supply for digital door lock comprising: a first battery holder capable of accommodating one or more batteries; a second battery holder capable of accommodating one or more batteries; a motor driving module connected to the other end of the first battery holder and one end of the second battery holder; a first changeover switch provided between one end of the first battery holder and the other end of the motor driving module; a second changeover switch provided between the other end of the second battery holder and one end of the motor driving module. According to the operation of the first changeover switch and the second changeover switch, connection between the first battery holder and the second battery holder is switched from parallel to series or series to parallel.

In this emergency power supply for digital door lock, the present invention further comprising a door lock opening/closing means for changing a connection of the first changeover switch and the second changeover switch.

In this emergency power supply for digital door lock, the door lock opening and closing means include the form of a handle and/or a doorknob as opening and closing means for opening and closing a door. The operation of the first changeover switch and the second changeover switch is switched according to the rotation and/or movement of the door lock opening/closing means.

In this emergency power supply for digital door lock, the first changeover switch and the second changeover switch operate by any of push non-locking, push lock, tact, and selector. When the door lock opening/closing means is rotated and/or moved upward, the electric contacts of the first changeover switch and the second changeover switch are switched, and the connection between the first battery holder and the second battery holder is switched.

In this emergency power supply for digital door lock, the first changeover switch comprises a first common terminal connected to one end of the first battery holder; a first output terminal connected to one end of the second battery holder and the other end of the motor drive module; a second output terminal. The second changeover switch comprises a second common terminal connected to the other end of the second battery holder; a third output terminal connected to the other end of the first battery holder and one end of the motor drive module; a fourth output terminal. In this emergency power supply for digital door lock, the second output terminal of the first switching switch and the fourth output terminal of the second switching switch are connected to each other.

In this emergency power supply for digital door lock, when the door lock opening/closing means is rotated or moved upward, the first common terminal of the first changeover switch is switched from the second output terminal to the first output terminal and connected, the second common terminal of the second changeover switch is switched from the fourth output terminal to the third output terminal.

In this emergency power supply for digital door lock, when the door lock opening/closing means is rotated or moved upward, the first common terminal of the first changeover switch is switched from the first output terminal to the second output terminal and connected, and the second common terminal of the second changeover switch is switched from the third output terminal to the fourth output terminal.

In this emergency power supply for digital door lock, the motor drive module includes a stepping motor that opens and closes the door lock device; a target voltage regulation circuit unit that adjusts the voltage applied from the first battery holder and the second battery holder to a predetermined voltage and supplies the voltage to the stepping motor.

In this emergency power supply for digital door lock, the predetermined voltage is 3 volts and/or 6 volts.

In this emergency power supply for digital door lock, the number of 1.5 volt batteries provided in the first battery holder is four, and the number of 1.5 volt batteries provided in the second battery holder is four.

In this emergency power supply for digital door lock, the number of 1.5 volt batteries provided in the first battery holder is two, and the number of 1.5 volt batteries provided in the second battery holder is two.

In this emergency power supply for digital door lock, the number of 1.5 volt batteries provided in the first battery holder is one, and the number of 1.5 volt batteries provided in the second battery holder is one.

In this emergency power supply for digital door lock, the first common terminal of the first changeover switch is switched from the second output terminal to the first output terminal, and the second common terminal of the second changeover switch is switched from the fourth output terminal to the third output terminal. Then, the connection switches from series to parallel.

In this emergency power supply for digital door lock, the first common terminal of the first changeover switch is switched from the first output terminal to the second output terminal, and the second common terminal of the second changeover switch is switched from the third output terminal to the fourth output terminal. Then, the connection switches from parallel to series.

In this emergency power supply for digital door lock, the first common terminal of the first changeover switch is connected by switching from the second output terminal to the first output terminal, and the second common terminal of the second changeover switch is switched from the fourth output terminal to the third output terminal. Then, the connection of batteries switches from series to parallel. This step is then performed when the door lock opening/closing means rotates and/or moves upward.

In this emergency power supply for digital door lock, the first common terminal of the first changeover switch is connected by switching from the first output terminal to the second output terminal, and the second common terminal of the second changeover switch is switched from the third output terminal to the fourth output terminal. Then, the connection of batteries switches from parallel to series. This step is then performed when the door lock opening/closing means rotates and/or moves upward.

In this emergency power supply for digital door lock, the first common terminal of the first changeover switch is connected by switching from the second output terminal to the first output terminal, and the second common terminal of the second changeover switch is switched from the fourth output terminal to the third output terminal. Then, the connection of batteries switches from series to parallel. After that, electric power is applied to the motor drive module from the first output terminal of the first changeover switch and the third output terminal of the second changeover switch.

In this emergency power supply for digital door lock, the first common terminal of the first changeover switch is connected by switching from the first output terminal to the second output terminal, and the second common terminal of the second changeover switch is switched from the third output terminal to the fourth output terminal. Then, the connection of batteries switches from parallel to series. After that, electric power is applied to the motor drive module from the second output terminal of the first changeover switch and the fourth output terminal of the second changeover switch.

In this emergency power supply for digital door lock, after power is applied to the motor drive module from the first output terminal of the first changeover switch and the third output terminal of the second changeover switch, the voltage becomes a predetermined voltage by the target voltage regulation circuit unit of the motor drive module.

In this emergency power supply for digital door lock, after power is applied to the motor drive module from the second output terminal of the first changeover switch and the fourth output terminal of the second changeover switch, the voltage becomes a predetermined voltage by the target voltage regulation circuit unit of the motor drive module.

A emergency power supply for digital door lock comprising: a first battery holder capable of accommodating at least one battery; a second battery holder that can accommodate one or more batteries; a motor drive module connected to the other end of the first battery holder and one end of the second battery holder; a first changeover switch provided between one end of the first battery holder and the other end of the motor drive module; a second changeover switch provided between the other end of the second battery holder and one end of the motor drive module; a password input unit for entering a password; a internal circuit unit determines whether the entered password matches the default password and if the password entered matches the predetermined password, power is supplied to the motor drive module. Depending on the operation of the first switching switch and the second switching switch, the connection between the first battery holder and the second battery holder is switched from parallel to series or in series in parallel.

A driving method of a emergency power supply for digital door lock comprising: switching from series to parallel by switching a first common terminal of a first changeover switch from a second output terminal to a first output terminal, switching a second common terminal of a second changeover switch from a fourth output terminal to a third output terminal; Entering password in a password input unit; determining, by an internal circuit unit, whether or not the password entered from the password input unit matches; supplying, by the internal circuit unit, power to the motor drive module, when the password entered from the password input unit matches.

A driving method of a emergency power supply for digital door lock comprising: switching from series to parallel by switching a first common terminal of a first changeover switch from a second output terminal to a first output terminal, switching a second common terminal of a second changeover switch from a third output terminal to a fourth output terminal; entering password in a password input unit; determining, by a internal circuit unit, whether or not the password entered from the password input unit matches; supplying, by the internal circuit unit, power to the motor drive module, when the password entered from the password input unit matches.

A emergency power supply for digital door lock comprising: a first battery holder capable of accommodating at least one battery; a second battery holder that can accommodate one or more batteries; a motor drive module connected to the other end of the first battery holder and one end of the second battery holder; a first changeover switch provided between one end of the first battery holder and the other end of the motor drive module; a second changeover switch provided between the other end of the second battery holder and one end of the motor drive module; a password input unit for entering a password; a internal circuit unit is powered to the motor drive module, if the password entered in the password input unit matches the predetermined password.

A driving method of a emergency power supply for digital door lock comprising: switching from series to parallel by switching a first common terminal of a first changeover switch from a second output terminal to a first output terminal, switching a second common terminal of a second changeover switch from a fourth output terminal to a third output terminal; entering password in a password input unit; determining, by a internal circuit unit, whether or not the password entered from the password input unit matches; supplying, by the internal circuit unit, power to the motor drive module, when the password entered from the password input unit matches.

A driving method of a emergency power supply for digital door lock comprising: switching from series to parallel by switching a first common terminal of a first changeover switch from a second output terminal to a first output terminal, switching a second common terminal of a second changeover switch from a third output terminal to a fourth output terminal; entering password in a password input unit; determining, by a internal circuit unit, whether or not the password entered from the password input unit matches; supplying, by the internal circuit unit, power to the motor drive module, when the password entered from the password input unit matches.

A emergency power supply for digital door lock comprising: a first battery holder that can accommodate one or more batteries, a second battery holder that can accommodate one or more batteries; a motor drive module that includes a target voltage regulation circuit unit and a latch bolt operating unit; a series-parallel changeover switch module that switches the electrical connection between the first battery holder and the second battery holder from series to parallel or from parallel to series; a target voltage regulation circuit selection switch module that adjusts the target voltage regulation circuit unit so that it is selectively applied in the process in which the voltage output from the first battery holder and the second battery holder is applied to the latch bolt regulating unit.

In this emergency power supply for digital door lock, the series-parallel changeover switch module includes a first switch, a second switch, and a third switch. One end of the first switch is connected to the other end of the first battery holder, the other end of the first switch is connected to the other end of the second battery holder, one end of the second switch is connected to one end of the first battery holder, the other end of the second switch is connected to one end of the second battery holder, one end of the third switch is connected to the other end of the first battery holder, and the other end of the third switch is connected to the other end of the second battery holder.

In this emergency power supply for digital door lock, the electrical connection between the first battery holder and the second battery holder is switched from series to parallel by opening the first switch, shorting the second switch, and shorting the third switch.

In this emergency power supply for digital door lock, the electrical connection between the first battery holder and the second battery holder is switched from parallel to series by shorting the first switch, opening the second switch, and opening the third switch.

In this emergency power supply for digital door lock, the target voltage regulating circuit selection switch module includes a fourth switch, a fifth switch, a sixth switch, and a seventh switch, one end of the fourth switch is connected to one end of the first battery holder, the other end of the fourth switch is connected to the first input terminal of the target voltage adjustment circuit unit, one end of the fifth switch is connected to the other end of the second battery holder, the other end of the fifth switch is connected to the second input terminal of the target voltage adjustment circuit unit, one end of the sixth switch is connected to the other end of the second battery holder, the other end of the sixth switch is connected to the second input terminal of the latch bolt actuating module, one end of the seventh switch is connected to one end of the first battery holder, and the other end of the seventh switch is connected to the first input of the latch bolt actuating module.

In this emergency power supply for digital door lock, the series-parallel changeover switch module switches the electrical connection between the first battery holder and the second electric holder from series to parallel, the fourth switch is shorted, the fifth switch is shorted, the sixth switch is opened, the second switch is opened, and the seventh switch The switch is opened.

In this emergency power supply for digital door lock, when the series-parallel changeover switch module switches the electrical connection between the first battery holder and the second electric holder from parallel to series, the fourth switch is opened, the fifth switch is opened, the sixth switch is shorted, the second switch is shorted, and the seventh switch is shorted.

In this emergency power supply for digital door lock, the series-parallel changeover switch module is operated by a door lock opening/closing means or an external emergency switch.

In this emergency power supply for digital door lock, the series-parallel changeover switch module switches the electrical connection between the first battery holder and the second battery holder from series to parallel or from parallel to series each time the door lock opening/closing means rotates in the direction opposite to the direction in which the door is opened.

In this emergency power supply for digital door lock, the series-parallel changeover switch module switches the electrical connection between the first battery holder and the second battery holder from series to parallel while maintaining the state in which the door lock opening/closing means is rotated in the direction opposite to the direction in which the door is opened.

In this emergency power supply for digital door lock, the target voltage regulation circuit selection switch module is operated by door lock opening/closing means or an external emergency switch.

In this emergency power supply for digital door lock, the target voltage regulation circuit selection switch module toggles each time the door lock opening/closing means rotates in the direction opposite to the direction in which the door is opened, and when the series-parallel changeover switch module switches the electrical connection between the first battery holder and the second battery holder from series to parallel, the target voltage regulation circuit selection switch module apply the output voltage from the first battery holder and the second battery holder to the latch bolt operating unit via the target voltage regulation circuit unit.

In this emergency power supply for digital door lock, the target voltage regulation circuit selection switch module apply the output voltage from the first battery holder and the second battery holder to the latch bolt operating unit via the target voltage regulation circuit unit while maintaining the state in which the door lock opening/closing means rotates in the direction opposite to the direction in which the door is opened.

In this emergency power supply for digital door lock, further comprising a external power switch module. When inserting a battery into the external battery insertion holder, the external power switch module replaces one of the batteries in the second battery holder with a battery inserted in the external battery insertion holder, connects the batteries in the second battery holder and the battery inserted in the external battery insertion holder in series, or selects only the battery of the external battery insertion holder as the power source applied to the latch bolt operating unit.

In this emergency power supply for digital door lock, the external power switch module includes a tenth switch and an eleventh switch. One end of the tenth switch is connected to the other end of the second battery holder, the other end of the tenth switch is connected to the second input end of the latch bolt operating part, one end of the eleventh switch is connected to the positive electrode of one of the batteries in the second battery holder, and the other end of the eleventh switch is connected to one end of the external battery insertion holder.

In this emergency power supply for digital door lock, the external power switch module includes a tenth switch and an eleventh switch. One end of the tenth switch is connected to the other end of the second battery holder, the other end of the tenth switch is connected to the second input end of the latch bolt operating unit, one end of the eleventh switch is connected to the other end of the second battery holder, and the other end of the eleventh switch is connected to one end of the external battery insertion holder.

In this emergency power supply for digital door lock, the external power switch module includes a tenth switch and an eleventh switch, one end of the tenth switch is connected to one end of the first battery holder, the other end of the tenth switch is connected to one end of the seventh switch module of the target voltage regulation circuit selection switch module, the other end of the eleventh switch is connected to one end of the seventh switch, and one end of the eleventh switch is connected to one end of the external battery insertion holder.

In this emergency power supply for digital door lock, the external power switch module includes a tenth switch and an eleventh switch. One end of the tenth switch is connected to the other end of the seventh switch module of the target voltage regulating circuit unit, the other end of the tenth switch is connected to the first input terminal of the target voltage regulating circuit unit, one end of the eleventh switch is connected to one end of the external battery insertion holder, and the other end of the eleventh switch is connected to the first input terminal of the target voltage regulating circuit unit.

In this emergency power supply for digital door lock, the other end of the external battery insertion holder is connected to the second input end of the latch bolt operating unit.

In this emergency power supply for digital door lock, when the battery is inserted into the external battery insertion holder, the tenth switch is opened and the eleventh switch is shorted.

In this emergency power supply for digital door lock, when the battery is removed from the external battery insertion holder, the tenth switch is shorted and the eleventh switch is opened.

A driving method of a emergency power supply for digital door lock comprising steps of:
(a) switching, by a series-parallel changeover switch module, the electrical connection between a first battery holder and a second battery holder from series to parallel or from parallel to series;
(b) applying the voltage of the first battery holder and the second battery holder is transferred to a latch bolt operating unit via a target voltage regulating circuit unit, when the electrical connection between the first battery holder and the second battery holder is connected in series in parallel;
(c) applying the voltages of the first battery holder and the second battery holder to the latch bolt operating unit, when the electrical connection between the first battery holder and the second battery holder is connected in parallel in series.

In this driving method of the emergency power supply for digital door lock, step (a) includes: operating the series-parallel changeover switch module, by the door lock opening/closing means or an external emergency switch.

In this driving method of the emergency power supply for digital door lock, step (b) is completed by operating the target voltage operation circuit selection switch module, by door lock opening/closing means or an external emergency switch.

A driving method of a emergency power supply for digital door lock comprising steps of: Inserting the battery into the external battery insertion holder; replacing, the external power switch module, one of the batteries in the first battery holder or the second battery holder with a battery inserted in the external battery insertion holder, or connecting in series, by the external power switch module, the battery in the first battery holder or the second battery holder, and the battery inserted in the external battery insertion holder.

A driving method of a emergency power supply for digital door lock comprising steps of: (1) Inserting the battery into the external battery insertion holder; (2) replacing, by the external power switch module, one of the batteries in the second battery holder with the battery inserted in the external battery insertion holder, or (3) connecting, by the external power switch module, the battery in the second battery holder and the battery inserted in the external battery insertion holder in series, or (4) selecting, by the external power switch module, the battery in the external battery insertion holder as the power source for the latch bolt operating unit.

In this driving method of the emergency power supply for digital door lock, the first battery holder contains one or more batteries, the second battery holder contains one or more batteries, the series-parallel changeover switch module includes a first switch, a second switch, and a third switch, one end of the first switch is connected to the other end of the first battery holder, the other end of the first switch is connected to one end of the second battery holder, one end of the second switch is connected to one end of the first battery holder, the other end of the second switch is connected to one end of the second battery holder, one end of the third switch is connected to the other end of the first battery holder, the other end of the third switch is connected to the other end of the second battery holder, the target voltage regulation circuit selection switch module includes a fourth switch, a fifth switch, a sixth switch, and a seventh switch, one end of the fourth switch is connected to one end of the first battery holder, the other end of the fourth switch is connected to the first input terminal of the target voltage regulation circuit unit, one end of the fifth switch is connected to the other end of the second battery holder, the other end of the fifth switch is connected to the second input terminal of the target voltage regulation circuit unit, one end of the sixth switch is connected to the other end of the second battery holder, the other end of the sixth switch is connected to the second input terminal of the latch bolt operating unit, one end of the seventh switch is connected to one end of the first battery holder, the other end of the seventh switch is connected to the first input terminal of the latch bolt operating unit.

In this driving method of the emergency power supply for digital door lock, wherein step (1), the electrical connection between the first battery holder and the second battery holder is switched from series to parallel by opening the first switch, shorting the second switch, and shorting the third switch.

In this driving method of the emergency power supply for digital door lock, wherein step (a), the electrical connection between the first battery holder and the second battery holder is switched from parallel to series by shorting the first switch, opening the second switch, and opening the third switch.

In this driving method of the emergency power supply for digital door lock, step (b) is completed by shorting the fourth switch, shorting the fifth switch, opening the seventh switch. In this driving method of the emergency power supply for digital door lock, step (c) is completed by opening the fourth switch, opening the fifth switch, shorting the seventh switch.

In this driving method of the emergency power supply for digital door lock, the series-parallel changeover switch module switches (toggles) the electrical connection between the first battery holder and the second battery holder from series to parallel or from parallel to series each time the door lock opening/closing means rotates in the direction opposite to the direction in which the door is opened.

In this driving method of the emergency power supply for digital door lock, the series-parallel changeover switch module switches (toggles) the electrical connection between the first battery holder and the second battery holder from series to parallel or from parallel to series while the door lock opening/closing means rotates in the direction opposite to the direction in which the door is opened.

In this driving method of the emergency power supply for digital door lock, the series-parallel changeover switch module switches the electrical connection between the first battery holder and the second battery holder from series to parallel while maintaining the state in which the door lock opening/closing means is rotated in the direction opposite to the direction in which the door is opened.

In this driving method of the emergency power supply for digital door lock, the target voltage regulation circuit selection switch module toggles each time the door lock opening/closing means rotates in the direction opposite to the direction in which the door is opened. When the series-parallel changeover switch module switches the electrical connection between the first battery holder and the second battery holder from series to parallel, the voltage output from the first battery holder and the second battery holder apply to the latch bolt operating unit via the target voltage regulation circuit unit.

In this driving method of the emergency power supply for digital door lock, the target voltage regulation circuit selection switch module supply the voltage output from the first battery holder and the second battery holder to the latch bolt operating unit via the target voltage regulation circuit unit, while maintaining the state in which the door lock opening/closing means rotates in the direction opposite to the direction in which the door is opened.

In this driving method of the emergency power supply for digital door lock, the external power switch module includes a tenth switch and an eleventh switch, one end of the tenth switch is connected to the other end of the second battery holder, the other end of the tenth switch is connected to the second input end of the latch bolt operating unit, one end of the eleventh switch is connected to the positive electrode of one of the batteries in the second battery holder, the other end of the eleventh switch is connected to one end of the external battery insertion holder.

In this driving method of the emergency power supply for digital door lock, the external power switch module includes a tenth switch and an eleventh switch, one end of the tenth switch is connected to the other end of the second battery holder, the other end of the tenth switch is connected to the second input end of the latch bolt operating unit, one end of the eleventh switch is connected to the other end of the second battery holder, and the other end of the eleventh switch is connected to one end of the external battery insertion holder.

In this driving method of the emergency power supply for digital door lock, the external power switch module includes a tenth switch and an eleventh switch, one end of the tenth switch is connected to one end of the first battery holder, the other end of the tenth switch is connected to one end of the fourth switch of the target voltage adjustment circuit selection switch module, the other end of the eleventh switch is connected to one end of the fourth switch, and one end of the eleventh switch is connected to one end of the external battery insertion holder.

In this driving method of the emergency power supply for digital door lock, the other end of the external battery insertion holder is connected to the second input end of the latch bolt operating unit.

In this driving method of the emergency power supply for digital door lock, steps (2) to (4) are completed by opening the tenth switch, shorting the eleventh switch.

In this emergency power supply for digital door lock, The present invention includes a first battery holder capable of accommodating one or more batteries; A second battery holder that can accommodate one or more batteries; a motor drive module that includes a target voltage regulation circuit unit and a latch bolt operating unit; a series-parallel changeover switch module that switches the connection between the first battery holder and the second battery holder from series to parallel or from parallel to series; a target voltage regulating circuit selection switch module that selectively applies the target voltage regulation circuit unit in the process of applying the voltage output from the first battery holder and the second battery holder to the latch bolt operating unit. The target voltage regulating circuit selection switch module includes a fourth switch, a fifth switch, a sixth switch, a seventh switch, an eighth switch, and a ninth switch. One end of the fourth switch is connected to one end of the first battery holder, the other end of the fourth switch is connected to the first input terminal of the target voltage regulation circuit unit, and one end of the fifth switch is connected to the other end of the second battery holder. The other end of the fifth switch is connected to the second input terminal of the target voltage regulation circuit unit, one end of the sixth switch is connected to the other end of the second battery holder, and the other end of the sixth switch is connected to the second input terminal of the latch bolt operating unit. One end of the seventh switch is connected to one end of the first battery holder, the other end of the seventh switch is connected to the first input terminal of the latch bolt operating portion, and one end of the eighth switch is connected to the first input terminal of the latch bolt operating unit. The other end of the eighth switch is connected to the first output end of the target voltage regulation circuit unit, the other end of the ninth switch is connected to the second input end of the latch bolt operating section, and the other end of the ninth switch is connected to the second output terminal of the target voltage regulation circuit unit. When the series-parallel changeover switch module switches the connection between the first battery holder and the second electric holder from series to parallel, the eighth switch is shorted and the ninth switch is shorted.

In this emergency power supply for digital door lock, when the series-parallel changeover switch module switches the connection between the first battery holder and the second electric holder from parallel to series, the eighth switch is opened and the ninth switch is opened.

In this emergency power supply for digital door lock, the series-parallel switch module switches (toggles) the electrical connection between the first battery holder and the second battery holder from series to parallel or from parallel to series each time the external emergency switch enters the emergency mode.

In this emergency power supply for digital door lock, the series-parallel switch module switches the connection between the first battery holder and the second battery holder from series to parallel while the external emergency switch maintains the emergency mode.

In this emergency power supply for digital door lock, the target voltage regulation circuit selection switch module toggles every time the external emergency switch goes into emergency mode. Each time the series-parallel changeover switch module makes the connection between the first battery holder and the second battery holder in series or in parallel, the voltage output from the first battery holder and the second battery holder is applied to the latch bolt operating portion via the target voltage regulation circuit unit.

In this emergency power supply for digital door lock, while the external emergency switch maintains the emergency mode, the target voltage regulation circuit selection switch module applies the voltage output from the first battery holder and the second battery holder to the latch bolt operating unit via the target voltage regulation circuit unit.

The present invention includes an external battery insertion holder; a external power switch module, when inserting a battery into the external battery insertion holder, the external power switch module replaces one of the batteries in the first battery holder or the second battery holder with a battery inserted in the external battery insertion holder, connects the batteries in the first battery holder or the second battery holder and the battery inserted in the external battery insertion holder in series.

The present invention includes a external battery insertion holder; a external power switch module, when inserting a battery into the external battery insertion holder, the external power switch module replaces one of the batteries in the second battery holder with a battery inserted in the external battery insertion holder, connects the batteries in the second battery holder and the battery inserted in the external battery insertion holder in series, or selects only the battery of the external battery insertion holder as the power source applied to the latch bolt operating unit.

The present invention further comprises a charging battery connected in parallel with the external battery insertion holder; an emergency power generator that supplies power to the charging battery.

The emergency power generation unit includes a piezoelectric element.

A driving method of the emergency power supply for digital door lock comprising steps of: (i) switching, by a series-parallel changeover switch module, the electrical connection between a first battery holder and a second battery holder from series to parallel or from parallel to series; (ii) applying the voltage of the first battery holder and the second battery holder is transferred to a latch bolt operating unit via a target voltage regulating circuit unit, when the electrical connection between the first battery holder and the second battery holder is connected in series in parallel; (iii) applying the voltages of the first battery holder and the second battery holder to the latch bolt operating unit, when the electrical connection between the first battery holder and the second battery holder is connected in parallel in series. The target voltage regulation circuit selection switch module includes a fourth switch, a fifth switch, a sixth switch, a seventh switch, an eighth switch, and a ninth switch. One end of the fourth switch is connected to one end of the first battery holder, and the other end of the fourth switch is connected to the first input terminal of the target voltage regulation circuit unit. One end of the fifth switch is connected to the other end of the second battery holder, and the other end of the fifth switch is connected to the second input terminal of the target voltage regulation circuit unit. One end of the sixth switch is connected to the other end of the second battery holder, the other end of the sixth switch is connected to the second input terminal of the latch bolt operating unit, and one end of the seventh switch is connected to one end of the first battery holder. The other end of the seventh switch is connected to the first input terminal of the latch bolt operating unit, one end of the eighth switch is connected to the first input end of the latch bolt actuating portion, and the other end of the eighth switch is connected to the first output end of the target voltage regulation circuit unit, and the other end of the ninth switch is connected to the second input of the latch bolt operating portion, and one end of the ninth switch is connected to the second output of the target voltage regulation circuit portion.

In this driving method of the emergency power supply for digital door lock, step (i) is completed by operating the series-parallel switch module that the door lock opening/closing means or an external emergency switch operates.

In this driving method of the emergency power supply for digital door lock, step (ii) is completed by operating the target voltage regulation circuit selection switch module that door lock opening/closing means or an external emergency switch operates.

A driving method of the emergency power supply for digital door lock comprising steps of: operating the emergency power generation unit; charging a rechargeable battery connected in parallel with the external battery insertion holder.

In this driving method of the emergency power supply for digital door lock, step (ii) is completed by shorting the eighth switch, shorting the ninth switch.

In this driving method of the emergency power supply for digital door lock, step (iii) is completed by opening the eighth switch, opening the ninth switch.

In this driving method of the emergency power supply for digital door lock, the series-parallel switch module switches the connection between the first battery holder and the second battery holder from series to parallel or from parallel to series each time the emergency switch is put into the emergency mode.

In this driving method of the emergency power supply for digital door lock, the series-parallel switch module switches the connection between the first battery holder and the second battery holder from series to parallel while the external emergency switch maintains the emergency mode.

In this driving method of the emergency power supply for digital door lock, the target voltage regulation circuit selection switch module toggles every time the emergency switch goes into emergency mode, and the series-parallel selection switch module apply the voltage output from the first battery holder and the second battery holder to the latch bolt operating unit via the target voltage operation circuit unit.

In this driving method of the emergency power supply for digital door lock, the voltage output from the first battery holder and the second battery holder apply to the latch bolt operating unit via the target voltage regulation circuit unit.

In this driving method of the emergency power supply for digital door lock, the emergency power generation unit is a piezoelectric element.

Effects of the Invention

According to the present invention of an emergency power supply for digital door lock and driving method same, the following effects are obtained.

First, in the present invention, by not exposing the input terminal to the outside, there is an effect of preventing the criminal method of opening the digital door lock by electric shock.

Second, in the present invention, when the battery provided inside the digital door lock is discharged, a method of using the remaining amount of the internal battery by switching the connection method of the battery provided inside without having an external terminal can be used. There is an effect of improving convenience in using the digital door lock. In addition, even in case the battery cannot be activated due to a cold wave or other reasons, it is possible to achieve the effect of supplying sufficient power for the door lock to operate by changing the connection method of the battery.

Third, in the present invention, there is an effect that can provide a beautiful and practical appearance as it is in the current digital door lock market where a touch screen is the trend by not having any terminals on the outer surface.

Fourth, by temporarily switching the connection of the battery holder provided inside the digital door lock according to a preferred embodiment of the present invention from series to parallel to increase the amount of current, it is possible to ensure the operation of the motor driving module and at the same time reduce the loss of energy. there is an effect.

Fifth, since more batteries can be accommodated inside the battery holder provided inside the digital door lock according to another embodiment of the present invention, the use time and replacement cycle are extended, and at the same time, the connection between the battery holders is temporarily It has the effect of ensuring the emergency operation of the motor drive module by increasing the voltage by converting it from parallel to series.

Sixth, in the present invention, by rotating the door lock opening/closing means provided in the emergency power supply for digital door lock, the change of the battery holder connection method according to the discharge of the battery and the function of always opening and closing the door according to the rotation direction are performed at the same time. It has the effect of improving convenience.

Seventh, in the present invention, as the connection method of the first battery holder and the second battery holder is switched from series to parallel or from parallel to series, there is an effect of increasing the battery life.

Eighth, in the case of the emergency power supply for digital door lock according to a further embodiment having an external battery insertion holder, even when the remaining amount of the internal battery is exhausted, the operating power is supplied to the digital door lock by inserting the battery into the external battery insertion holder. That is, by inserting a 1.5 volt battery into the external battery insertion holder, it is possible to supply emergency power to operate the digital door lock.

BEST MODE FOR CARRYING OUT THE INVENTION

Figure 1:
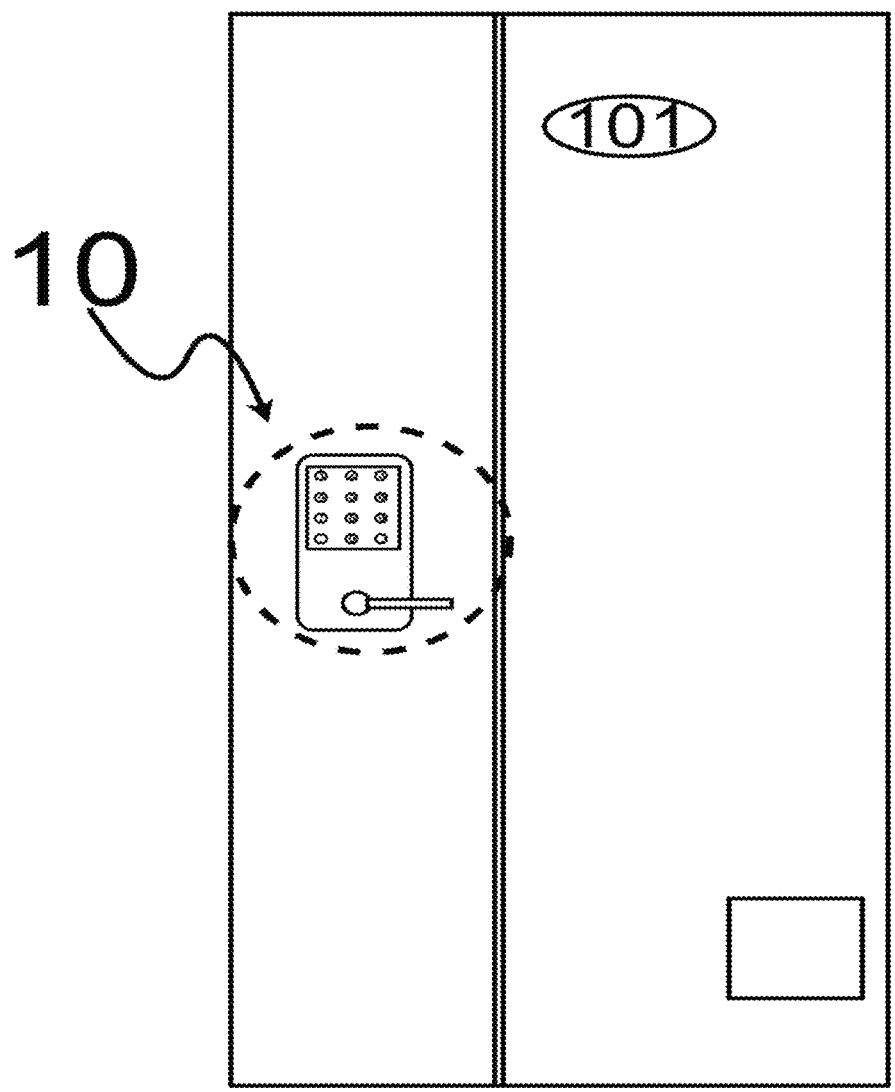
FIG. 1 is a diagram showing a conventional digital door lock installed on a front door.

Hereinafter, embodiments of the present invention will be described in detail with reference to the accompanying drawings. The present invention can be modified in various ways and can have various forms, but specific embodiments are exemplified in the drawings and described in detail in the text. However, it should be understood that this is not intended to limit the invention to any particular form of disclosure, but to include all modifications, equivalents to alternatives within the idea and technology of the invention. Further, in the description of the present invention, terms such as "first" and "second" are used only for the purpose of distinguishing a certain component from other components, and are not used to limit the meaning. And the singular representation includes multiple representations, unless there is a clear contextual meaning, and terms such as "contain" or "have" are the features, numbers, steps, actions, described in the specification. It is intended to specify the existence of a component, part, or combination thereof, of one or more other features, numbers, steps, actions, components, parts, or a combination thereof. It should be understood that we do not preclude the possibility of existence or addition.

FIG. 1 is a diagram showing a conventional digital door lock installed on a front door.

The digital door lock 10 is a device that opens and closes a door by utilizing digitized information such as a password, a semiconductor chip, a smart card, a fingerprint, and has an advantage that it is not necessary to carry a key separately. Furthermore, since a separate key is not required, there is an effect that crimes due to key duplication can be prevented. Thanks to this, it tends to be used as a means of locking the front door of the most popular homes. In addition, the convenience of the digital door lock 10 is further improved by fusing with the latest technologies such as bluetooth and fingerprint recognition technology.

Figure 2A:
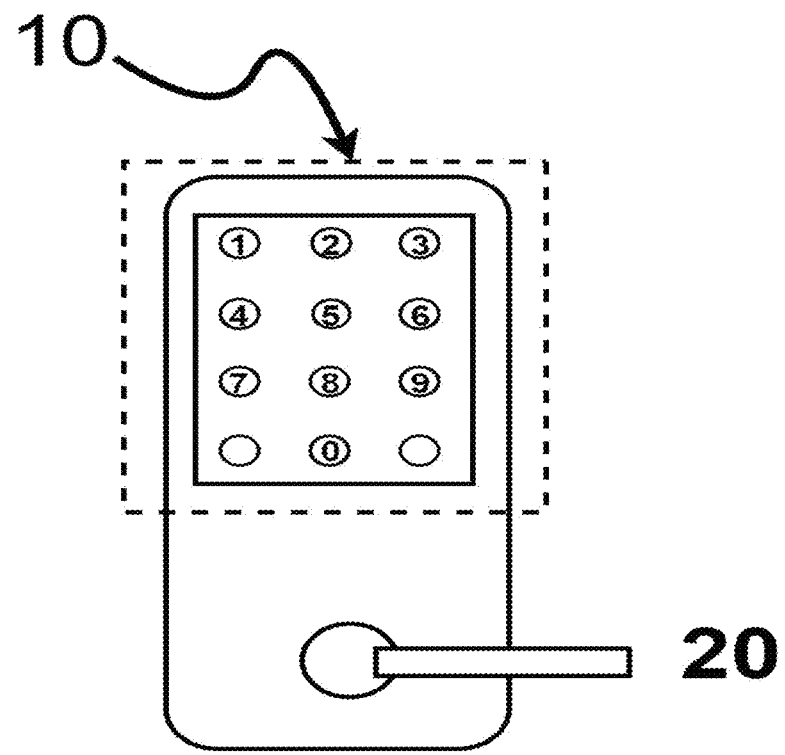
FIGS. 2A-2B are diagrams showing a state of the digital door lock provided on the outside of the entrance door and a state of the digital door lock provided on the inside of the entrance door.
Figure 2B:
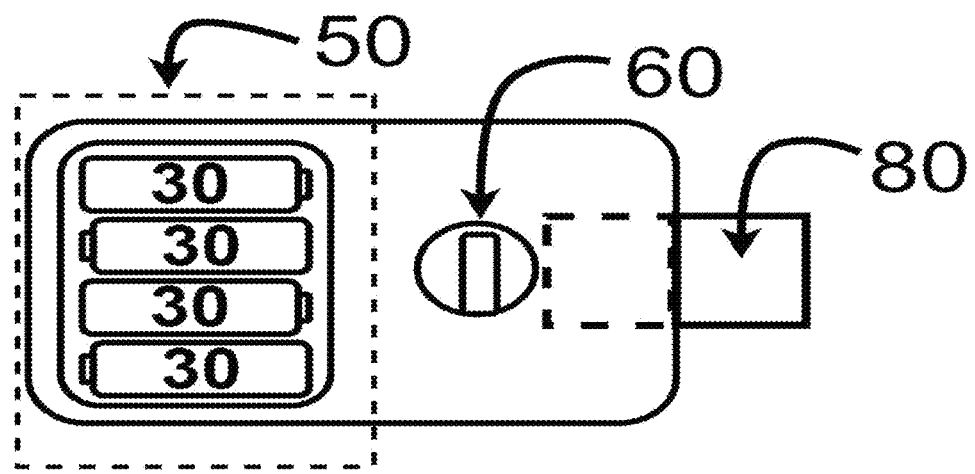

For the preferred explanation, FIG. 2A shows the state of the digital door lock 10 provided on the outside of the entrance door, and FIG. 2B shows the state of the digital door lock 10 provided on the inside of the entrance door.

FIG. 2A shows a state of the digital door lock 10 provided on the outside of the entrance door, and the digital door lock 10 is configured to include a handle 20 for opening and closing the entrance door. Therefore, the digital door lock 10 is configured so that the user can open and close the door by using the handle 20 after inputting a preset password.

FIG. 2B shows the state of the digital door lock 10 provided inside the entrance, in which the battery insertion unit 50 into which the battery 30 can be inserted and the digital door lock 10 are opened and closed by mechanical operation. The manual open/close button 60 can consist of a latch bolt 80 that opens and closes the door by projecting from the digital door lock 10 or engaging inside the digital door lock device 10. According to FIG. 2B, the digital door lock 10 is designed so that the battery 30 can be replaced only inside the front door. Therefore, when the battery 30 is discharged, the battery cannot be replaced outside the entrance gate. When the drive of the digital door lock 10 is stopped due to the discharge of the battery 30, a situation may occur in which the entrance door in which the digital door lock 10 is installed cannot be opened or closed.

Figure 3:
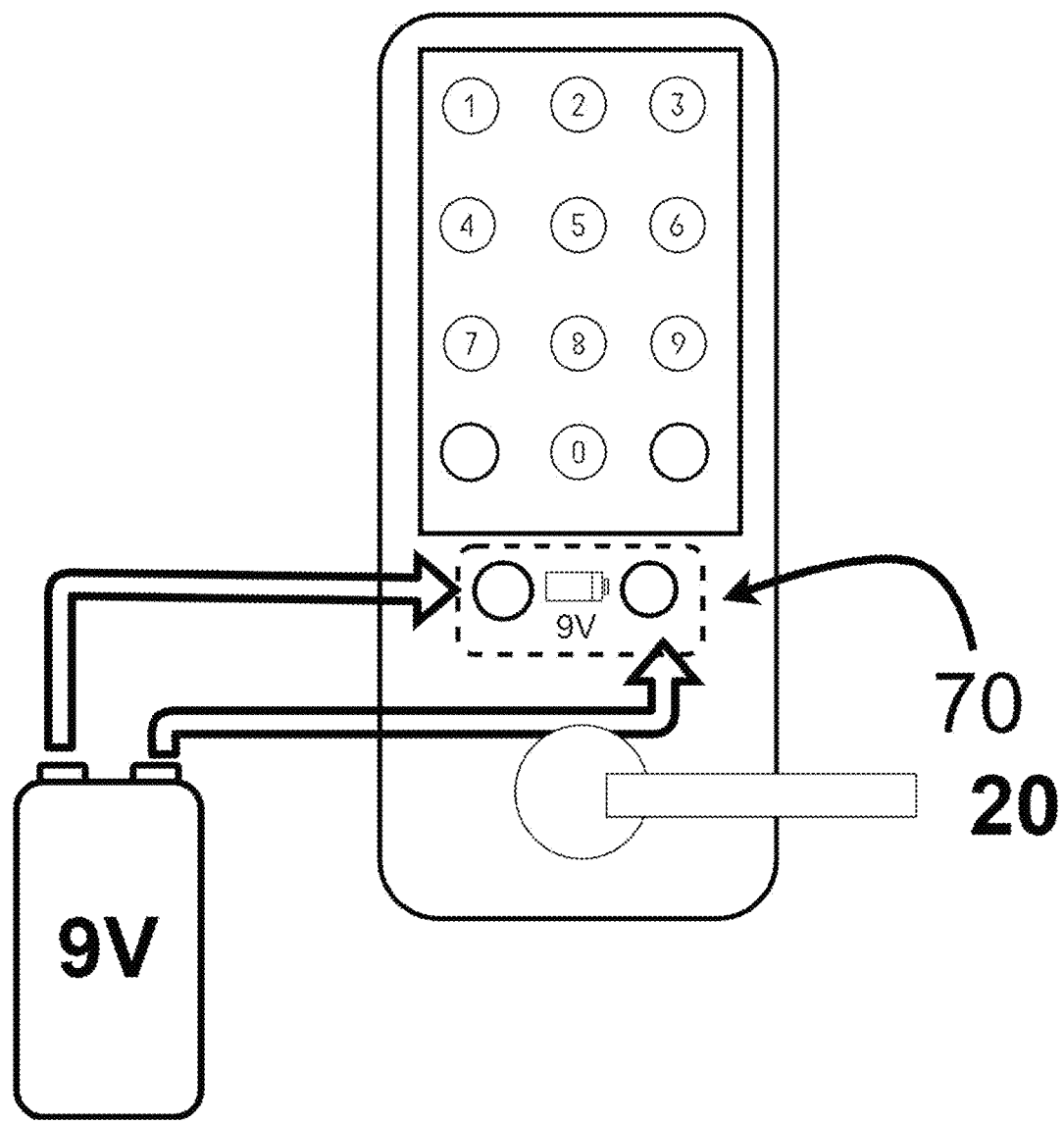
FIG. 3 is a diagram showing a conventional invention in which a digital door lock is driven by a terminal exposed to the outside when the battery is discharged.

FIG. 3 is a diagram showing a conventional invention in which a digital door lock is driven by a terminal exposed to the outside when the battery is discharged.

Considering the problem that the battery 30 provided inside the digital door lock 10 is discharged and the digital door lock 10 cannot be opened or closed outside the entrance door, the external terminal 70 is used for the digital door lock device 10 was developed. When the 9 volt battery 30 is coupled to the digital door lock 10 provided with the external terminal 70, power is temporarily supplied and the digital door lock 10 can be temporarily driven. Therefore, the discomfort that may be experienced when the internal battery 30 of the digital door lock 10 is discharged has been eliminated. However, many new types of criminal cases have occurred in which the digital door lock 10 is opened endlessly after an electric shock is applied to the external terminal 70 provided on the outer surface of the digital door lock 10. This became a problem for security.

Figure 4A:
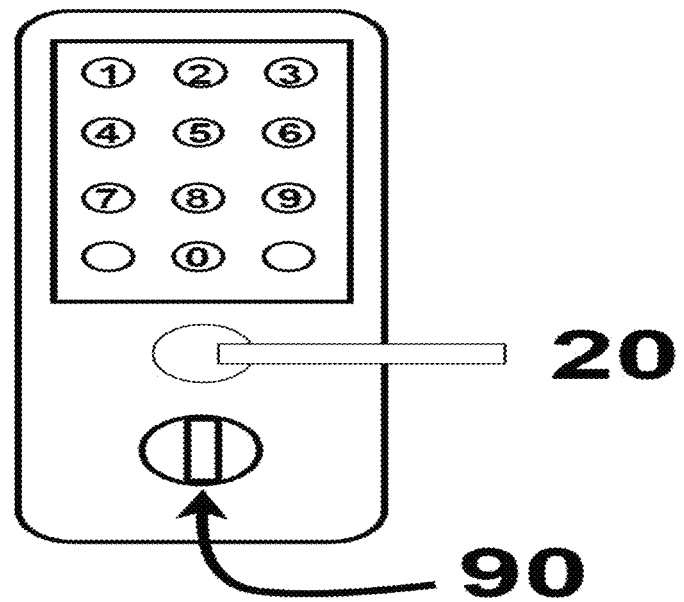
FIGS. 4A-4B are diagrams showing a conventional digital door lock invented in preparation for a criminal method using an external terminal.
Figure 4B:
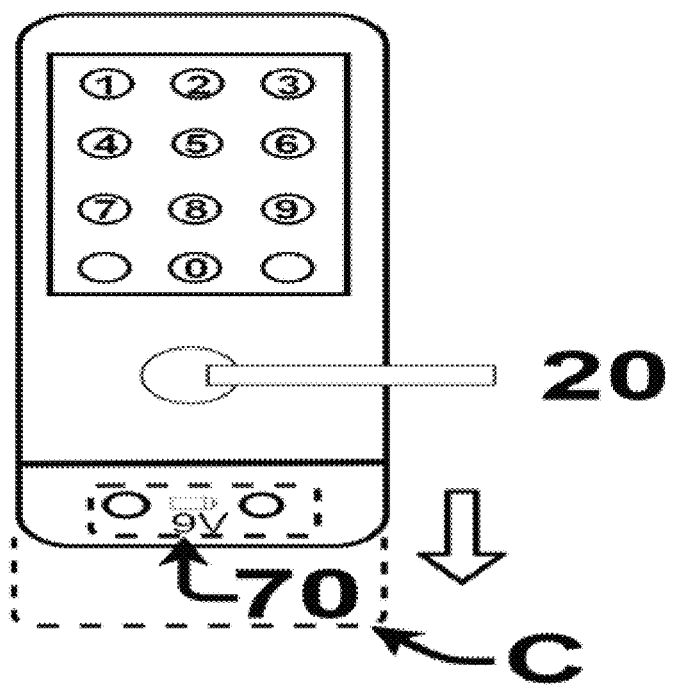

FIGS. 4A-4B are a diagram showing a conventional digital door lock device invented in preparation for a criminal method using an external terminal.

FIG. 4A shows a digital door lock device 10 using a card (key) terminal 90, and FIG. 4B shows a section in which an external terminal 70 is inserted with a separate lid (C).

A criminal method of giving an electric shock to an external terminal of a digital door lock 10 is widely known. Therefore, a form A in which a card key type terminal is used instead of a method in which a 9-volt battery is brought into contact with an external terminal has been devised, and a form B in which a section in which the external terminal 70 is inserted is opened and closed to protect it from the outside was devised. However, the form A of the digital door lock 10 using the card key terminal 90 is not practical in that a separate tool must be carried. In the form B in which a separate lid C is provided in the section where the terminal is inserted to protect it from the outside, the section in which the external terminal 70 is inserted can be easily exposed. Therefore, neither method was effective in preventing new crime methods. As can be seen from FIGS. 4A-4B, the above-mentioned digital door lock 10 was able to prevent the difficulty that occurs when the battery 30 provided inside the digital door lock 10 is discharged in an unexpected situation. And, it triggered damage caused by new crime methods. Therefore, it is an object of the present invention to invent the digital door lock 10 which can solve the problem generated when the battery 30 provided inside the digital door lock 10 is discharged and prevent a new kind of criminal technique.

Figure 5:
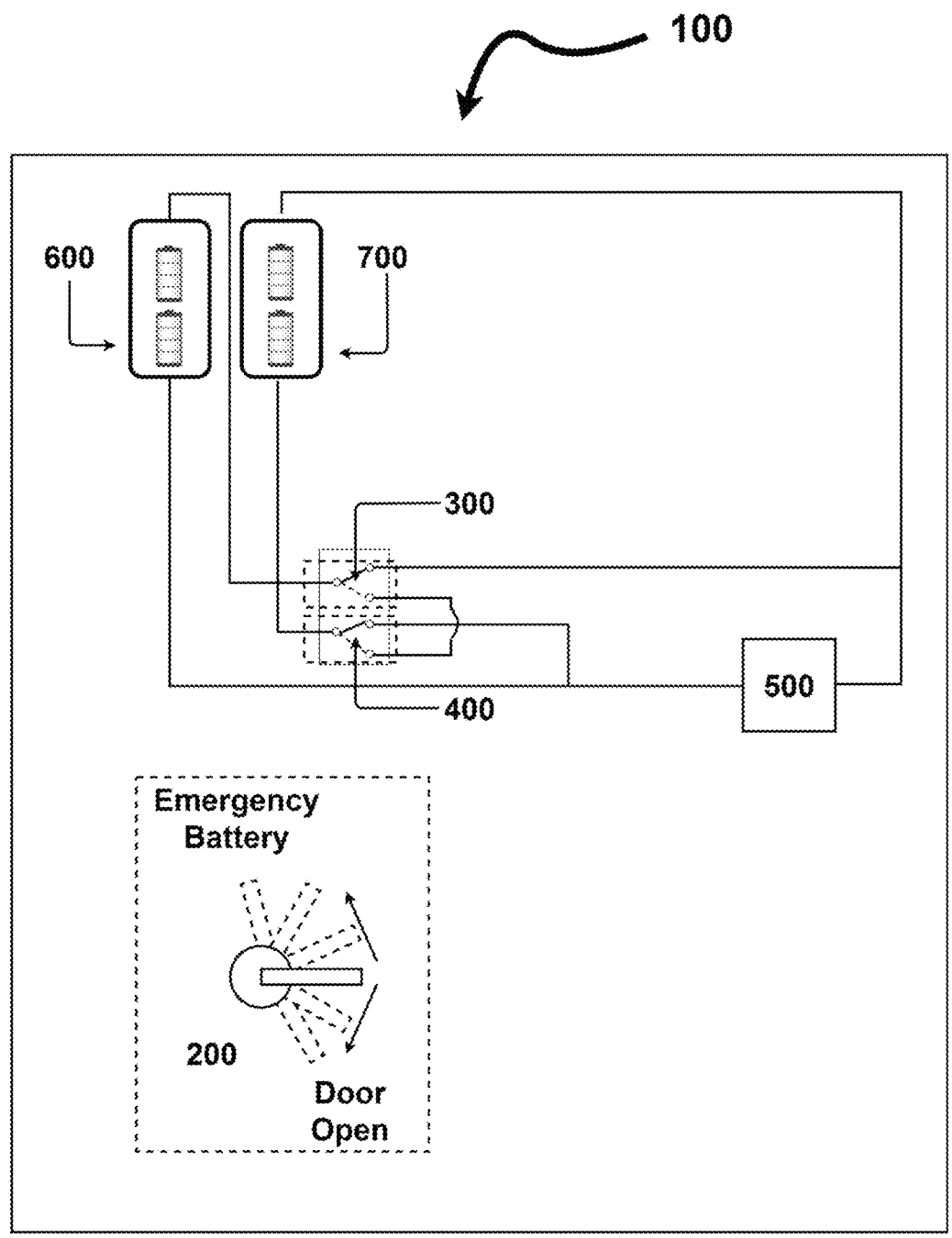
FIG. 5 shows the circuit of the emergency power supply for digital door lock according to the first embodiment of the present invention.

FIG. 5 shows the circuit of the emergency power supply for digital door lock according to the first embodiment of the present invention.

The emergency power supply for digital door lock 100 of the present invention is an invention devised by improving the above-mentioned problems. The emergency power supply for digital door lock 100 includes a first battery holder 600, a second battery holder 700, a motor drive module 500, a first changeover switch 300, and a second changeover switch 400. The motor drive module 700 is connected to the other end of the first battery holder 600 and one end of the second battery holder 700. The first battery holder 600 can accommodate one or more batteries 30, and the second battery holder 700 can accommodate one or more batteries 30. One or more batteries 30 having a voltage of 1.5 volts can be inserted into the first battery holder 600 and the second battery holder 700. The battery 30 may be a dry battery which is a primary battery or a storage battery which is a secondary battery. Further, the predetermined voltage for driving the motor drive module 500 can be supplied with a voltage value of 3 volts or 6 volts. In the description of the emergency power supply for digital door lock 100 according to FIG. 5, two batteries 30 are provided in each of the first battery holder 600 and the second battery holder 700, and provides 6 volts.

Further, the door lock opening/closing means 200 for switching the electrical contact between the first changeover switch 300 and the second changeover switch 400 can be included. The door lock opening/closing means 200 is configured in the form of a lever and the form of a handle, and can be configured to rotate in the vertical direction. The connection between the first battery holder 600 and the second battery holder 700 can be switched from series to parallel according to the rotation of the door lock opening/closing means 200. The form of the door lock opening/closing means 200 can be configured in various forms. The most ideal form of the door lock opening/closing means 200 may be in the form of a lever, and the emergency power supply for digital door lock 100 may be driven as it rotates upward.

The emergency power supply for digital door lock 100 according to the present invention includes a function of using the remaining amount of the battery 30 provided inside the emergency power supply for digital door lock 100 only by rotating the door lock opening/closing means 200. Therefore, unlike the conventional digital door lock device 10, it is not necessary to separately configure the external terminal 70 on the outer surface in order to obtain temporary power. Further, by not exposing the external terminal 70, it can be expected to have an effect of preventing a criminal method of attempting to invade a house by applying an electric impact to the external terminal 70 and impairing the function of the digital door lock 10. At the same time, when the battery 30 provided inside is discharged, the remaining amount of the battery 30 can be effectively utilized to temporarily provide the power for driving the emergency power supply for digital door lock 100 of the present invention.

Figure 6A:
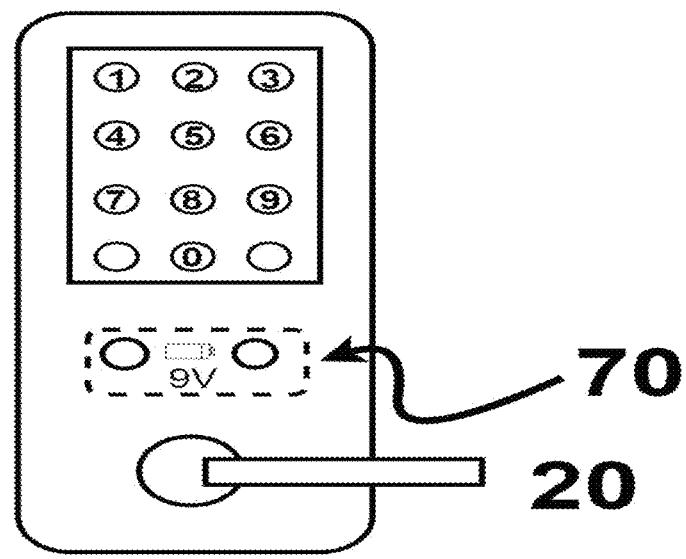
FIGS. 6A-6B show the outer surface of a conventional digital door lock and the outer surface of the emergency power supply for digital door lock of the present invention.
Figure 6B:
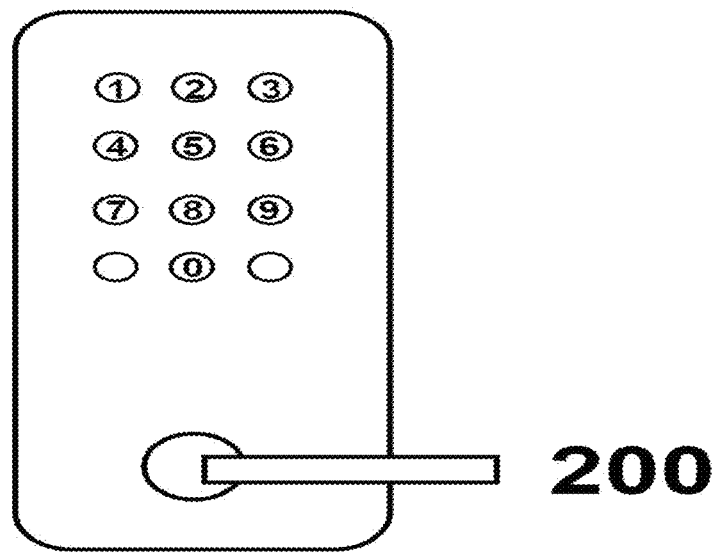

FIGS. 6A-6B show the outer surface of a conventional digital door lock and the outer surface of the emergency power supply for digital door lock of the present invention.

For the preferred description of the present invention, FIG. 6A shows the outer surface of a conventional digital door lock, and FIG. 6B shows the outer surface of the emergency power supply for digital door lock 100 of the present invention. The emergency power supply for digital door lock 100 according to the present invention does not have to include the external terminal 70, unlike the outer surface of the invention of the conventional digital door lock 10.

Further, when the battery 30 inside the emergency power supply for digital door lock 100 is discharged, the connection method between the battery holders is switched by the door lock opening/closing means 200, and the remaining amount of the internal battery 30 can be used. That is, power can be temporarily applied to operate the digital door lock 10 even if emergency power is not supplied by a component such as the external terminal 70. Therefore, the emergency power supply for digital door lock 100 of the present invention is configured not to have a terminal on the outer surface, and can provide the beautiful appearance of the touch screen as it is.

Figure 7A:
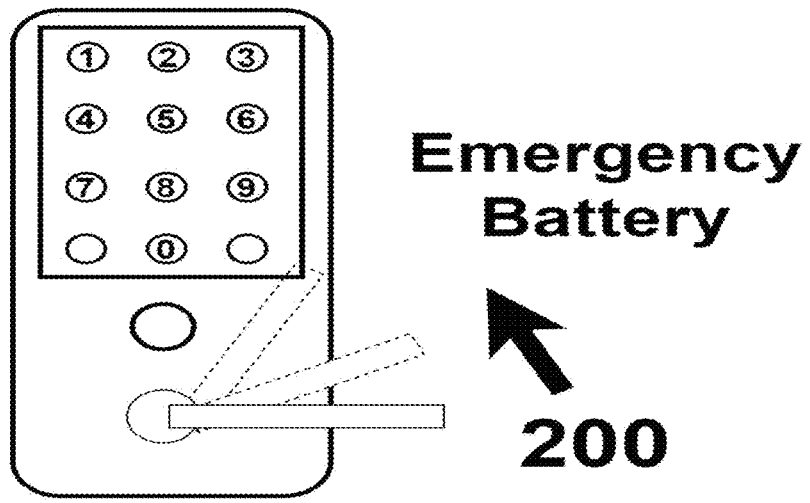
FIGS. 7A-7B show driving of the emergency power supply for digital door lock by rotation of a door lock opening/closing means which is a component of the emergency power supply for digital door lock of the present invention.
Figure 7B:
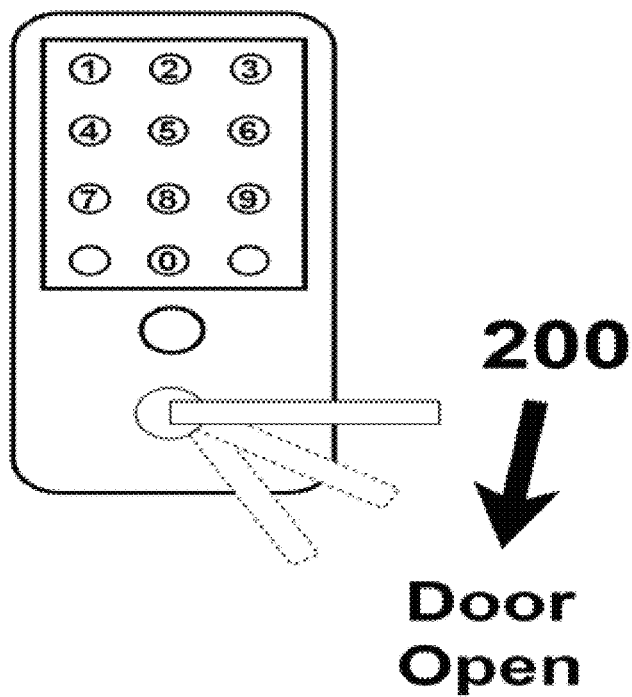

FIGS. 7A-7B show driving of the emergency power supply for digital door lock by rotation of a door lock opening/closing means which is a component of the emergency power supply for digital door lock of the present invention. It was described that "The most ideal form of the door lock opening/closing means 200 may be in the form of a lever, and the emergency power supply for digital door lock 100 may be driven as it rotates upward. Therefore, an example of the case where the door lock opening/closing means 200 is in the form of a lever will be described.

FIG. 7A shows how the door lock opening/closing means 200 rotates upward, and FIG. 7B shows how the door lock opening/closing means 200 rotates downward. The emergency power supply for digital door lock 100 of the present invention is similar to the digital door lock 10 in that the door lock opening/closing means 200 is normally rotated downward to open the door. However, when normal driving is difficult due to the discharge of the battery 30 provided inside, the battery connection method is switched so that the remaining amount of the battery 30 can be used by rotating the door lock opening/closing means 200 upward. This part is different from the conventional digital door lock 10. Further, when the remaining amount of the battery 30 is driven, the door lock opening/closing means 200 can be moved and driven so as to be easy for the user to use.

Figure 8A:
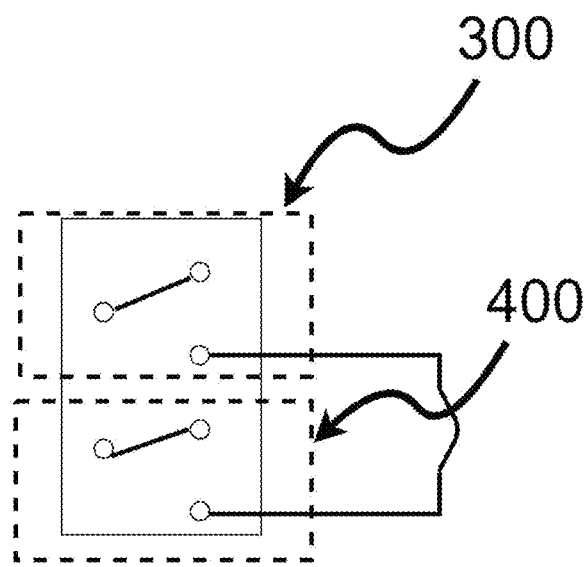
FIGS. 8A-8B show the state of the components of the first changeover switch and the second changeover switch of the emergency power supply for digital door lock according to the first embodiment of the present invention.
Figure 8B:
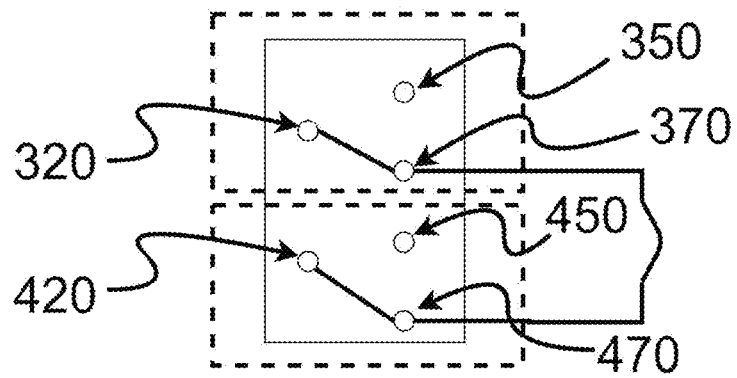

FIGS. 8A-8B show the state of the components of the first changeover switch and the second changeover switch of the emergency power supply for digital door lock according to the first embodiment of the present invention.

For the preferred description of the present invention, FIG. 8A shows the first changeover switch 300 and the second changeover switch 400, and FIG. 8B shows a configuration constituting the first changeover switch 300 and the second changeover switch 400.

The contacts of the first changeover switch 300 and the second changeover switch 400 according to FIG. 8A are switched according to the rotation of the door lock opening/closing means 200. Then, by switching the contact between the first changeover switch 300 and the second changeover switch 400, the connection method between the first battery holder 600 and the second battery holder 700 is switched.

The first changeover switch 300 includes a first common terminal 320, a first output terminal 350, and a second output terminal 370. Further, the first common terminal 320 of the first changeover switch 300 is connected to one end of the first battery holder 600, and is connected to the other ends of the motor drive module 500 and the second battery holder 700.

Further, the second changeover switch 400 can include a second common terminal 420, a third output terminal 450, and a fourth output terminal 470. The second common terminal 420 of the second changeover switch 400 is connected to the other end of the second battery holder 700, and the third output terminal 450 is the other end of the first battery holder 600 and one end of the motor drive module 500. The second output terminal 370 of the first changeover switch 300 and the fourth output terminal 370 of the second changeover switch 300 may be connected to each other.

Figure 9A:
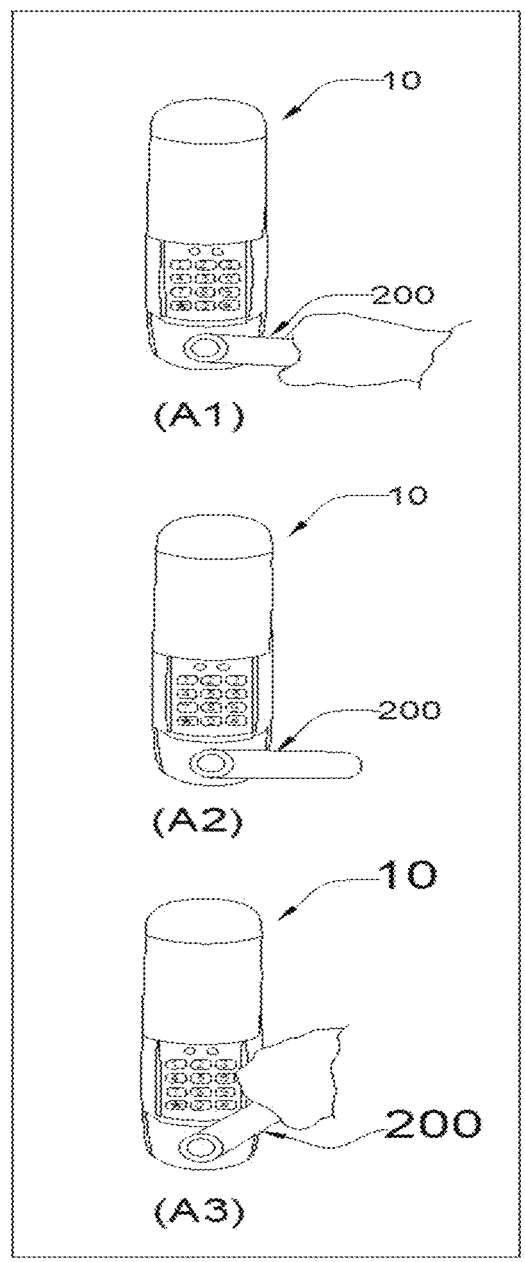
FIGS. 9A-9B show a driving method of the door lock opening/closing means when the first changeover switch and the second changeover switch of the emergency power supply for digital door lock of the present invention are adopted by the push lock, the push non-lock, and the tact.
Figure 9B:
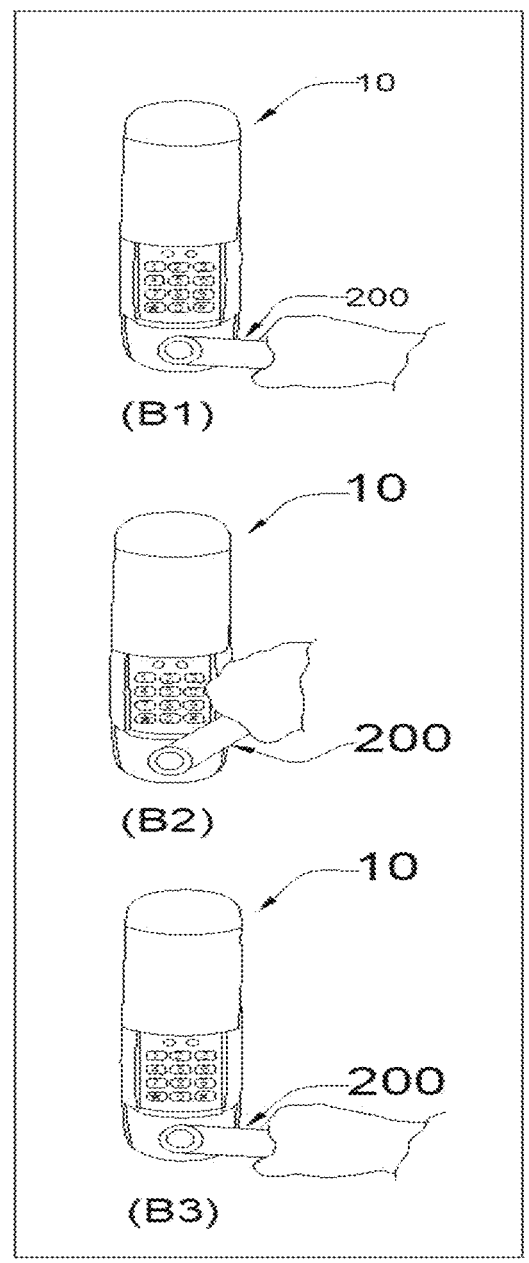

FIGS. 9A-9B show a driving method of the door lock opening/closing means when the first changeover switch and the second changeover switch of the emergency power supply for digital door lock of the present invention are adopted by the push lock, the push non-lock, and the tact. The first changeover switch 300 and the second changeover switch 400 of the emergency power supply for digital door lock 100 according to the preferred embodiment of the present invention operate by any of push non-locking, push lock, tact, and selector. This method can proceed according to the principle of toggle switching, that is, power is transmitted to the machine by the link portion.

FIG. 9A shows a driving method when the first changeover switch 300 and the second changeover switch 400 use the push lock, and FIG. 9B shows a driving method when the first changeover switch 300 and the first changeover switch use the tact or the push non-locking. In response to the rotation of the door lock opening/closing means 200, the emergency power supply for digital door lock 100 of the present invention will change the electrical contacts of the first changeover switch 300 and the second changeover switch 400 mechanically connected to the door lock opening/closing means 200. Therefore, when the door lock opening/closing means 200 is rotated upward, the electric contacts of the first changeover switch 300 and the second changeover switch 400 are switched.

When push lock is selected by the first changeover switch 300 and the second changeover switch 400 according to FIG. 9A, the door lock opening/closing means 200 is moved upward according to FIG. 9A1 to convert the contact of the changeover switch. After that, the door lock opening/closing means 200 can be moved downward as in FIG. 9A2.

However, even if the door lock opening/closing means 200 moves downward, the first changeover switch 300 and the second changeover switch 400 in the emergency power supply for digital door lock 100 are maintained in a state where the electric contacts are switched. Since electric power can be applied to the motor drive module 500, the digital door lock emergency power supply device 100 can be normally driven. Therefore, the user can open the door by inputting a password preset in the emergency power supply for digital door lock 100.

When the push-lock type switch is pressed once, the switched state is maintained, and when it is pressed again, it is converted to the original state. Therefore, the user can rotate the door lock opening/closing means 200 upward again as shown in FIG. 9A3 to restore the electrical contact between the first changeover switch 200 and the second changeover switch 300. When the push lock is selected according to FIG. 9A, the connection between the first battery holder 600 and the second battery holder 700 can be freely adjusted according to the user's selection. Therefore, the user can maintain the state in which the connection between the first battery holder 600 and the second battery holder 700 is switched until the new battery 30 is replaced with an emergency power supply for digital door lock 100. Then, the door lock opening/closing means 200 can be rotated and/or moved upward again only after the new battery 30 is replaced, so that the holder connection can be restored, which has the effect of improving user convenience.

On the other hand, when tact and push non-racking are selected between the first changeover switch 300 and the second changeover switch 400 according to FIG. 9B1, the user rotates the door lock opening/closing means 200 upward, and converts the electrical contact of the first changeover switch 300 and the second changeover switch 400. The tact switch or push non-locking restores the contacts by itself. Therefore, the user of the present invention rotates and fixes the door lock opening/closing means 200 upward as shown in FIG. 9B2, and maintains the switching of the electrical contact between the first changeover switch 300 and the second changeover switch 400. Then, the emergency power supply for digital door lock 100 can be driven.

Then, after the password is confirmed and the latch bolt 90 is opened in the emergency power supply for digital door lock 100, the user returns the door lock opening/closing means 200 as shown in FIG. 9B3 to smoothly open/close the door.

Such tact or push non-locking switch maintains a switching state if the pressing state, and returns to the original state when the pressing is released. Therefore, the connection between the first battery holder 600 and the second battery holder 700 can be temporarily changed according to the situation of the emergency power supply. Therefore, even if the door lock opening/closing means 200 is accidentally moved upward and/or rotated, the battery connection is immediately switched to the normal state to prevent the circuit from being overloaded.

Figure 10A:
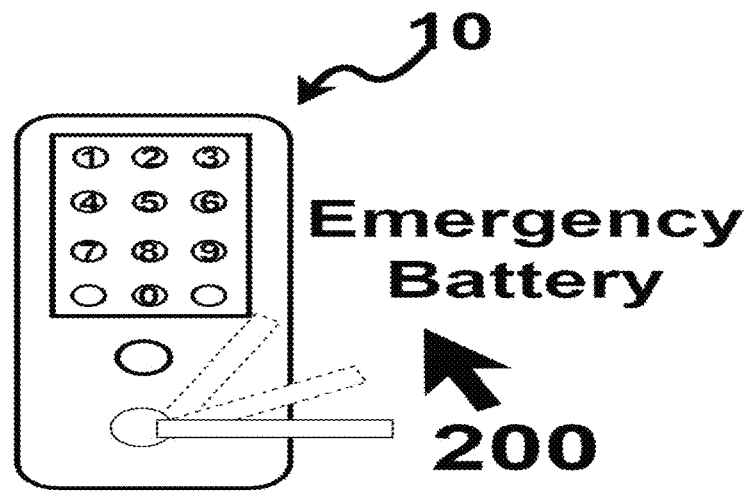
FIGS. 10A-10C show a driving process of the emergency power supply for digital door lock according to the first embodiment of the present invention.
Figure 10B:
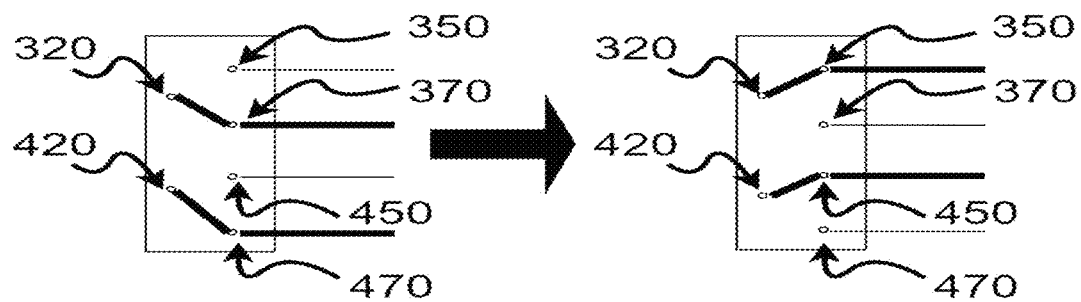
Figure 10C:
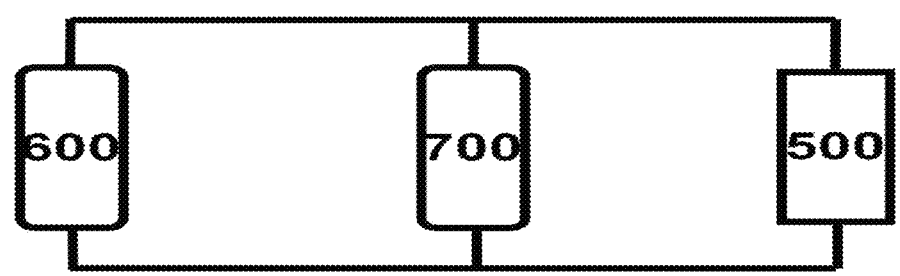

FIGS. 10A-10C show a driving process of the emergency power supply for digital door lock according to the first embodiment of the present invention.

For the preferred description of the present invention, FIG. 10A shows how the door lock opening/closing means 200 rotates upward, and FIG. 10B shows the electrical contacts are switched between the first changeover switch 300 and a second changeover switch 400. Then, FIG. 10C shows how the electrical connection between the first battery holder 600 and the second battery holder 700 is switched to the parallel. The current is shown by a thick solid line. According to FIG. 10A, when the door lock opening/closing means 200 of the emergency power supply for digital door lock 100 is rotated upward, the connection between the first battery holder 600 and the second battery holder 700 is switched from series to parallel. When the connection between the first battery holder 600 and the second battery holder 700 is converted from series to parallel, the strength of the current that moves to the motor drive module 500 is improved, energy loss is reduced, and the remaining battery 30 can supply.

When the connection of the first battery holder 600 and the second battery holder 700 is switched in parallel, the electric contact connected from the first common terminal 320 of the first changeover switch 300 is switched from the second output terminal 370 to the first output terminal 350. Then, the electric contact connected from the second common terminal 420 of the second changeover switch 400 is switched from the fourth output terminal 470 to the third output terminal 450. Therefore, as shown in FIG. 10C, the connection between the first battery holder 600 and the second battery holder 700 can be switched from series to parallel.

In this way, all the remaining power of the battery 30 provided inside the emergency power supply for digital door lock 100 can be used according to the connection change between the first battery holder 600 and the second battery holder 700.

Figure 11:
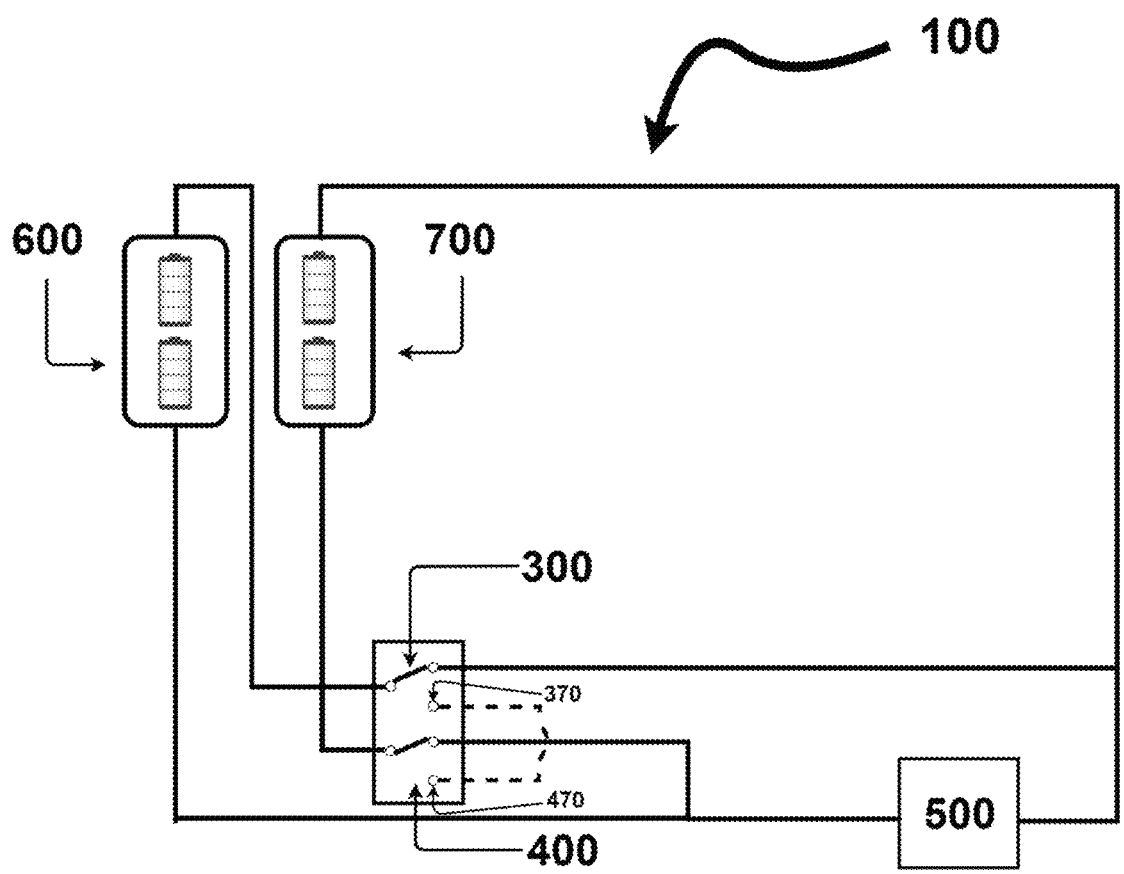
FIG. 11 shows a circuit diagram in which the first battery holder and the second battery holder of the emergency power supply for digital door lock according to the first embodiment of the present invention are connected in parallel.

FIG. 11 shows a circuit diagram in which the first battery holder and the second battery holder of the emergency power supply for digital door lock according to the first embodiment of the present invention are connected in parallel.

For the preferred description of the present invention, the movement path of the current will be described with a solid line, and the movement path without the current will be described with a broken line. The solid line shown in FIG. 11 is the movement of the current supplied from the first battery holder 600 and the second battery holder 700 when the door lock opening/closing means 200 is rotated upward. Further, as shown in FIG. 11, in the emergency power supply for digital door lock 100 according to the first embodiment of the present invention, the current moves along a solid line and is transmitted to the motor drive module 500. On the other hand, no current flows between the second output terminal 370 of the first changeover switch 300 and the fourth output terminal 470 of the second changeover switch 400.

Figure 12:
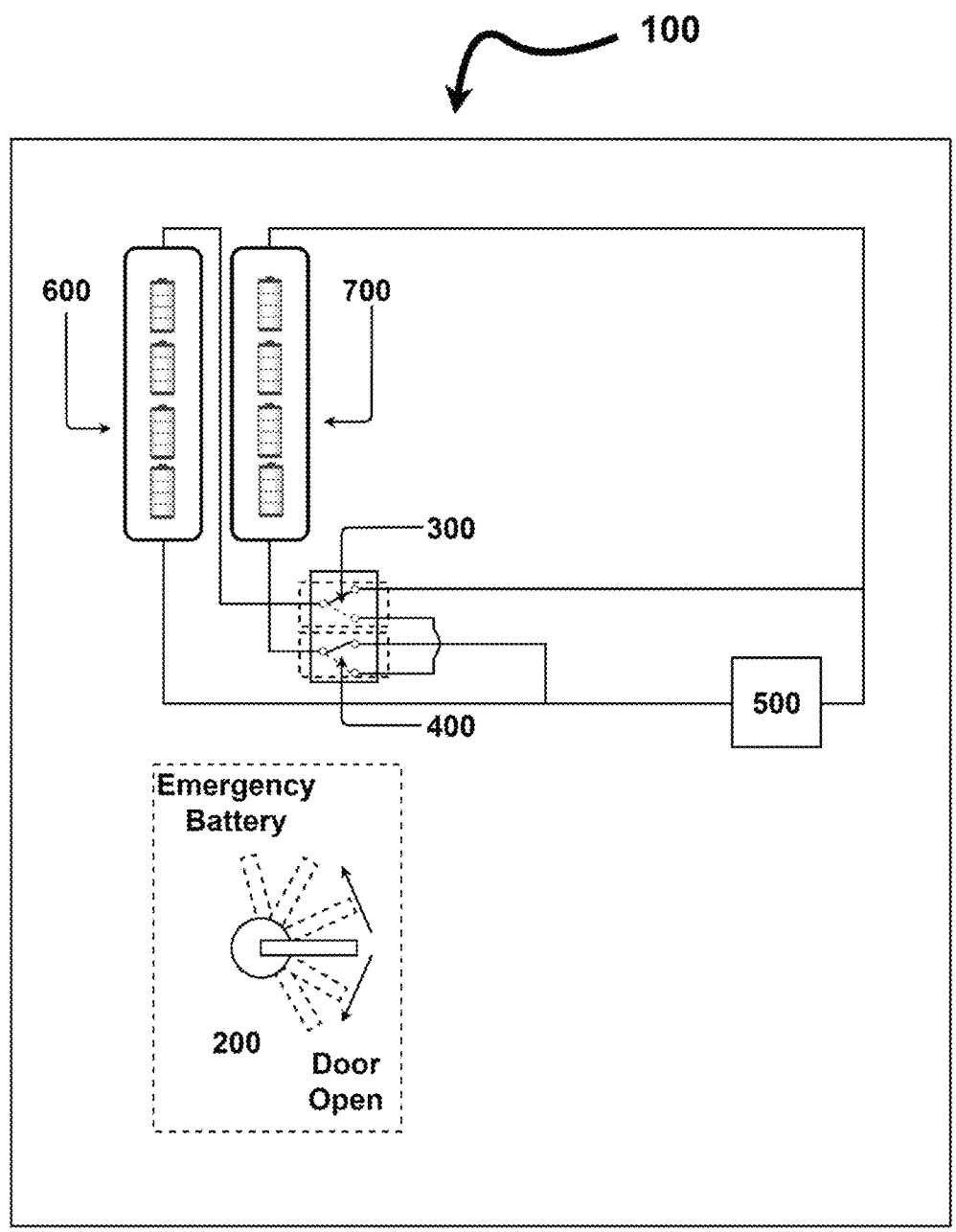
FIG. 12 shows a circuit diagram of the emergency power supply for digital door lock according to a second embodiment of the present invention.

FIG. 12 shows a circuit diagram of the emergency power supply for digital door lock according to a second embodiment of the present invention.

In the emergency power supply for digital door lock 100 according to the second embodiment of the present invention, the number of batteries 30 housed in the first battery holder 600 is four, and the number of batteries 30 housed in the second battery holder 600 is four. It can be different from the first embodiment. Therefore, as compared with the first embodiment, the number of batteries provided inside the digital door lock 10 increases, and the replacement cycle of the battery 30 is extended.

Further, in the emergency power supply for digital door lock 100 according to the second embodiment of the present invention, the first battery holder 600 and the second battery holder 700) can be connected emergency power supply for digital door lock according to the movement and/or rotation of the door lock opening/closing means 200. It differs from the first embodiment.

The emergency power supply for digital door lock 100 according to the second embodiment of the present invention converts the connection between the first battery holder 600 and the second battery holder 700 in series, and the voltage strength of the first battery holder 600 and the second battery holder 700 increases. Therefore, it provides a sufficient voltage to drive the stepping motor without driving the target voltage regulation circuit unit 550.

Figure 13A:
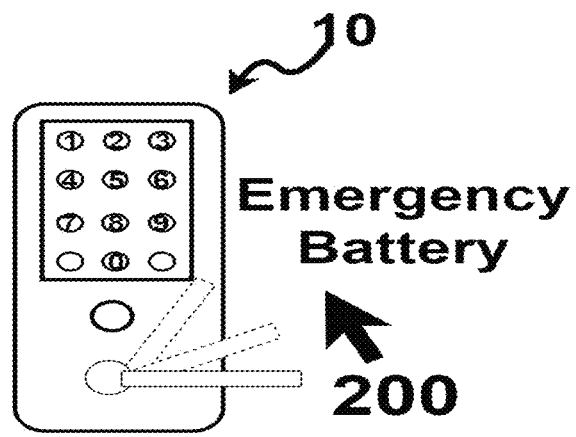
FIGS. 13A-13C show the movement of the door lock opening/closing means of the emergency power supply for digital door lock according to the second embodiment of the present invention and the driving process of the emergency power supply for digital door lock.
Figure 13B:
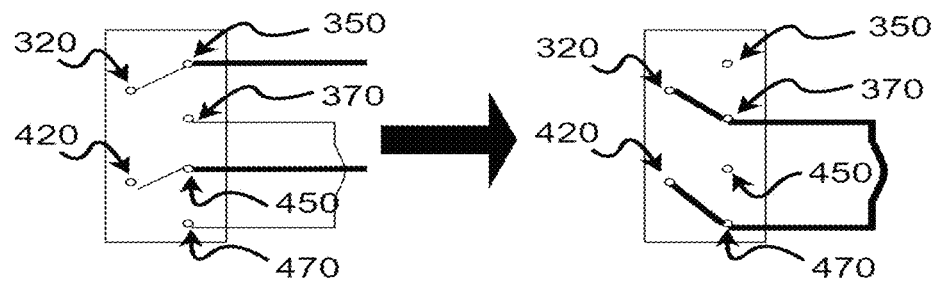
Figure 13C:
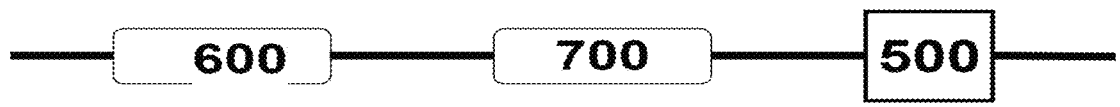

FIGS. 13A-13C show the movement of the door lock opening/closing means of the emergency power supply for digital door lock according to the second embodiment of the present invention and the driving process of the emergency power supply for digital door lock.

For the preferred description of the emergency power supply for digital door lock 100 according to the second embodiment of the present invention, FIG. 13A shows how the door lock opening/closing means 200 rotates upward, and FIG. 13B shows the electrical contact switched between the first changeover switch 300 and the second changeover switch 400. FIG. 13C shows how the electrical connection between the first battery holder 600 and the second battery holder 700 is switched in series.

When the door lock opening/closing means 200 according to the second embodiment of the present invention is rotated upward, the connection between the first battery holder 600 and the second battery holder 700 is switched from parallel to series, and the remaining power of the battery 30 can be used, in the discharged situation.

Further, when the door lock opening/closing means 200 rotates upward according to FIG. 13B, the electric contact connected from the first common terminal 320 of the first changeover switch 300 is switched to the second output terminal 370 at the first output terminal 350. And, the electric contact connected from the second common terminal of the second changeover switch 400 is switched from the third output terminal 450 to the fourth output terminal 470. Therefore, according to FIG. (C), the electrical movement is switched from the second output terminal 370 to the fourth output terminal 470, and the connection between the first battery holder 600 and the second battery holder 700 is in series to supply emergency power.

Figure 14:
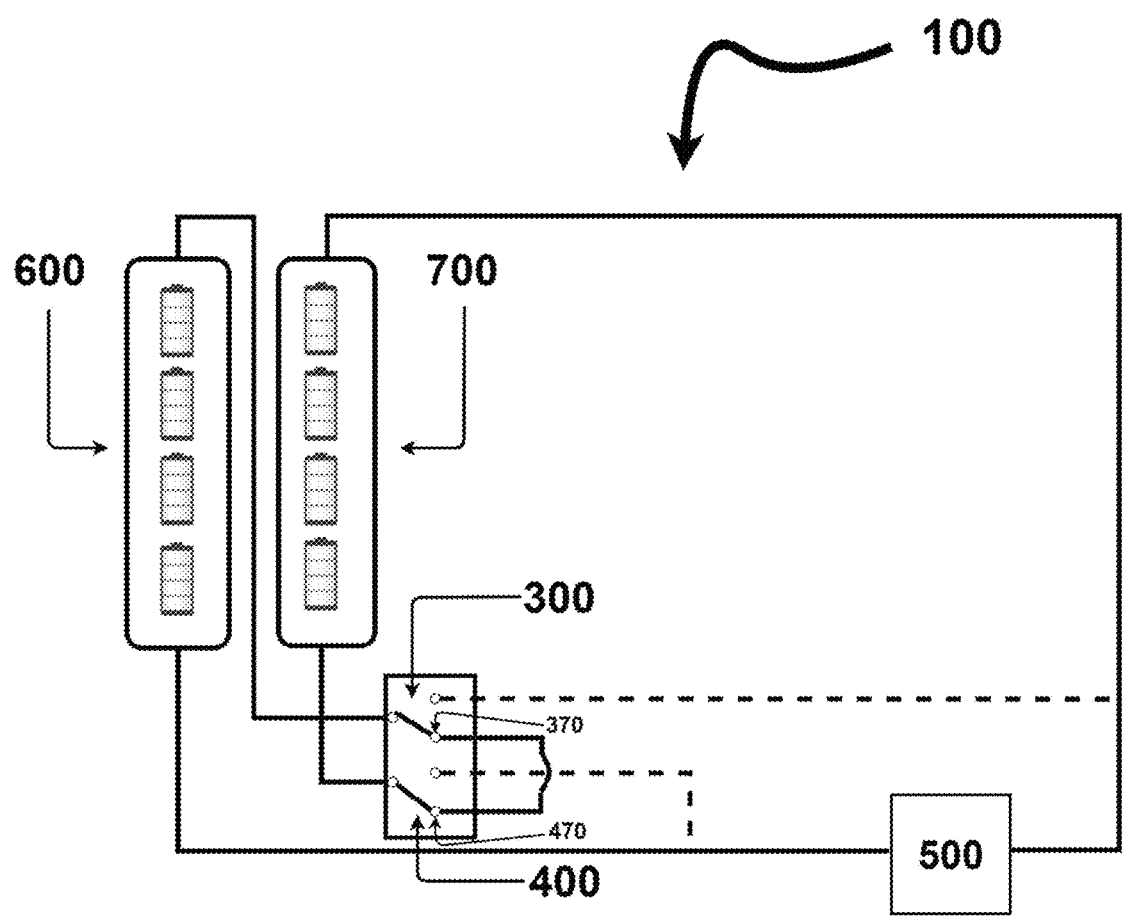
FIG. 14 is a circuit diagram in which the first battery holder and the second battery holder of the emergency power supply for digital door lock according to the second embodiment of the present invention are connected in series.

FIG. 14 is a circuit diagram in which the first battery holder and the second battery holder of the emergency power supply for digital door lock according to the second embodiment of the present invention are connected in series.

For the preferred description of the present invention, the transfer of current between the first battery holder 600 and the second battery holder 700 according to the second embodiment is shown by a solid line. Then, the moving path through which the current does not flow is shown by a broken line. The solid line in FIG. 14 is the current discharged from the first battery holder 600 and the second battery holder 700 when the door lock opening/closing means 200 is rotated upward. As shown in FIG. 14, the second output terminal 370 of the first changeover switch 3000 and the fourth output terminal 470 of the second changeover switch 400 are connected to each other. When the electrical contact between the first changeover switch 300 and the second changeover switch 400 is switched between the second output terminal 370 and the fourth output terminal 470, the connection between the first battery holder 600 and the second battery holder 700 is converted in series.

Figure 15:
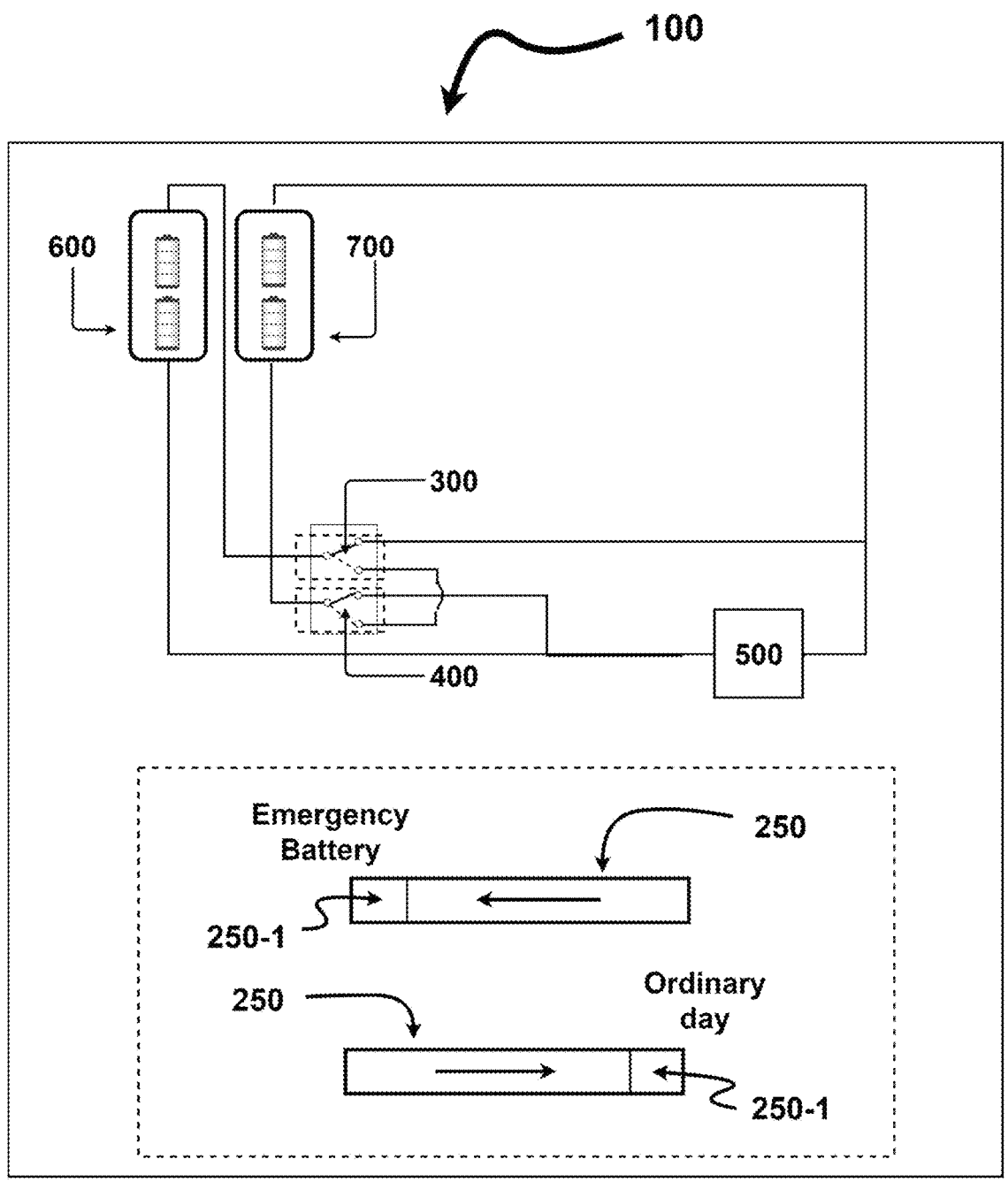
FIG. 15 shows a circuit of the emergency power supply for digital door lock according to a third embodiment of the present invention.

FIG. 15 shows a circuit of the emergency power supply for digital door lock according to a third embodiment of the present invention.

In the emergency power supply for digital door lock 100 according to the third embodiment of the present invention, the electrical contact between the first changeover switch 300 and the second changeover switch 400 is switched by the emergency switch 250. The emergency switch 250 according to the third embodiment of the present invention may be a slide switch or a toggle switch. However, the emergency switch according to the third embodiment of the present invention is not limited to the slide switch or the toggle switch.

The emergency switch 250 according to the third embodiment of the present invention is driven so that a operation unit 250-1 moves left and right. More specifically, when the battery 30 provided in the emergency power supply for digital door lock 100 according to the third embodiment of the present invention is discharged, the operation unit 250-1 of the emergency switch 250 is moved left and right as shown in FIG. Then, the connection between the first battery holder 600 and the second battery holder 700 can be switched from series to parallel or from parallel to series.

Figure 16A:
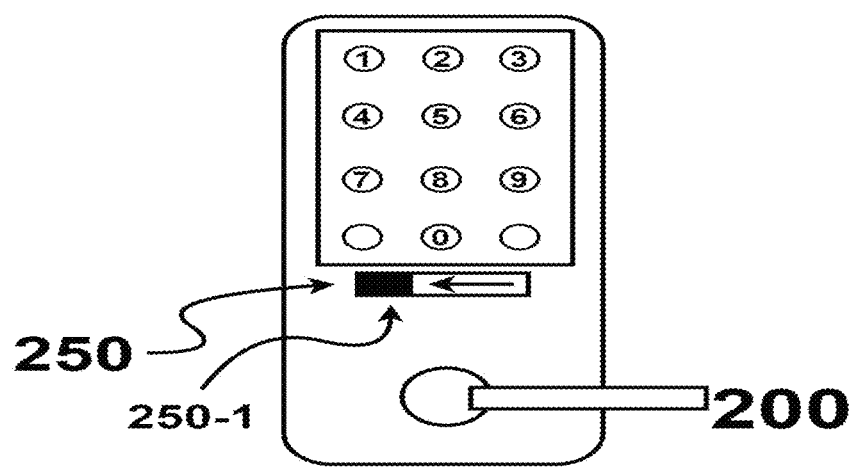
FIGS. 16A-16B show the outer surface of the emergency power supply for digital door lock with an emergency switch according to a third embodiment of the present invention.
Figure 16B:
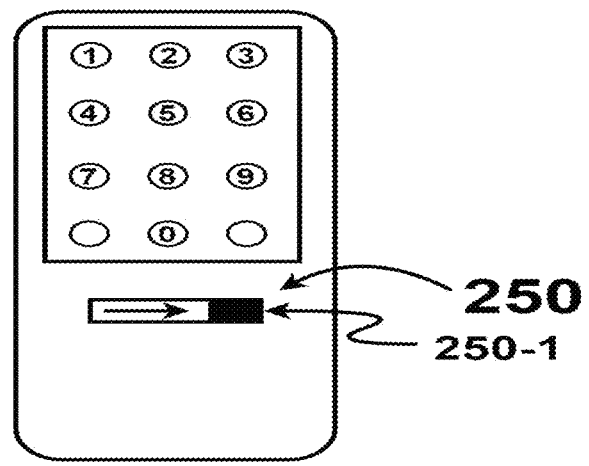

FIGS. 16A-16B show the outer surface of the emergency power supply for digital door lock with an emergency switch according to a third embodiment of the present invention.

The connection method between the first battery holder 600 and the second battery holder 700 in the emergency power supply for digital door lock 100 according to the third embodiment of the present invention is performed in series or in parallel. The connection between the first battery holder 600 and the second battery holder 700 can be switched from series to parallel or from parallel to series according to the movement of the operation unit 250-1 in the emergency switch 250.

FIG. 16A shows how the emergency power supply for digital door lock 100 according to the third embodiment of the present invention includes the door lock opening/closing means 200. FIG. 16B shows the form of a touch screen that is not provided with the door lock opening/closing means 200 and does not have any terminal and handle form on the outer surface. Therefore, the emergency power supply for digital door lock 100 according to the third embodiment of the present invention can provide a beautiful and practical appearance as it is.

Figure 17:
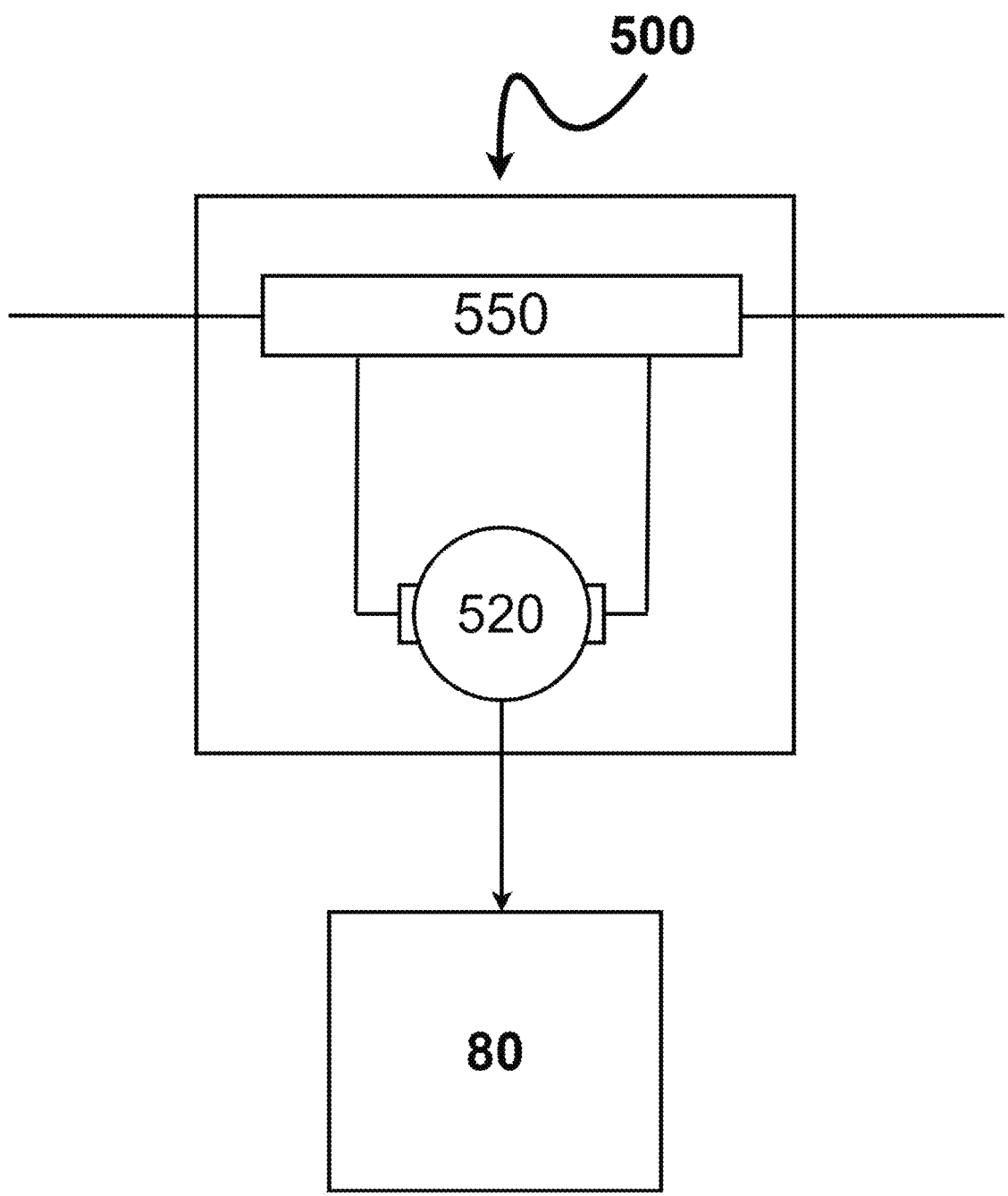
FIG. 17 shows a component of a motor drive module which is a component of the emergency power supply for digital door lock of the present invention.

FIG. 17 shows a component of a motor drive module which is a component of the emergency power supply for digital door lock of the present invention.

The motor drive module 500 adjusts the current transferred from the latch bolt operating unit 520, the first battery holder 600, and the second battery holder 700 to a predetermined voltage value. The motor drive module 500 can include a target voltage regulation circuit unit 550 that supplies a voltage to the latch bolt operating unit 520. The motor drive module 500 of the digital door lock emergency power supply 100 of the present invention is based on the voltage of the current moving from the latch bolt actuating portion 520, the first battery holder 600, and the second battery holder 700. It can consist of the configuration of the target voltage adjusting circuit unit 550 that adjusts to the set voltage value and supplies it to the latch bolt operating unit 520. Further, the latch bolt operating unit 520 to which electric power is applied from the target voltage regulation circuit unit 550 at a preset voltage can move the latch bolt 80 inside the digital door lock device 10 to open the door. The voltage preset in the target voltage regulation circuit unit 550 is 3 volts or 6 volts, which is an appropriate voltage for driving the latch bolt operating unit 520.

Figure 18:
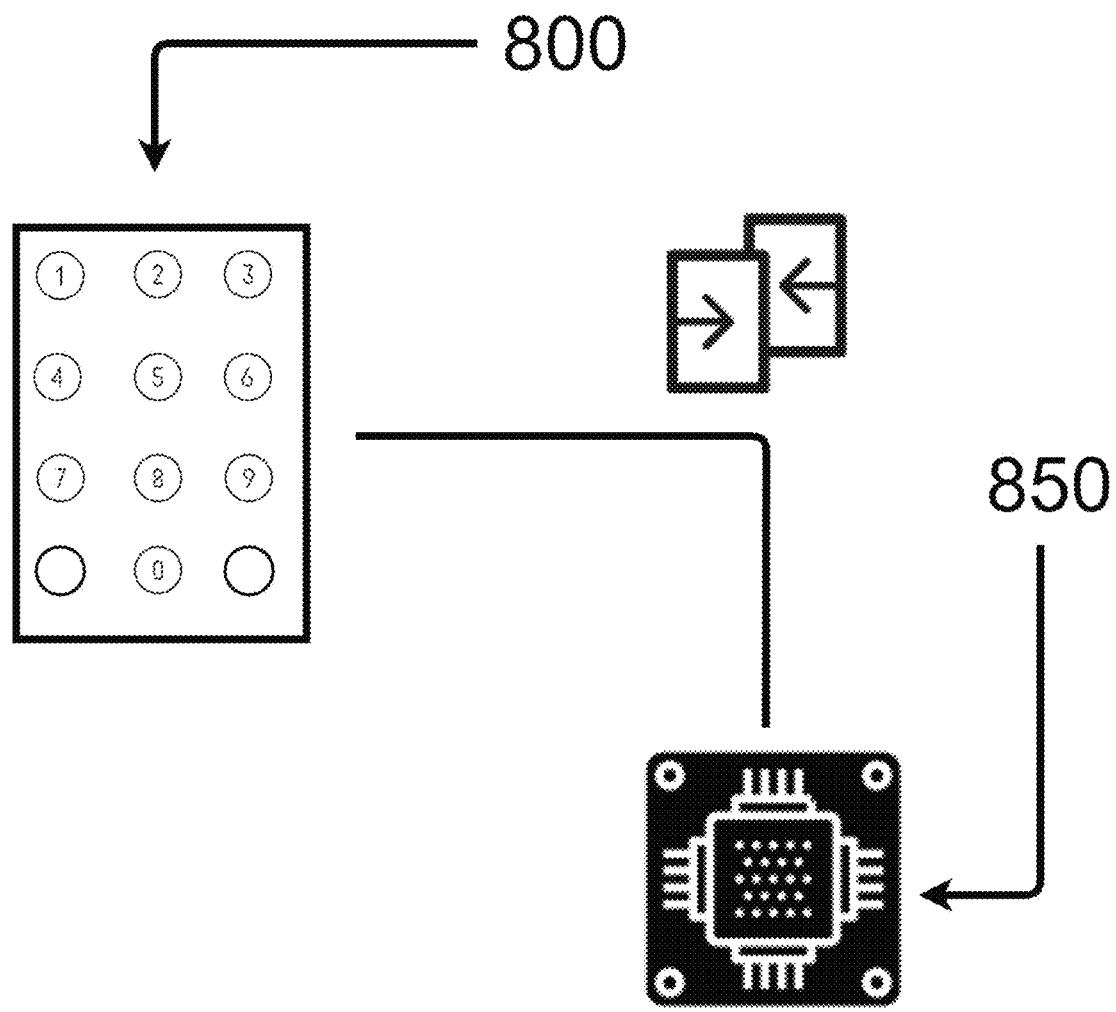
FIG. 18 shows the configuration of a password input unit and an internal circuit unit, which are components of the emergency power supply for digital door lock of the present invention.

FIG. 18 shows the configuration of a password input unit and an internal circuit unit, which are components of the emergency power supply for digital door lock of the present invention.

The emergency power supply for digital door lock 100 of the present invention determines whether or not the input number received by the password input unit 800 matches the password for which the password has been set. The emergency power supply for digital door lock 100 further includes an internal circuit unit 850 that adjusts so that power is supplied to the motor drive module 500 when the preset password match the password received by the password input unit 800. The proper voltage for driving the internal circuit unit 850 may be a preset voltage value of 3 volts.

Figure 19:
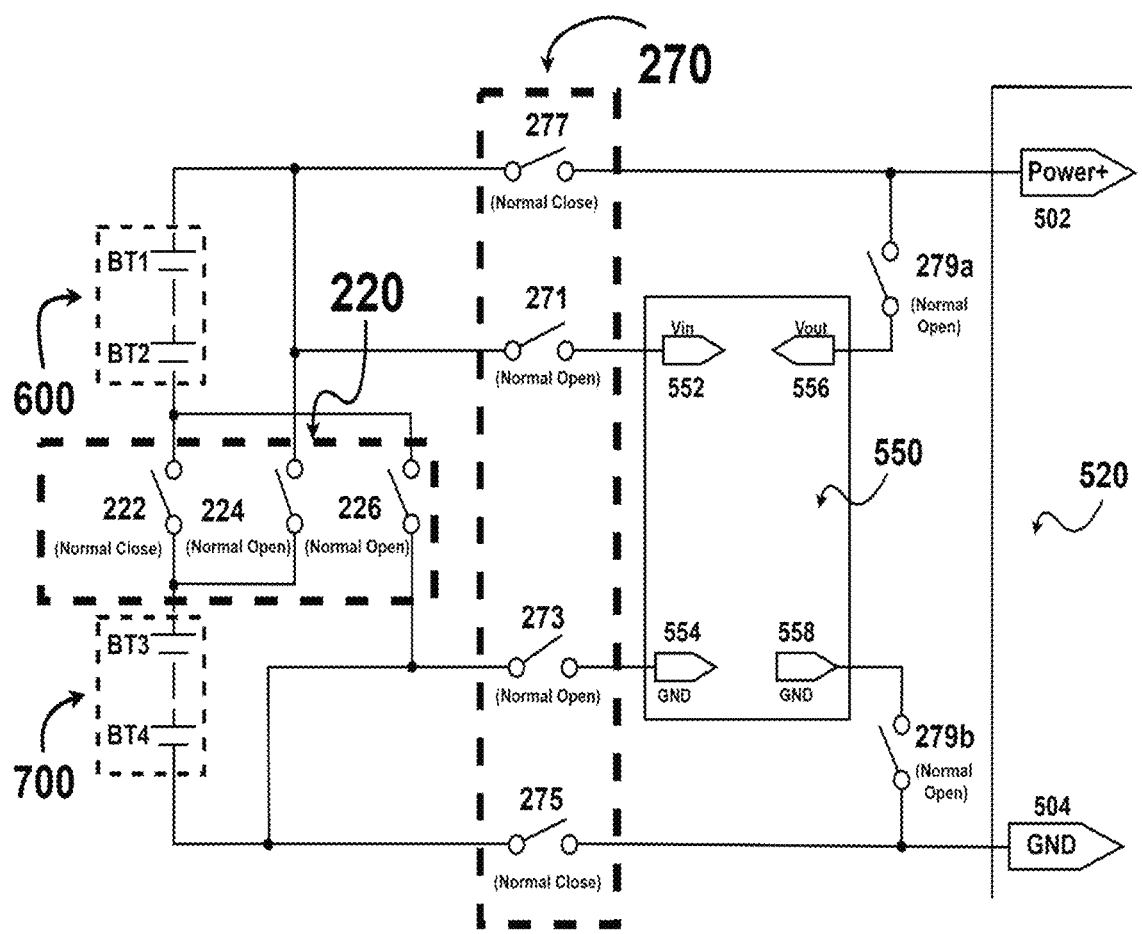
FIG. 19 shows a circuit diagram of the emergency power supply for digital door lock to a fourth embodiment of the present invention.

FIG. 19 shows a circuit diagram of the emergency power supply for digital door lock to a fourth embodiment of the present invention.

The emergency power supply for digital door lock 100 according to a fourth embodiment of the present invention includes a first battery holder 600 capable of accommodating one or more batteries, and a second battery holder 700 accommodating one or more batteries. Further, the emergency power supply for digital door lock 100 can further include a series-parallel changeover switch module 220 and a voltage regulating circuit selection switch module 270. And this part may be different from the said embodiment.

The series-parallel changeover switch module 220 according to FIG. 19 includes a first switch 222, a second switch 224, and a third switch 226. Looking at the connection form of the series-parallel changeover switch module 220, one end of the first switch 222 is connected to the other end of the first battery holder 600, and the other end of the first switch 222 is connected to one end of the second end of the second battery holder 700. Further, one end of the second switch 224 is connected to one end of the first battery holder 600, the other end of the second switch 224 is connected to one end of the second battery holder 700, one end of the third switch 226 is the other end of the first battery holder 600, and the other end of the third switch 226 is connected to the other end of the second battery holder 700. Therefore, the connection of the first battery holder 600 and the 2nd battery holder 700 can be converted in series or from series to parallel according to the opening and shorting of the first switch 222, the second switch 224, and the third switch 226.

Further, the voltage regulating circuit selection switch module 270 according to FIG. 19 can include a fourth switch 271, a fifth switch 273, a sixth switch 275, and a seventh switch 277. Looking at the connection form of the voltage regulating circuit selection switch module 270, one end of the fourth switch 271 is connected to one end of the first battery holder 600, and the other end of the fourth switch 271 is connected to a first input terminal 552 of the target voltage regulation circuit unit 550. Further, one end of the fifth switch 273 is connected to the other end of the second battery holder 700, and the other end of the fifth switch 273 is connected to the second input terminal 554 of the target voltage regulation circuit unit 550.

Further, one end of the sixth switch 275 is connected to one end of the second battery holder 600, and the other end of the sixth switch 275 is connected to the second input terminal 504 of the latch bolt actuating portion 520. Finally, one end of the seventh switch 277 is connected to one end of the first battery holder 600, and the other end of the seventh switch 277 is connected to the first input 502 of the latch bolt operating unit 520.

Therefore, in response to the opening and shorting of the fourth switch 271, the fifth switch 273, the sixth switch 275, and the seventh switch 277, the voltage output from the first battery holder 600 and the second battery holder 700 applied to the latch bolt operating unit 520. Then, in this process, the target voltage regulation circuit unit 550 is selectively passed.

Further, in the voltage regulating circuit selection switch module 270, the eighth switch 279*a* and the ninth switch 279*b* may be selectively added. One end of the eighth switch 279*a* is connected to the first input end 502 of the latch bolt operating unit 520, and the other end of the eighth switch 279*a* is connected to the first output end 556 of the target voltage regulation circuit unit 550. Further, one end of the ninth switch 279*b* is connected to the second output end 558 of the target voltage regulation circuit unit 550, and the other end of the ninth switch 279*b* is connected to the second output end 504 of the latch bolt operating unit 520.

Therefore, when the first battery holder 600 and the second battery holder 700 are connected in series, the current selectively flows into the target voltage regulation circuit unit 550. Preferably, when the series-parallel changeover switch module 270 switches the first battery holder 600 and the second battery holder 700 from series to parallel, the eighth switch 279*a* and the ninth switch 279*b* are shorted. Then, the power source is applied to the latch bolt operating unit 520 via the target voltage regulating circuit unit 550. When the series-parallel changeover switch module 270 switches the first battery holder 600 and the second battery holder 700 from parallel to series, the eighth switch 279*a* and the ninth switch 279*b* are opened. Then, the power source is directly applied to the latch bolt operating unit 520 without going through the target voltage regulating circuit portion 550.

Figure 20:
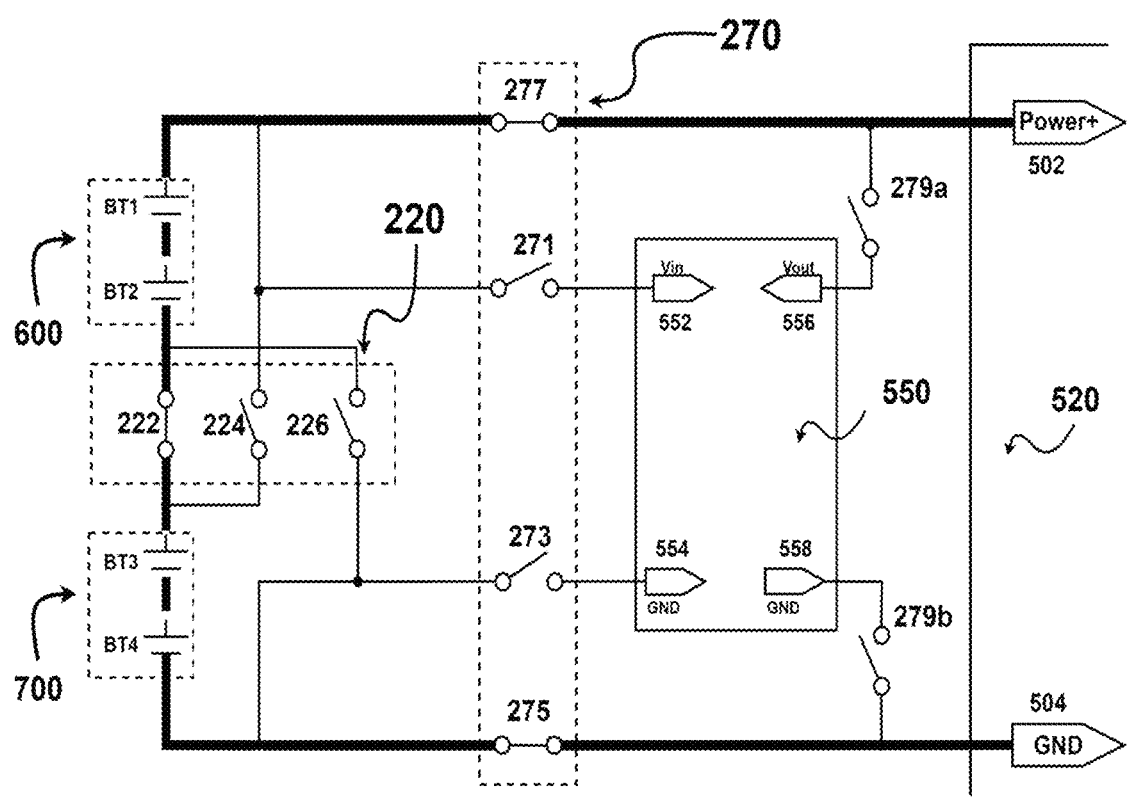
FIG. 20 shows a state in which the first battery holder and the second battery holder of the digital door lock emergency power supply device according to the fourth embodiment of the present invention are switched in series.

FIG. 20 shows a state in which the first battery holder and the second battery holder of the digital door lock emergency power supply device according to the fourth embodiment of the present invention are switched in series.

For the preferred description of the invention, the current transfer is shown by a thick solid line. The series-parallel changeover switch module 220 and the voltage regulating selection switch module 270 according to the fourth embodiment of the present invention connects a first battery holder 600 and a second battery holder in series by operating the door lock opening/closing means 200 or the emergency switch 250.

The first switch 222, the sixth switch 275, and the seventh switch 277 of the series-parallel changeover switch module 220 according to FIG. 20 are NC (Normally Closed) type, and are shorted (Closed) in series, and current flows through the wire. On the other hand, the second switch 224, the third switch 226, the fourth switch 271, and the fifth switch 273 are NO (Normally Open) type. Therefore, in FIG. 20, the wires connected to the second switch 224, the third switch 226, the fourth switch 271, and the fifth switch 273 are opened and no current flows. Further, when the first battery holder 600 and the second battery holder 700 are switched from parallel to series, it is not necessary to operate the target voltage regulating circuit unit 550, and the eighth switch 279*a* and the ninth switch 279*b* immediately open. Then, the current flows through the latch bolt operating unit 520.

Figure 21:
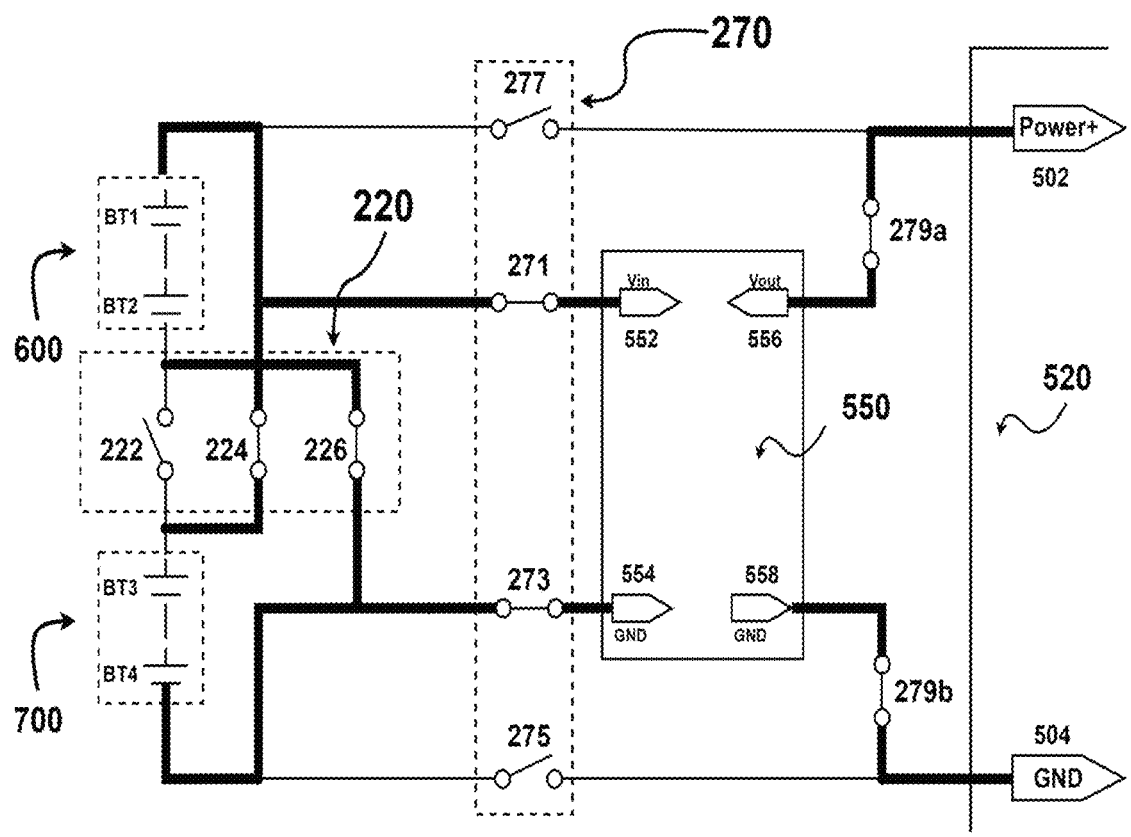
FIG. 21 shows a state in which the first battery holder and the second battery holder of the emergency power supply for digital door lock according to the fourth embodiment of the present invention are switched in parallel.

FIG. 21 shows a state in which the first battery holder and the second battery holder of the emergency power supply for digital door lock according to the fourth embodiment of the present invention are switched in parallel.

The series-parallel changeover switch module 220 and the voltage regulating selection switch module 270 according to the fourth embodiment of the present invention are driven by the door lock opening/closing means 200 or the emergency switch 250. As a result, the first battery holder 600 and the second battery holder 700 can be switched from series to parallel. As can be seen from FIG. 21, the first switch 222, the sixth switch 275, and the seventh switch 277 switch from a short-circuited state to an open state (that is, a state in which no current flows). On the other hand, the second switch 224, the third switch 226, the fourth switch 271, and the fifth switch 273 switch from the open state to the short-circuit state, and current flows through the circuit. Therefore, when the first switch 222, the sixth switch 275, and the seventh switch 277 are opened and the second switch 224, the third switch 226, the fourth switch 271, and the fifth switch 273 are shorted, the other end of the first battery holder 600 and the other end of the second battery holder 700 are connected by the third switch 226. Then, one end of the first battery holder 600 and one end of the second battery holder 700 are switched to a parallel state in which the same poles are connected by the second switch 224.

According to FIG. 21, the wire connected to the second switch 224 is connected to one end of the fourth switch 271, and the other end of the fourth switch 271 is connected to the first input terminal 552 of the target voltage regulation circuit unit 550. Further, the wire connected to the third switch 226 is connected to one end of the fifth switch 273. The other end of the fifth switch 273 is connected to the second input terminal 554 of the target voltage regulation circuit unit 550. Therefore, the circuit is configured to supplement the voltage according to the parallel connection between the first battery holder 600 and the second battery holder 700.

Figure 22:
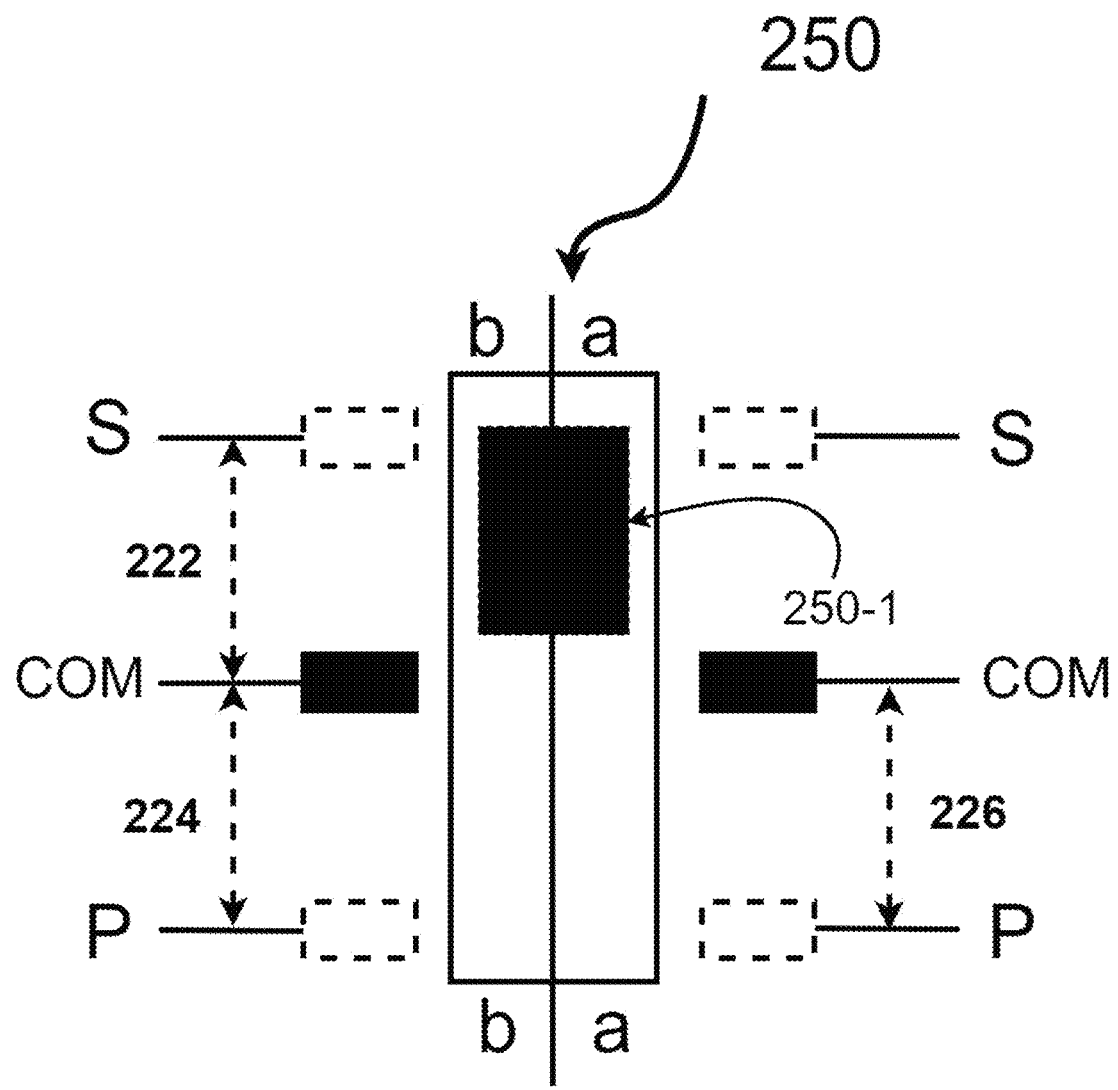
FIG. 22 shows how the emergency power supply for digital door lock according to the fourth embodiment of the present invention employs an emergency switch.

FIG. 22 shows how the emergency power supply for digital door lock according to the fourth embodiment of the present invention employs an emergency switch.

According to the fourth embodiment of the present invention, the series switching switch module 220 and/or the voltage regulating circuit selection switch module 270 is controlled according to the operation of the emergency switch 250. The series-parallel changeover switch module 220 includes the first switch 222, the second switch 224, and the third switch 226. The voltage regulating circuit selection switch module 270 includes the fourth switch 271, the fifth switch 273, the sixth switch 275, and the seventh switch 277.

Therefore, a total of seven switches are provided until the connection between the first battery holder 600 and the second battery holder 700, and the target voltage regulation circuit unit 550 are determined to be applied. Operating the seven switches individually is very impractical and can lead to increased manufacturing costs depending on the number of switches.

However, the emergency power supply for digital door lock 100 according to the fourth embodiment of the present invention can operate a total of seven switches at the same time by operating the emergency switch 250. Therefore, convenience is improved. Then, since the seven switches are replaced with the emergency switch 250, the space efficiency is improved.

According to FIG. 22, one end (a) and the other end (b) of the emergency switch 250 are separated. This means that even if the operation unit 250-1 inside the emergency switch 250 is connected to the wire S, the wire S, and the wire COM, one end a and the other end b are not electrically connected. For example, the wire (S) located at one end (a) and the wire (S) located at the other end (b) cannot be electrically connected.

However, the wire S, the wire P, and the wire COM included in one end a of the emergency switch 250 are connected to each other according to the movement of the operation unit 250-1. Also, on the other end surface b are connected to the wire S and the wire COM or the wire P and the wire COM according to the movement of the operation unit 250-1.

Like one end (a), the other end (b) of the emergency switch 250 is also connected to the wire S and the wire COM or the wire P and the wire COM according to the movement of the operation unit 250-1.

Further, the wire COM is electrically connected regardless of the connection between the first battery holder 600 and the second battery holder 700. However, the wire S and the wire P may be an open circuit in which a current flows with the movement of the operation unit 250-1, or a closed circuit in which a current does not flow.

In FIG. 22, the connection between the wire S located at the other end (b) of the emergency switch 250 and the wire COM means a short circuit of the first switch 222. The connection between the wire COM and the wire P located on the other end surface of the emergency switch 250 means that the second switch 224 is opened. Further, the connection between the wire COM located at one end (a) of the emergency switch 250 and the wire P means the opening of the third switch 226.

In the movement of the operation unit 250-1 of the emergency switch 250 described above, switching of the first switch 222, the second switch 224, the third switch 226, the fourth switch 271, the fifth switch 273, the sixth switch 275, and the seventh switch 277 can also be performed by the door lock opening/closing means 200.

Figure 23A:
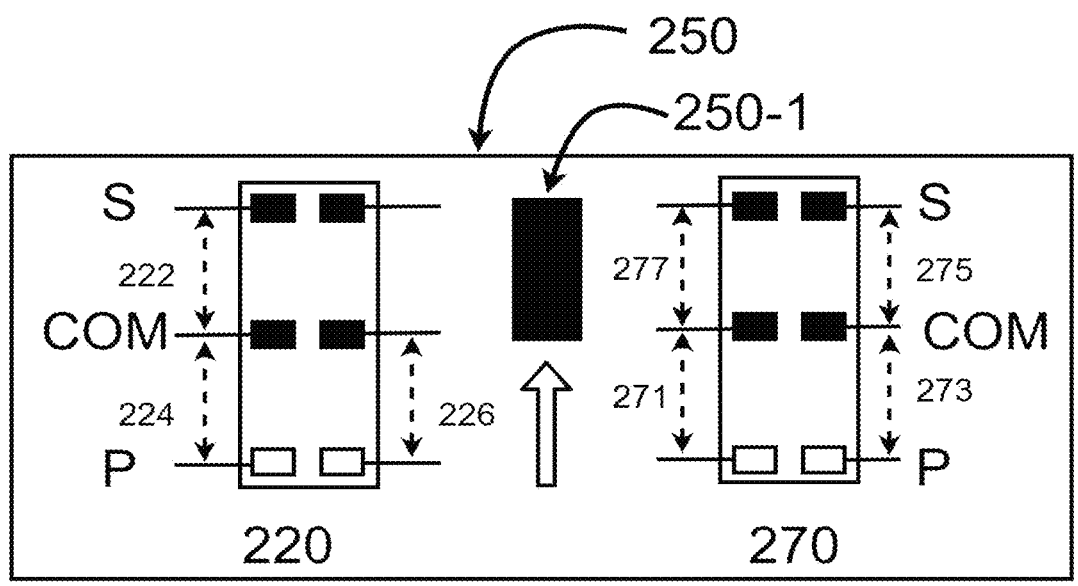
FIGS. 23A-23B show the driving of an emergency switch provided in the emergency power supply for digital door lock according to a fourth embodiment of the present invention.
Figure 23B:
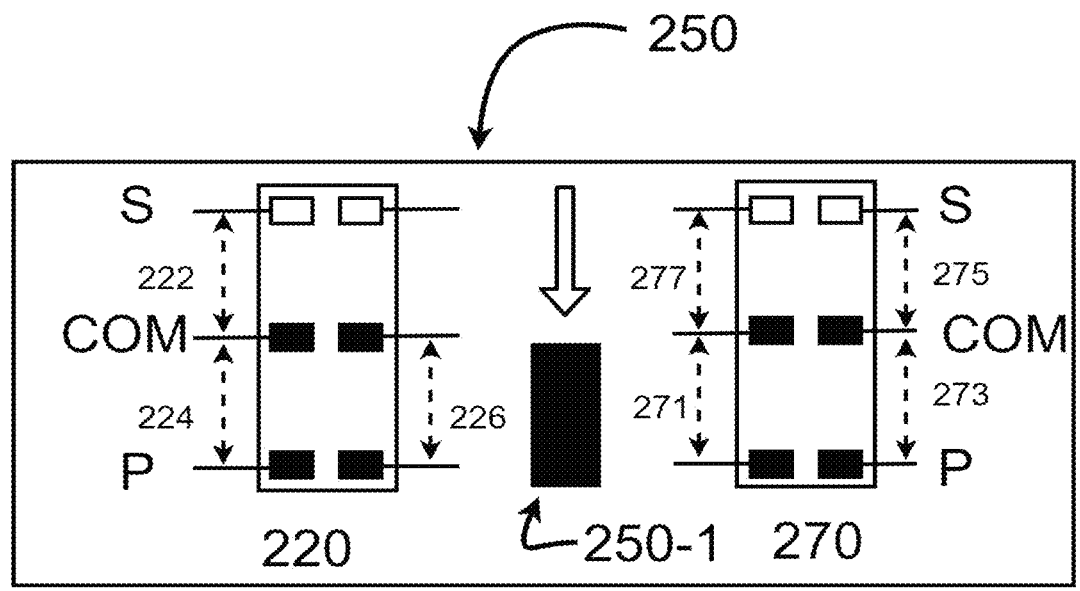

FIGS. 23A-23B show the driving of an emergency switch provided in the emergency power supply for digital door lock according to a fourth embodiment of the present invention.

FIG. 23A shows how the operation unit 250-1 included in the emergency switch 250 is switched from parallel to series. Then, FIG. 23B shows how the operation unit 250-1 is switched from series to parallel.

According to FIGS. 23A-23B, the series-parallel changeover switch module 220 and the voltage regulating circuit selection switch module 270 can both be controlled according to one emergency switch 250. When the operation unit 250-1 is moved upward according to FIG. 23A, the wire S and the wire COM of the series-parallel changeover switch module 220 and the voltage regulating circuit selection switch module 270 are connected to each other.

In FIG. 23A, this means that the wire S and the first switch 222, the sixth switch 275, and the seventh switch 277 included in the wire COM are shorted. The conductor P means that the operation unit 250-1 is not located and is not connected to the conductor COM. Therefore, the second switch 224, the third switch 226, the fourth switch 271, and the fifth switch 273 located between the wire P and the wire COM are opened. As a result, the first battery holder 600 and the second battery holder 700 are switched from parallel to series.

In FIG. 23B, since the operation unit 250-1 is not located between the wire S and the wire COM, the first switch 222, the sixth switch 275, and the seventh switch 277 are open. And, the second switch 224, the third switch 226, the fourth switch 271, and the fifth switch 273 located between the wire P and the wire COM are shorted. Therefore, it means that the first battery holder 600 and the second battery holder 700 are switched from series to parallel.

Figure 24:
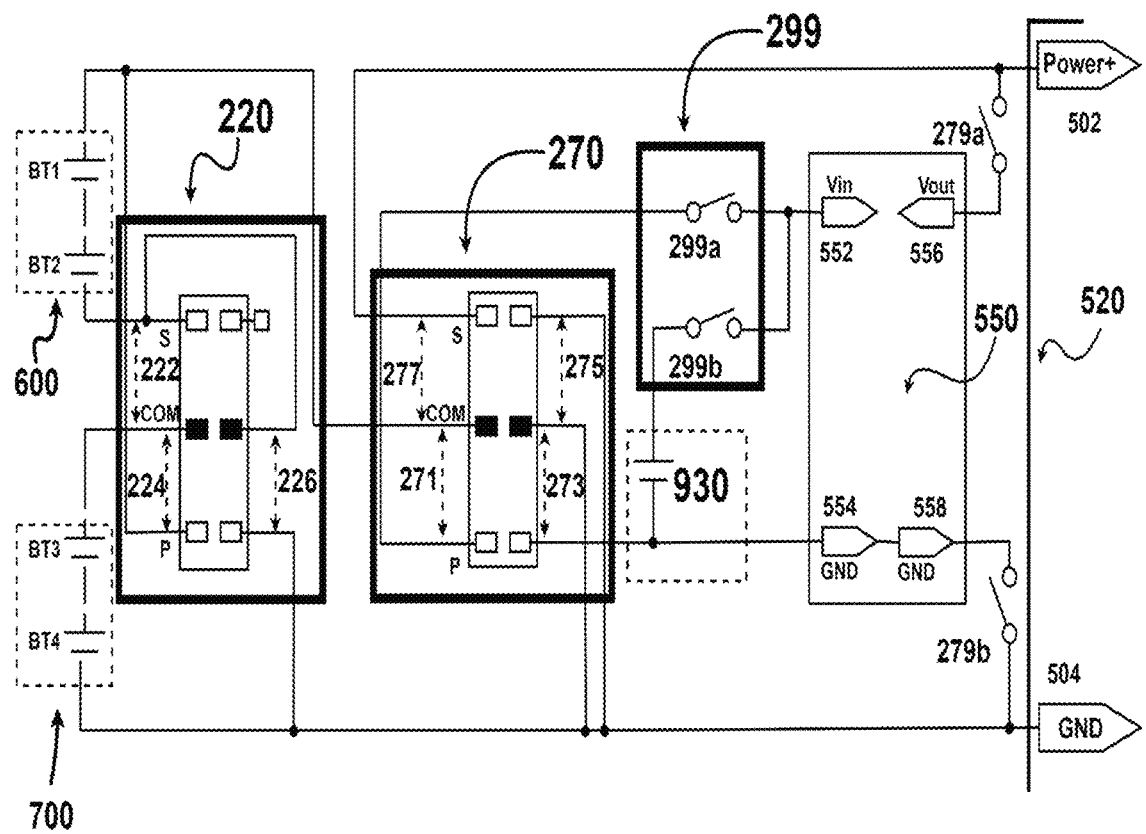
FIG. 24 shows a circuit diagram of the emergency power supply for digital door lock according to a fifth embodiment of the present invention.

FIG. 24 shows a circuit diagram of the emergency power supply for digital door lock according to a fifth embodiment of the present invention.

FIG. 24 shows that the emergency switch 250 described in FIGS. 23A-23B can be applied to FIG. 24. In addition, FIG. 24 further includes an external battery insertion holder 930. After using both the remaining batteries 30 provided in the first battery holder 600 and the second battery holder 700, the external power charging unit can be supplied power from a rechargeable battery connected in parallel with is an external battery insertion unit holder 930 located on the outer surface of the emergency power supply for digital door lock 100. Further, when the external power drive switch 940 is pressed on the outer surface of the emergency power supply for digital door lock 100, power can be supplied by the emergency power generation unit. The emergency power generation unit can include a piezoelectric element that generates power by itself.

Further, when the external battery insertion holder 930 according to FIG. 24 is added, the external power switch module 299 can be further provided. The external power switch module 299 can include a tenth switch 299a and an eleventh switch 299b. According to FIG. 24, one end of the tenth switch 299a is connected to the other end of the seventh switch 277 of the voltage regulating circuit selection switch module 270, and the other end of the 10 switch 299a is connected to the first input terminal 552 of the target voltage regulation circuit 550. Then, one end of the eleventh switch 299b is connected to one end of the external battery insertion holder 930, and the other end of the eleventh switch 299b is connected to the first input terminal 552 of the target voltage regulation circuit 550.

Therefore, the external power switch module 299 selectively distinguishes between the electric power supplied from the first battery holder 600 and the second battery holder 700 and the electric power supplied from the external battery insertion holder 930. For example, when using both the remaining batteries of the first battery holder 600 and the second battery holder 700, the tenth switch 299 of the external power switch module 299, electrically connected to the first battery holder 600 and the second battery holder 700, is opened. Then, the eleventh switch 299b electrically connected to the external battery insertion holder 930 is shorted, and the electrical connection between the first battery holder 600 and the second battery holder 700 is cut off. Therefore, the electric power supplied from the inserted battery 30 of the external battery insertion holder 930 is supplied from the external battery insertion holder 930 to the target voltage regulation circuit 550 via the eleventh switch 299b.

On the contrary, when the battery 30 is removed from the external battery insertion holder 930, the tenth switch 299a electrically connected to the first battery holder 600 and the second battery holder 700 is shorted, and The eleventh switch 299b connected to the external battery insertion holder 930 is opened. Therefore, power is further supplied from the external battery insertion holder 930 via the tenth switch 299a connected to the first battery holder 600 and the second battery holder 700.

Figure 25:
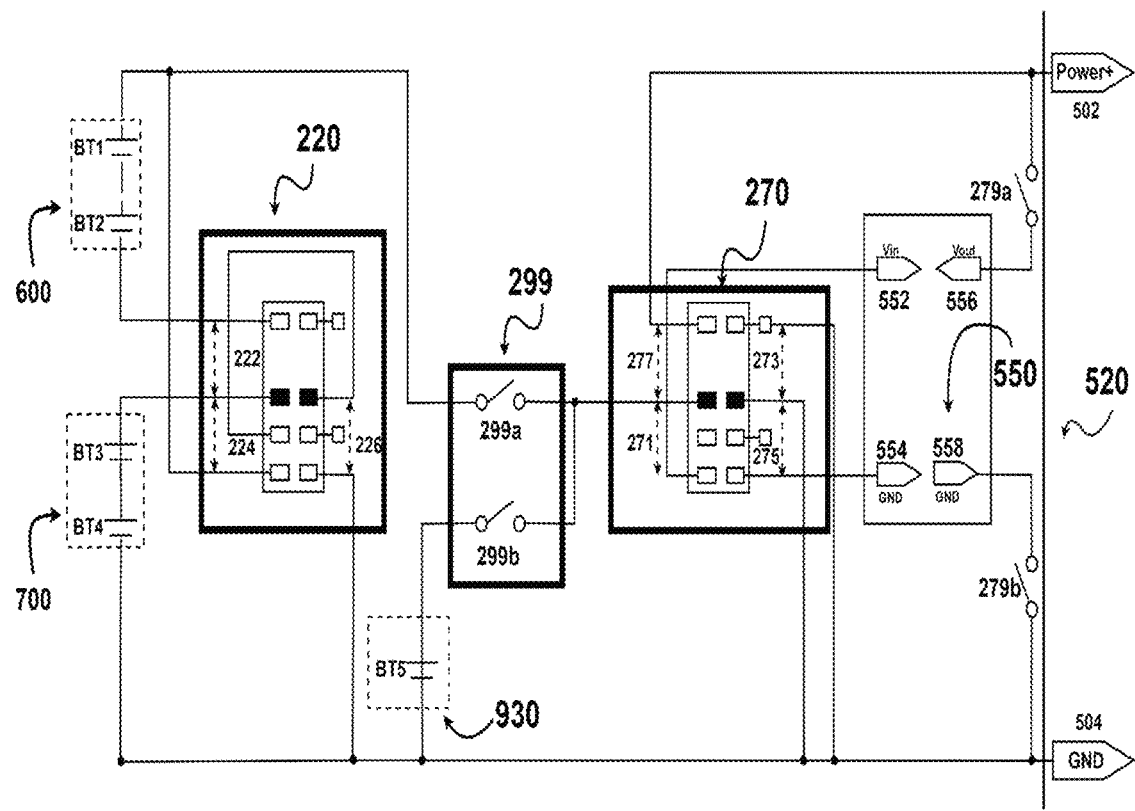
FIG. 25 shows a circuit diagram of the emergency power supply for digital door lock according to another embodiment of the fifth embodiment of the present invention.

Further, it is also possible to charge the rechargeable battery provided inside the emergency power supply for digital door lock 100 by the piezoelectric element of the emergency power generation unit 910, and supply electric power to the external battery insertion holder 930. FIG. 25 shows a circuit diagram of the emergency power supply for digital door lock according to another embodiment of the fifth embodiment of the present invention. According to another embodiment of the fifth embodiment, one end of the tenth switch 299a included in the external power switch module 299 is connected to one end of the first battery holder 600, and the other end of the tenth switch 299a is connected to one end of the seventh switch 277 of the voltage regulating circuit selection switch module 270. The other end of the eleventh switch 299b is connected to one end of the fourth switch 271, and one end of the eleventh switch 299b is connected to one end of the external battery insertion holder 930. According to FIG. 25, the other end of the external battery insertion holder 930 is connected to the other end of the second battery holder 700.

Therefore, when the battery 30 is inserted into the external battery insertion holder 930, the tenth switch 299a opens and the eleventh switch 299b is shorted. That is, the power supplied from the first battery holder 600 and the second battery holder 700 is cut off, and the power supplied from the external battery insertion holder 930 is moved to the target voltage adjusting circuit unit 550. On the contrary, when the battery 30 is removed from the external battery insertion holder 930, the tenth switch 299a is shorted and the eleventh switch 299b is opened. Therefore, power can be supplied from the first battery holder 600 and the second battery holder 700, and the power supplied from the first battery holder 600 and the second battery holder 700 moves to the target voltage regulation circuit unit 550.

Figure 26A:
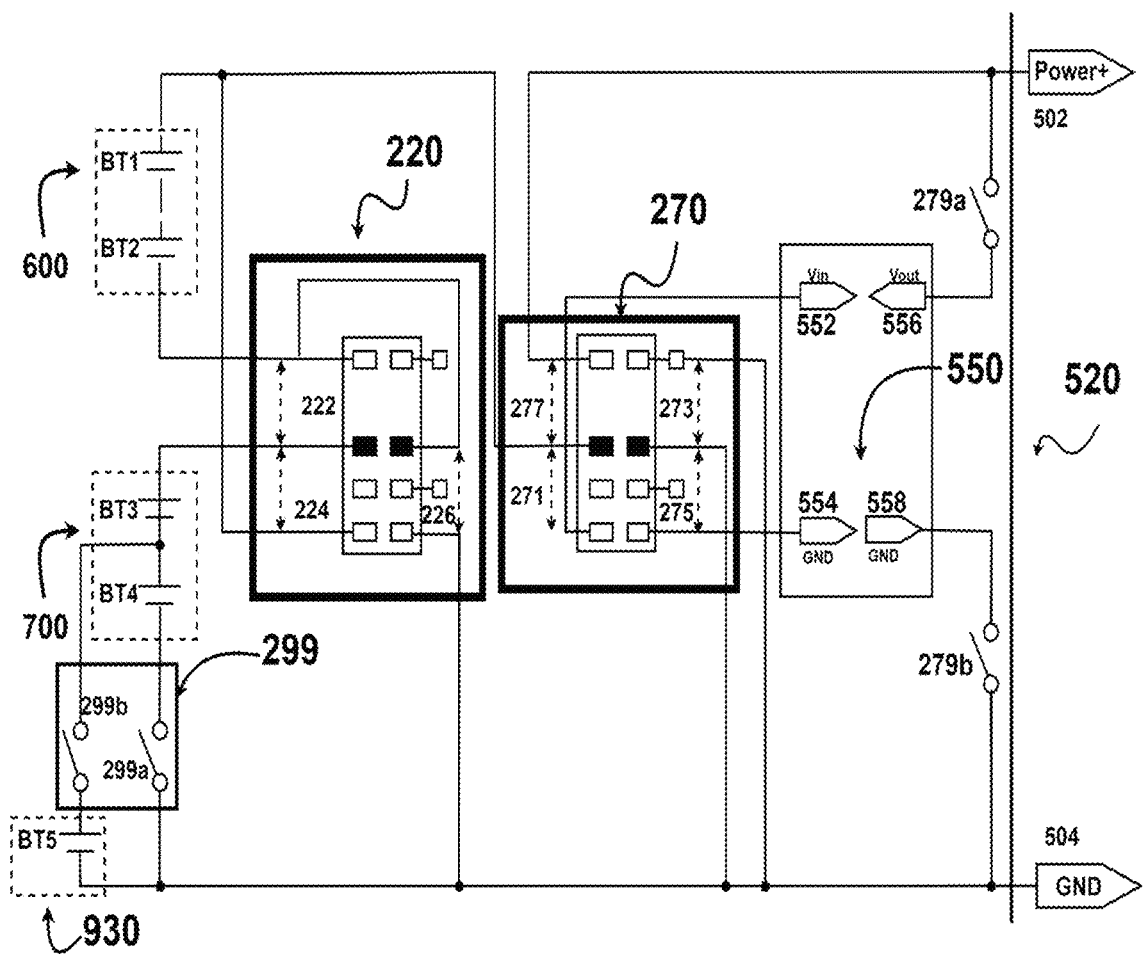
FIGS. 26A-26B show a circuit diagram of the emergency power supply for digital door lock according to a sixth embodiment of the present invention.
Figure 26B:
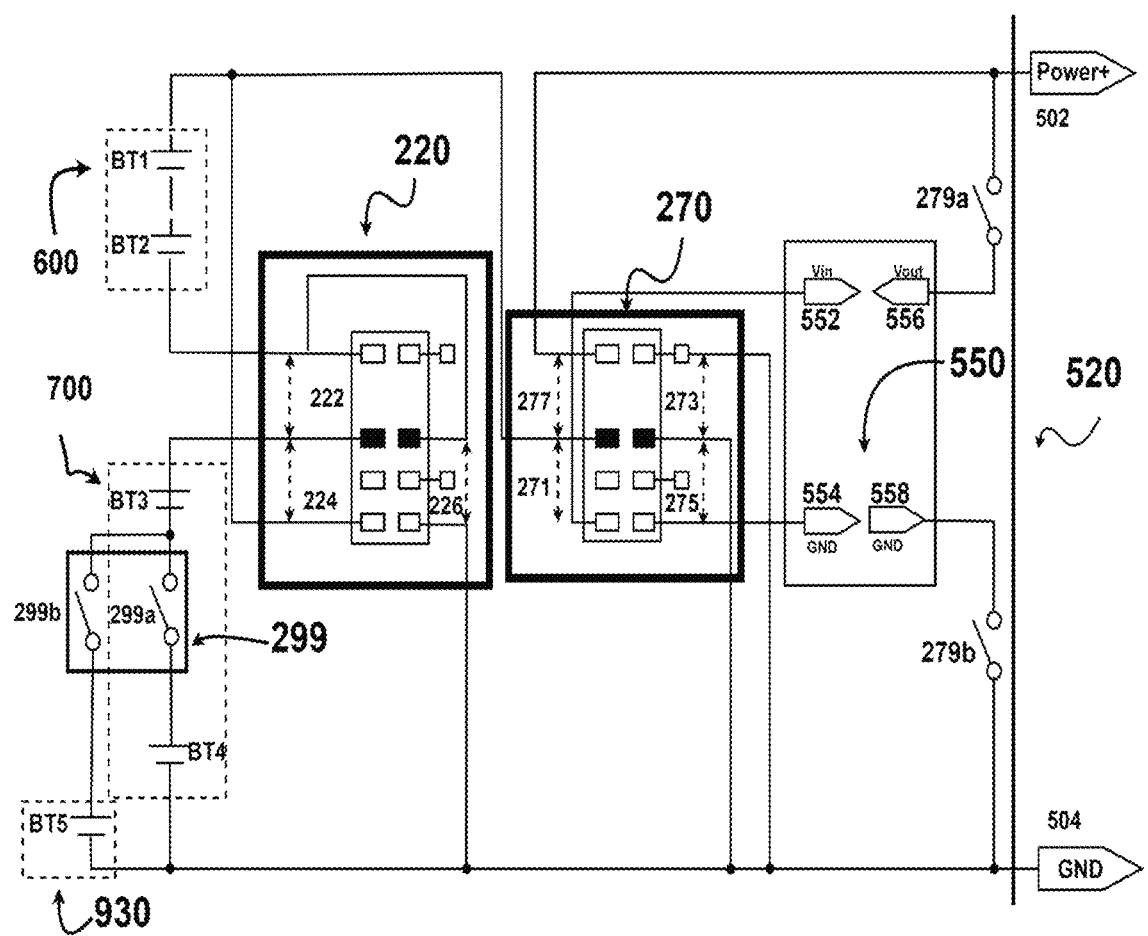

FIGS. 26A-26B show a circuit diagram of the emergency power supply for digital door lock according to a sixth embodiment of the present invention.

According to FIG. 26A, one end of the tenth switch 299a included in the external power switch module 299 is connected to the other end of the second battery holder 700, and the other end of the tenth switch 299a is connected to the second input 504 of the latch bolt operating portion 520. Further, one end of the 11th switch 299b is connected to the positive electrode (+) of one of the batteries 30 of the internal battery of the second battery holder 700, and the other end of the 11th switch 299b is connected to one end of the external battery insertion holder 930. In FIG. 26A, the fourth battery BT4 of the second battery holder 700 will be described with reference to the preferred description of the present invention.

According to FIG. 26A, when the battery 30 is inserted into the external battery insertion holder 930 and power is supplied from the external battery insertion holder 930, the tenth switch 299a of the external power switch module 299 is opened, so current can't move. Then, the eleventh switch 299b of the external power switch module 299 is shorted, and the fourth battery BT4 is separated from the circuit. Therefore, the electric power supplied from the fourth battery BT4 of the second battery holder 700 is cut off, and the electric power is supplied from the battery insertion holder 930.

On the other hand, when the battery 30 is removed from the external battery insertion holder 930, the tenth switch 299a is shorted and the eleventh switch 299b is opened. Therefore, the fourth battery BT4 supplies power, and the external battery insertion holder 930 is separated from the circuit.

For the preferred explanation according to FIG. 26A, the fourth battery BT4 of the second battery holder 700 has been described as an example. However, the object is not limited to the fourth battery BT4 of the second battery holder 700, and the object cut out from the external battery insertion holder 930 may be the battery 30 provided in the first battery holder 600.

Further, such an embodiment can be implemented as shown in FIG. 26B. That is, the tenth switch 299a is provided between the third battery BT3 and the fourth battery BT4 of the second battery holder 700, and one end of the eleventh switch 299b is connected to the anode of the fourth battery BT4. The other end of the eleventh switch 299b is connected to one end of the external battery insertion holder 930. The effect in this case is the same as that of FIG. 26A seen above.

Figure 27:
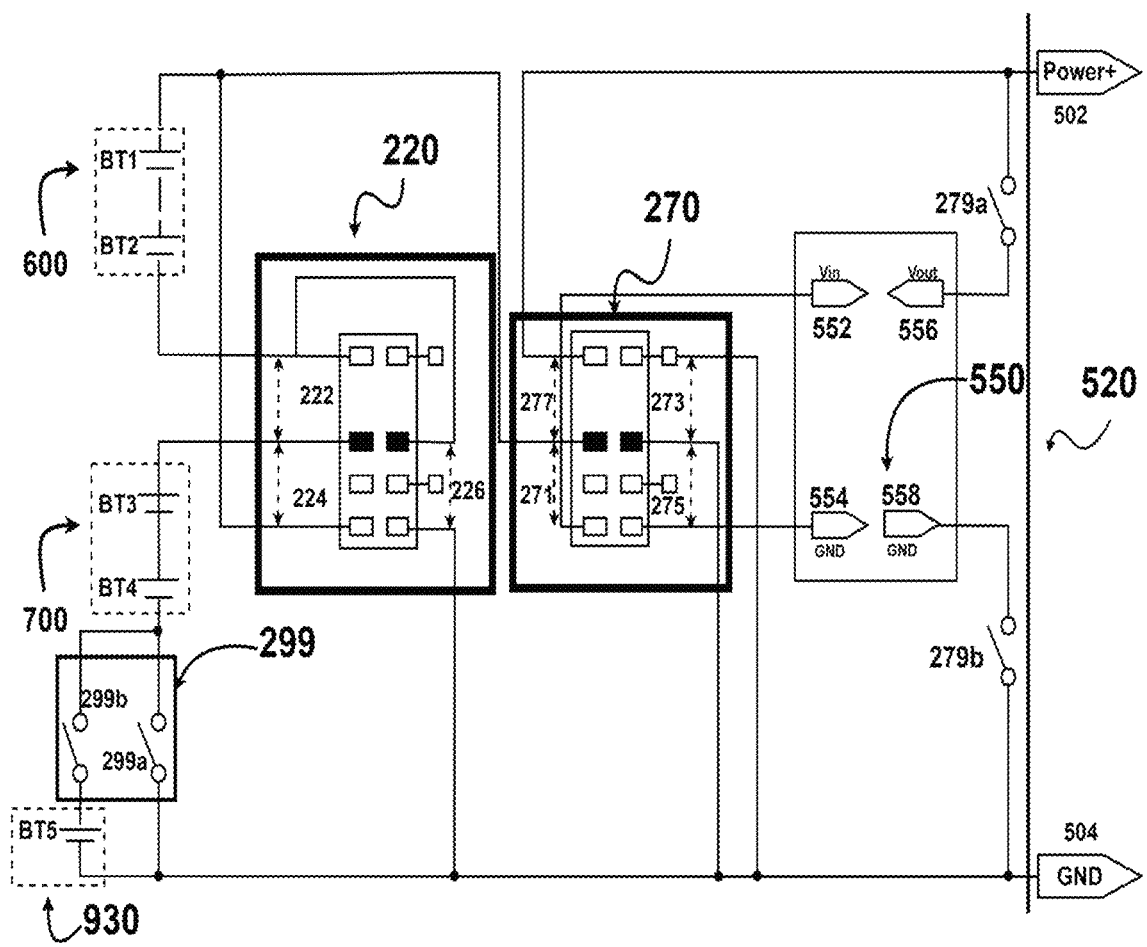
FIG. 27 shows a circuit diagram of the emergency power supply for digital door lock according to another embodiment of the sixth embodiment of the present invention.

FIG. 27 shows a circuit diagram of the emergency power supply for digital door lock according to another embodiment of the sixth embodiment of the present invention.

According to the circuit diagram shown in FIG. 27, one end of the tenth switch 299a included in the external power switch module 299 is connected to the other end of the second battery holder 700, and the other end of the tenth switch 299a is connected to the second input 504 of the latch bolt operating unit 520. Further, one end of the 11th switch 299b is connected to the other end of the second battery holder 700, and the other end of the 11th switch 299b is connected to one end of the external battery insertion holder 910.

Therefore, when the eleventh switch 299b of the external power switch module 299 is shorted and the tenth switch 299a is opened, the second battery holder 700 and the external power charging unit 910 are connected in series. Therefore, the power supply is added to the latch bolt operating unit 520. In the external power switch module 299 according to the fifth embodiment of the present invention, the power of the external battery insertion holder 930 is added regardless of the series-parallel connection between the first battery holder 600 and the second battery holder 700. On the other hand, when the battery 30 is removed from the external battery insertion holder 930, the tenth switch 299a is shorted and the eleventh switch 299b is opened. The operation of such a switch can be naturally performed by inserting the battery 30 into the external battery insertion holder 930. Then, this operation can be performed by a reed switch and a magnet.

Figure 28:
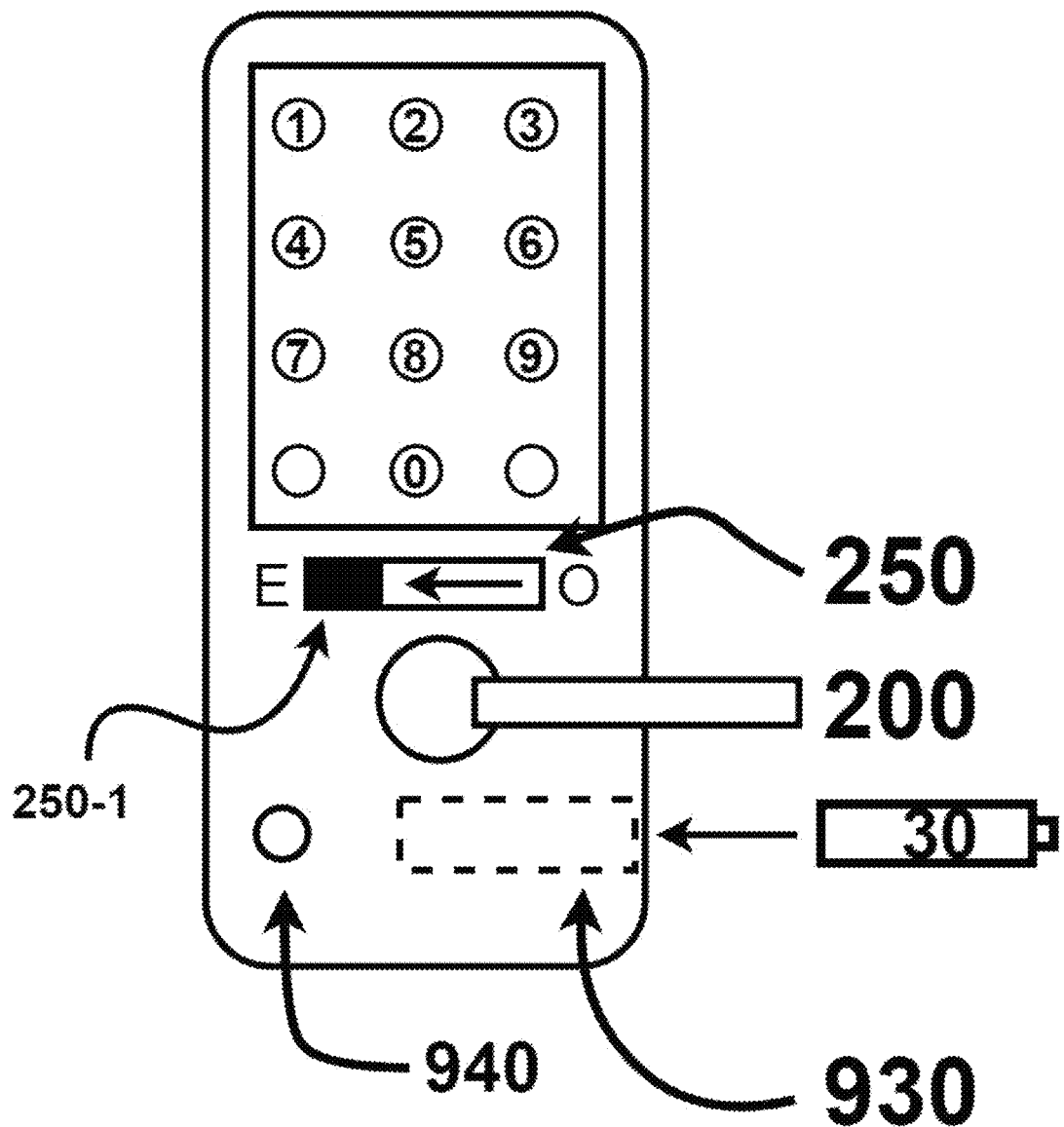
FIG. 28 is a diagram showing the outer surface of the emergency power supply for digital door lock according to the fourth to sixth embodiments of the present invention.

FIG. 28 is a diagram showing the outer surface of the emergency power supply for digital door lock according to the fourth to sixth embodiments of the present invention.

The emergency power supply for digital door lock 100 according to the fourth embodiment of the present invention is different from the existing embodiment in that the external battery holder 930 and the external power drive switch 940 are provided on the outer surface. Therefore, the emergency power supply for digital door lock 100 according to the fourth embodiment of the present invention operates the emergency switch 250 to consume all the remaining amount of the battery 30 provided inside the emergency power supply for digital door lock 100. Next, by inserting a new battery 30 into the external battery holder 930 or pressing the external power drive switch 940, power can be supplied according to the emergency power generation unit.

When the external power drive switch 940 is pressed to drive the emergency power generation unit, power is generated by the piezoelectric element included in the emergency power generation unit. Then, the generated electric power is supplied to the rechargeable battery provided inside the emergency power supply for digital door lock 100. After that, the rechargeable battery is connected in parallel with the external battery insertion module 930, and the electric power of the rechargeable battery flows into the external battery insertion module 930.

The emergency switch 250 shown in FIG. 28 is switched to the emergency mode E when the operation unit 250-1 is moved to the left, and to the constant mode O when the operation unit 250-1 is moved to the right. More specifically, when the operation unit 250-1 is moved in the emergency mode E of the emergency switch 250, the operation unit 250-1 is fixed to the emergency mode E and the connection between the first battery holder 600 and the second battery holder 700 is switched. Then, when the operation unit 250-1 is moved to the emergency mode E of the emergency switch 250, the operation unit 250-1 is switched to the emergency mode E. The switching direction to the emergency mode (E) and the constant mode (O) is limited for the preferred description of the present invention, and does not limit the moving direction.

In addition, as the door lock opening/closing means 200 rotates in the direction opposite to the direction in which the door is opened, the connection between the first battery holder 600 and the second battery holder 700 is converted from series to parallel or from parallel to series.

In response to the rotation of the door lock opening/closing means 200 or the movement of the operation unit 250-1 of the emergency switch 250, the connection method with the first battery holder 600 and the second battery holder 600 is switched by any of the push non-lock, push lock, tact, and selector. This method can proceed according to the principle of toggle switching, that is, power is transmitted by the link portion.

Figure 29:
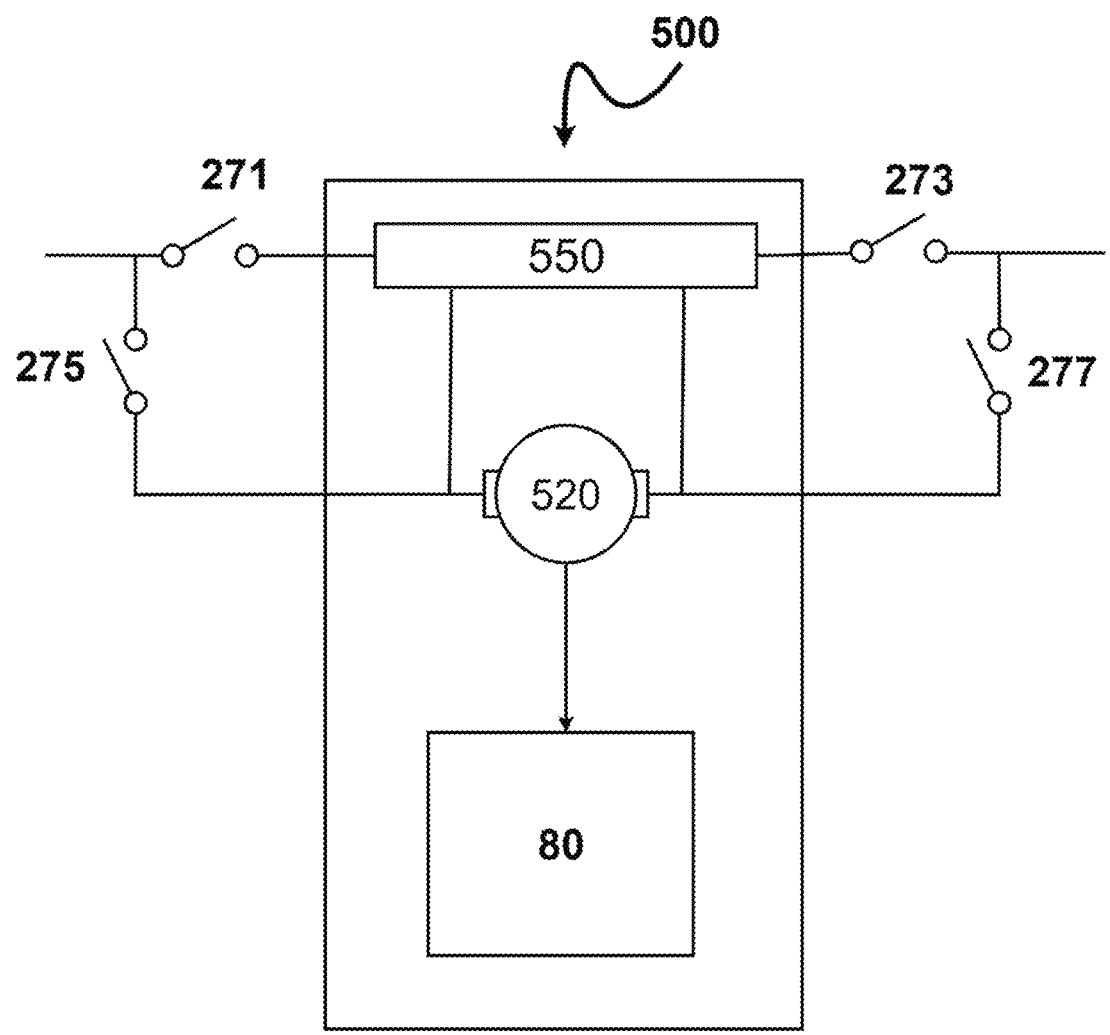
FIG. 29 shows the motor driving module provided in the emergency power supply for digital door lock according to the fourth to sixth embodiments of the present invention.

FIG. 29 shows the motor driving module provided in the emergency power supply for digital door lock according to the fourth to sixth embodiments of the present invention.

The emergency power supply for digital door lock 100 according to FIG. 29, the target voltage regulation circuit unit 550 and the latch bolt operation unit 520, in the motor drive module 500, are driven by external the voltage regulating circuit selection switch module 270. The voltage regulating circuit selection switch module 270 according to FIG. 29 includes a fourth switch 271, a fifth switch 273, a sixth switch 275, and a seventh switch 277. According to FIG. 29, the fourth switch 271 and the fifth switch 273 are directly connected to the target voltage regulation circuit unit 550 to control the drive of the target voltage adjustment circuit unit 550. Further, when the current flowing through the target voltage adjusting circuit unit 550 is cut off by the fourth switch 271 and the fifth switch 273, the sixth switch 275 and the seventh switch 277 are shorted and the current is applied directly to the bolt operating unit 520.

Therefore, the process in which the current passes through the target voltage regulation circuit unit 550 can be selectively adjusted. When the first battery holder 600 and the second battery holder 700 are connected in parallel, the target voltage regulation circuit unit 550 is used to supplement the voltage insufficient for the parallel connection of the batteries 30. However, when the first battery holder 600 and the second battery holder 700 are connected in series, the voltage increases in proportion to the number of batteries 30, so that the voltage does not need to added by the target voltage regulation circuit unit 550.

Further, when the first battery holder 600 and the second battery holder 700 are connected in series, driving the target voltage regulation circuit unit 550 consumes unnecessary power. Therefore, the present invention selectively drives the target voltage regulation circuit unit 550 to save unnecessary power consumption.

Figure 30:
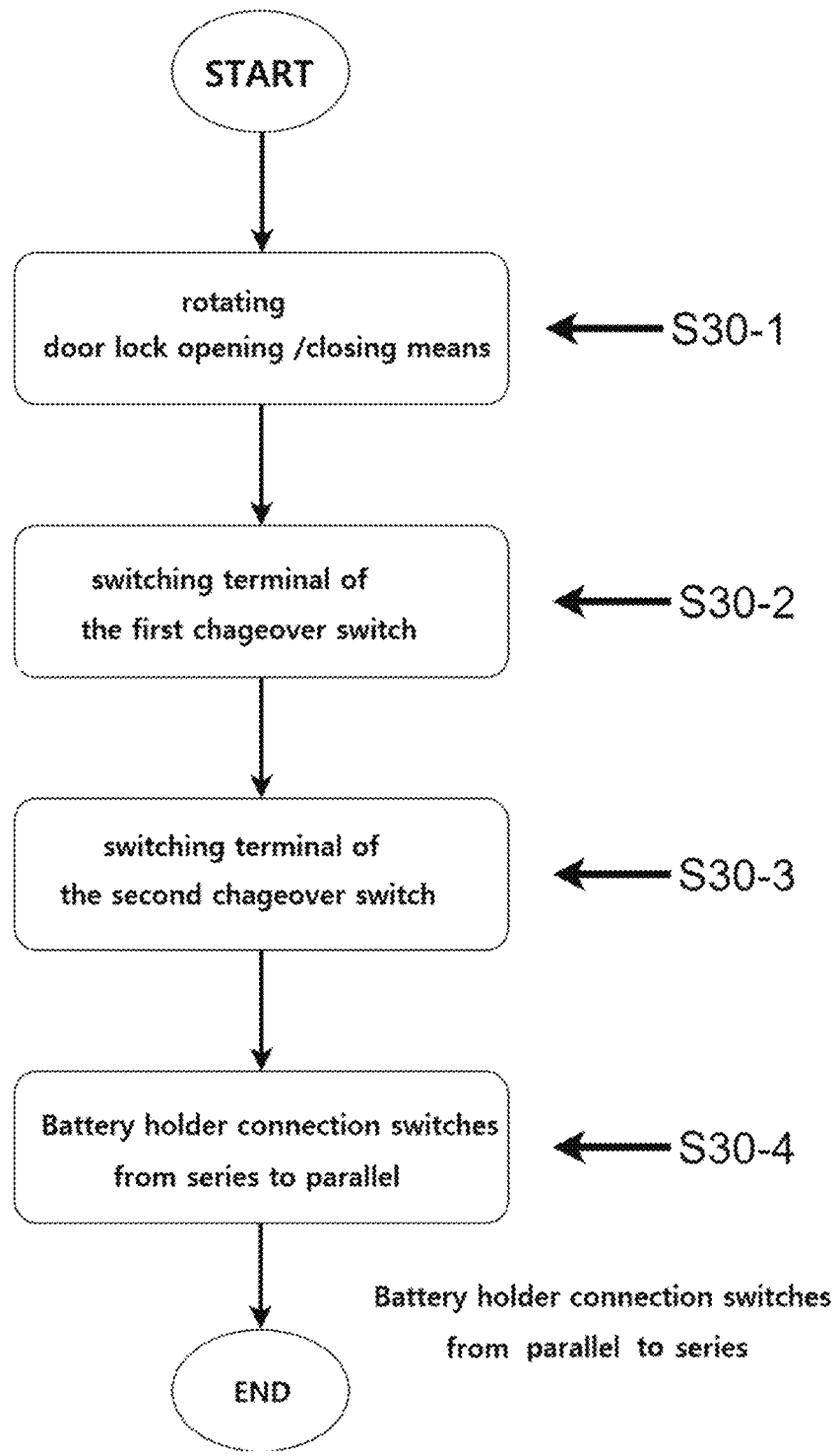
FIG. 30 shows a driving procedure of the emergency power supply for digital door lock according to the first embodiment of the present invention.

FIG. 30 shows a driving procedure of the emergency power supply for digital door lock according to the first embodiment of the present invention.

In driving the emergency power supply for digital door lock 100 according to the first embodiment of the present invention, the door lock opening/closing means 200 such as a lever and a handle rotates upward (S30-1). After that, the contact of the first changeover switch 300 is switched to the first output terminal 350 (S30-2), and the contact of the second changeover switch 400 is switched to the third output terminal 450. (S30-3). Next, the connection between the first battery holder 600 and the second battery holder 700 is switched from series to parallel (S30-4). The order in which the contact of the first changeover switch 300 switches to the first output terminal 350 (S30-2) and the contact of the second changeover switch 400 switches to the third output terminal 450 (S30)-3) is not fixed. The process of changing the contacts of the first changeover switch 300 and the contacts of the second changeover switch 400 can occur at the same time. According to the first embodiment of the present invention, by switching the connection between the first battery holder 300 and the second battery holder 400 from series to parallel, the remaining amount of batteries provided in the digital door lock 10 is consumed all. Further, when the connection between the first battery holder 300 and the second battery holder 400 is parallel, the current transmitted to the motor drive module 500 and the internal circuit unit 850 increases, and the power can be supplied more stably.

Figure 31:
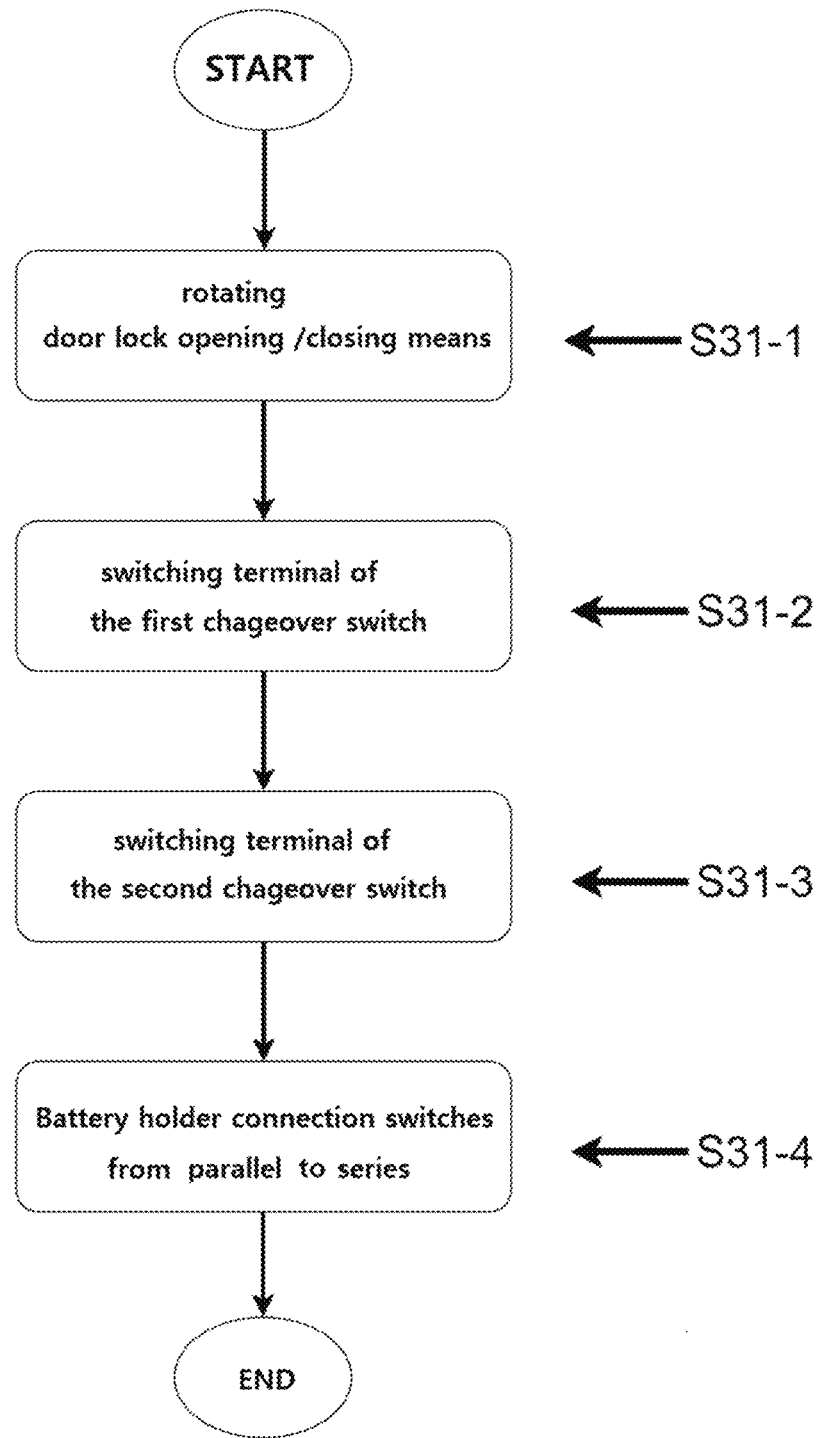
FIG. 31 shows a driving procedure of the emergency power supply for digital door lock according to a second embodiment of the present invention.

FIG. 31 shows a driving procedure of the emergency power supply for digital door lock according to a second embodiment of the present invention.

In the driving procedure of the emergency power supply for digital door lock 100 according to the second embodiment of the present invention, after the door lock opening/closing means 200 such as a lever or a handle is rotated upward (S31-1), the contact of the first changeover switch 300 is switched to the second output terminal 370 (S31-2). Then, after the contact direction of the second changeover switch 400 is switched to the fourth output terminal 470 (S31-3), the connection between the first battery holder 600 and the second battery holder 700 is switched from parallel to serial (S31-4).

As the connection method between the first battery holder 600 and the second battery holder 700 is switched in series, the available voltage can be increased. Therefore, a sufficient voltage value can be supplied to the latch bolt operating unit 520 without providing the target voltage regulation circuit unit 550.

Figure 32:
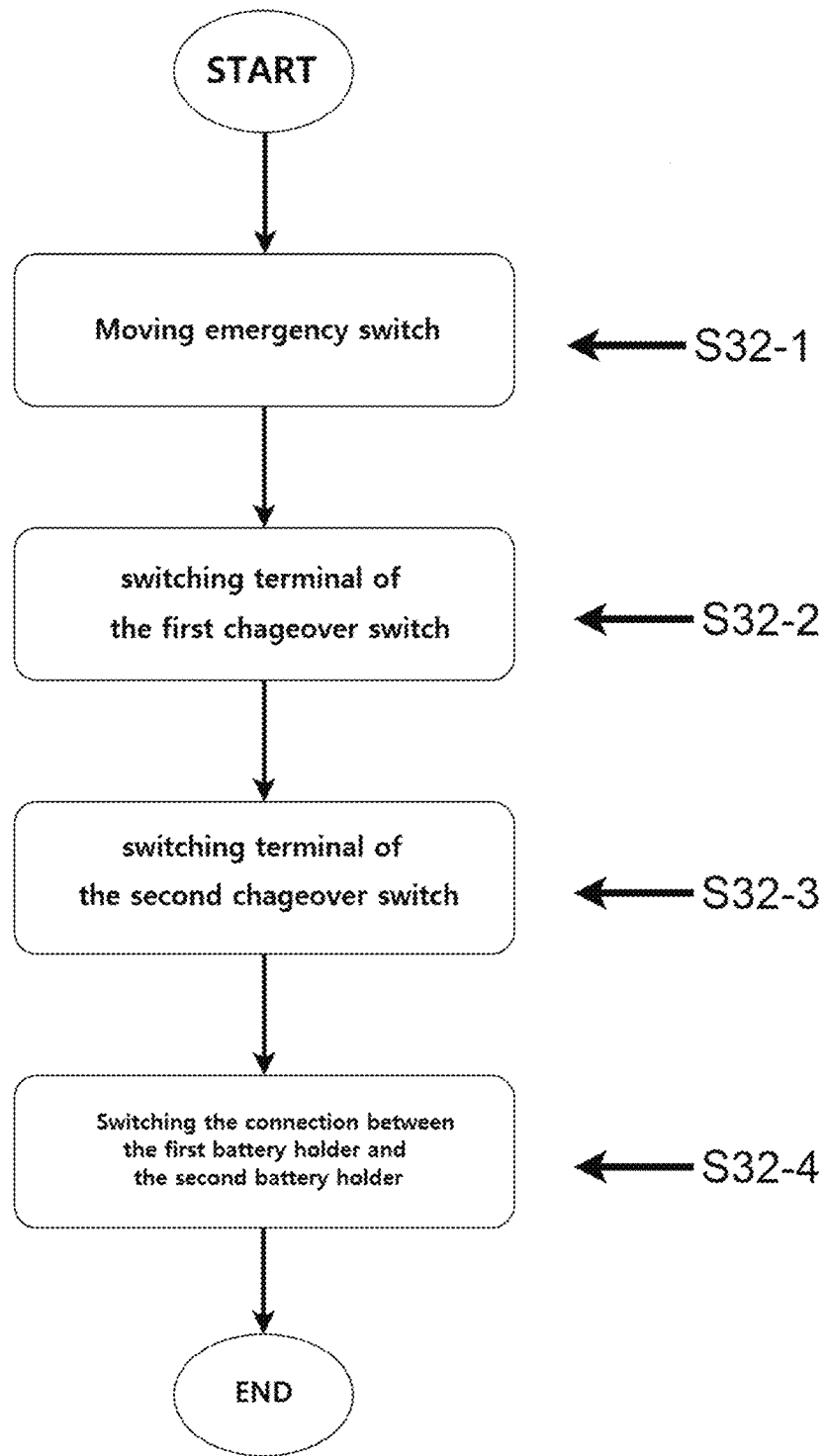
FIG. 32 shows a driving procedure of the emergency power supply for digital door lock according to a third embodiment of the present invention.

FIG. 32 shows a driving procedure of the emergency power supply for digital door lock according to a third embodiment of the present invention.

According to the driving procedure of the emergency power supply for digital door lock 100 according to the third embodiment of the present invention, after moving the operation unit 250-1 of the emergency switch 250 of the slide switch and the toggle switch (S32-1), the contact direction of the changeover switch 300 is switched (S32-2). The driving procedure of the digital door lock emergency power supply device 100 according to the third embodiment of the present invention is performed after moving the operation unit 250-1 of the emergency switch 250 in the form of a slide switch and a toggle switch (S32-1).), The contact direction of the first changeover switch 300 is switched (S32-2). After that, the contact direction of the second changeover switch 400 is switched (S32-3), and the connection between the first battery holder 600 and the second battery holder 700 is switched from series to parallel or from parallel to series. (S32-4). Further, after the connection between the first battery holder 600 and the second battery holder 700 is switched, the target voltage regulation circuit unit 500, the password input unit 800, and the internal circuit unit 850 are driven.

In the emergency power supply for digital door lock 100 according to the third embodiment of the present invention, the connection between the first battery holder 600 and the second battery holder 700 is switched in series from parallel or serial to serial by using the emergency switch 250. This part is different from the emergency power supply for digital door lock 100 according to the first embodiment and the second embodiment of the present invention.

Figure 33:
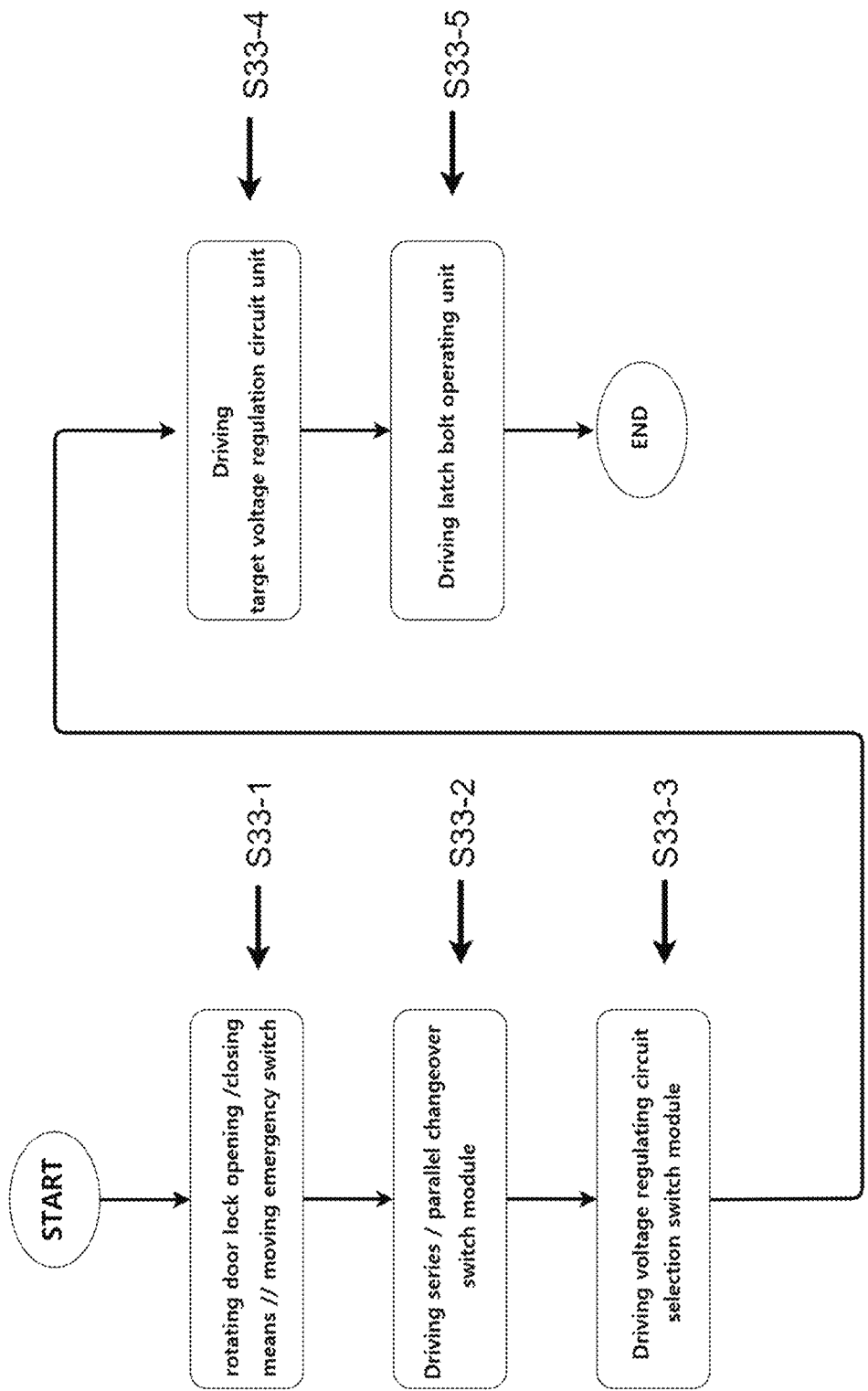
FIG. 33 shows a driving procedure of the emergency power supply for digital door lock according to the fourth embodiment of the present invention.

FIG. 33 shows a driving procedure of the emergency power supply for digital door lock according to the fourth embodiment of the present invention.

In the driving procedure of the emergency power supply for digital door lock 100 according to the fourth embodiment of the present invention, after the door lock opening/closing means 200 is rotated or the emergency switch 250 is operated (S33-1), the series-parallel changeover switch module 220 selectively controls the electrical connection between the first battery holder 600 and the second battery holder 700 (S33-2). After that, the voltage regulating circuit selection switch module 270 is driven according to the electrical connection between the first battery holder 600 and the second battery holder 700, and the power supplied from the first battery holder 600 and the second battery holder 700 to the voltage regulation circuit unit 550 and the latch bolt operating unit 520 (S33-3). Next, the voltage is boosted or stepped down to a preset voltage value through the target voltage regulation circuit unit 550 (S33-4), and a current is applied to the latch bolt operating unit 520 (S33-5).

If the connection between the first battery holder 600 and the second battery holder 700 is switched from parallel to series, it can be excluded that the target voltage regulation circuit unit 550 is stepped up or down to a preset voltage (S33-4). After that, the connection between the first battery holder 600 and the second battery holder 700 is switched from parallel to series or from series to parallel (S33-5). The drive order of the digital door lock emergency power supply 100 according to FIG. 33 is not limited to the specific order as described above. Step in which the series-parallel changeover switch module 220 is driven (S33-2) and step in which the voltage regulating circuit selection switch module 270 is driven (S33-3) can proceed at the same time.

Figure 34:
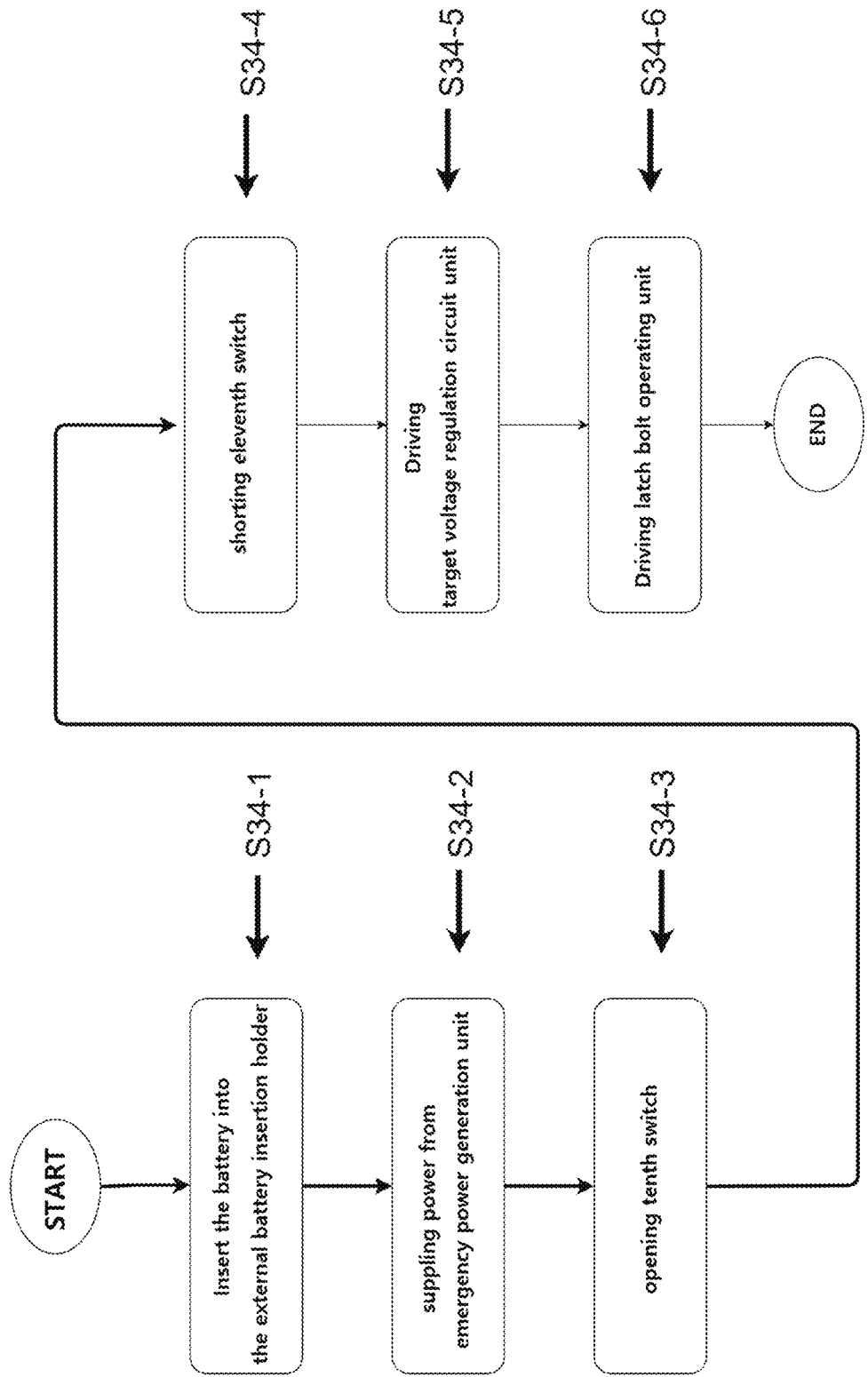
FIG. 34 shows a procedure in which the emergency power supply for digital door lock according to the fifth and sixth embodiments of the present invention is driven by an external battery holder.

FIG. 34 shows a procedure in which the emergency power supply for digital door lock according to the fifth and sixth embodiments of the present invention is driven by an external battery holder.

The driving procedure according to the fifth embodiment and the sixth embodiment according to FIG. 34 can be similarly applied to the other embodiments of the fifth embodiment and the other embodiments of the sixth embodiment.

When the external battery is inserted into the external battery insertion holder 930 according to FIG. 34 (S34-1), power is supplied from the emergency power generation unit to the external battery insertion holder 930 (S34-2). Before inserting the external battery into the external battery insertion holder 930 (S34-1), the connection between the first battery holder 600 and the second battery holder 700 can be switched from parallel to series or series to parallel.

After that, the tenth switch 299a of the external power switch module 299 is opened (S34-3), and the eleventh switch 299b of the external power switch module 299 is shorted (S34-4). At this step, the first battery holder 600 and the second battery holder 700 and the external battery insertion holder 930 are connected to supply additional power to the latch bolt operating unit 520. When the external battery holder 930 is inserted, the electric power supplied from the first battery holder 600 and the second battery holder 700 is cut off, and only the electric power of the external battery holder 930 is supplied. After driving the external power switch module 299, the target voltage regulation circuit unit 550 is driven (S34-5), and the latch bolt operating unit 520 is driven (S34-6).

The driving procedure of the emergency power supply for digital door lock 100 according to FIG. 34 is best limited to a specific order after the external battery is inserted into the battery insertion holder 930 (S34-1). Step in which the eleventh switch 299b is shorted (S34-4) from step in which power is supplied from the emergency power generation unit (S34-2) may be performed at the same time.

Figure 35:
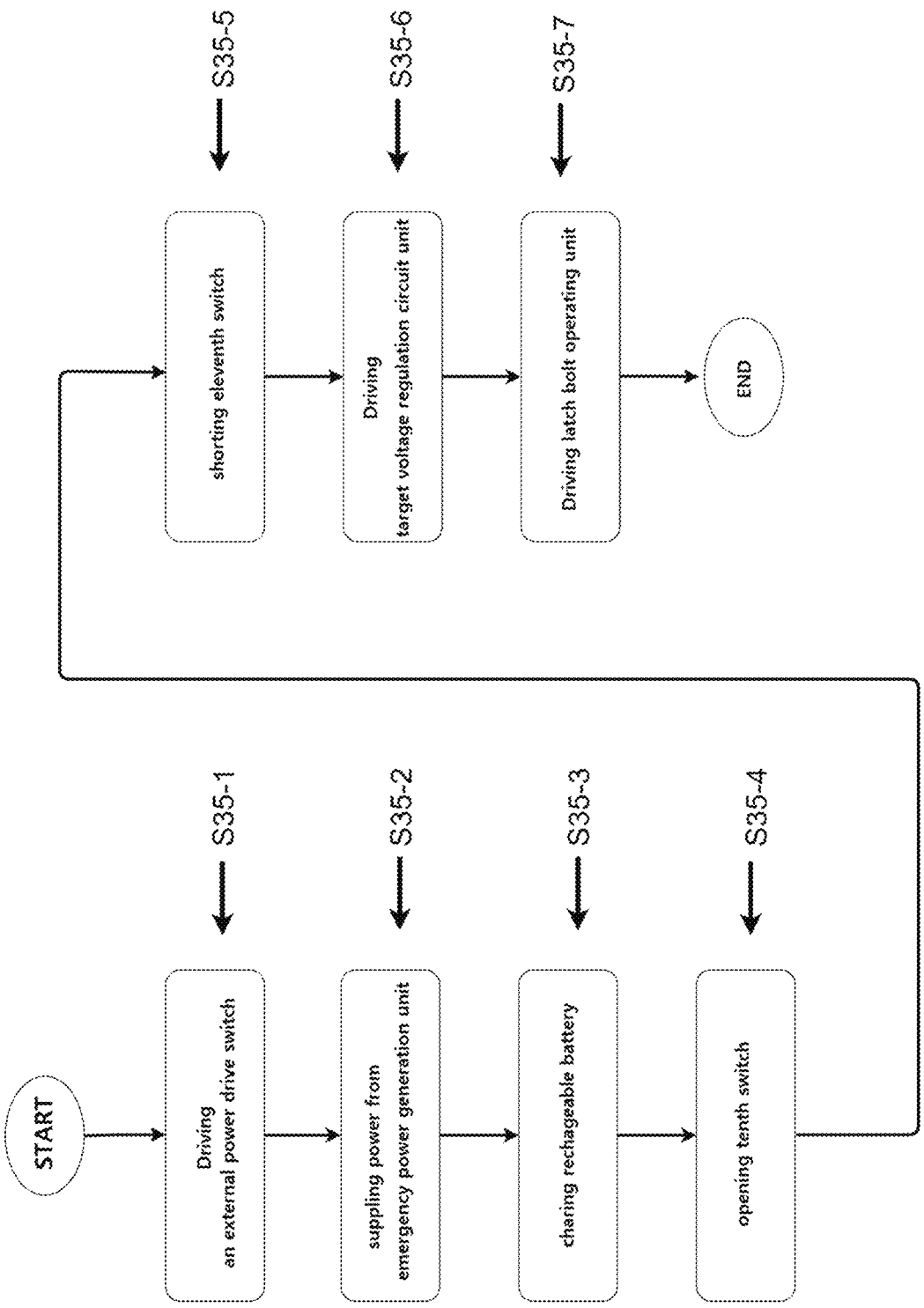
FIG. 35 shows a drive procedure using an external power drive switch for the emergency power supply for digital door lock according to the fifth and sixth embodiments of the present invention.

FIG. 35 shows a drive procedure using an external power drive switch for the emergency power supply for digital door lock according to the fifth and sixth embodiments of the present invention.

The driving procedure according to the fifth embodiment and the sixth embodiment according to FIG. 35 can be similarly applied to the other embodiments of the fifth embodiment and the other embodiments of the sixth embodiment.

According to FIG. 35, an external power drive switch 940 provided on the outer surface of the emergency power supply for digital door lock 100 is driven (S35-1). And, this may be the voltage generated by the piezoelectric element of the emergency power generation unit. After that, the electric power generated from the emergency power generation unit is supplied (S35-2). The electric power generated from the emergency power generation unit means the electric power generated by the piezoelectric element inside the emergency power generation unit.

After that, the electric power generated by the emergency power generation unit is supplied to the rechargeable battery connected in parallel with the external battery insertion holder 930 (S35-3). Therefore, the electric power generated by the piezoelectric element can be supplied to the rechargeable battery and naturally supplied to the external battery insertion holder 930 connected in parallel with the rechargeable battery.

The drive order when the emergency power supply for digital door lock according to FIG. 35 utilizes an external power drive switch is not limited to a specific order. Several sequences can proceed at the same time.

Figure 36:
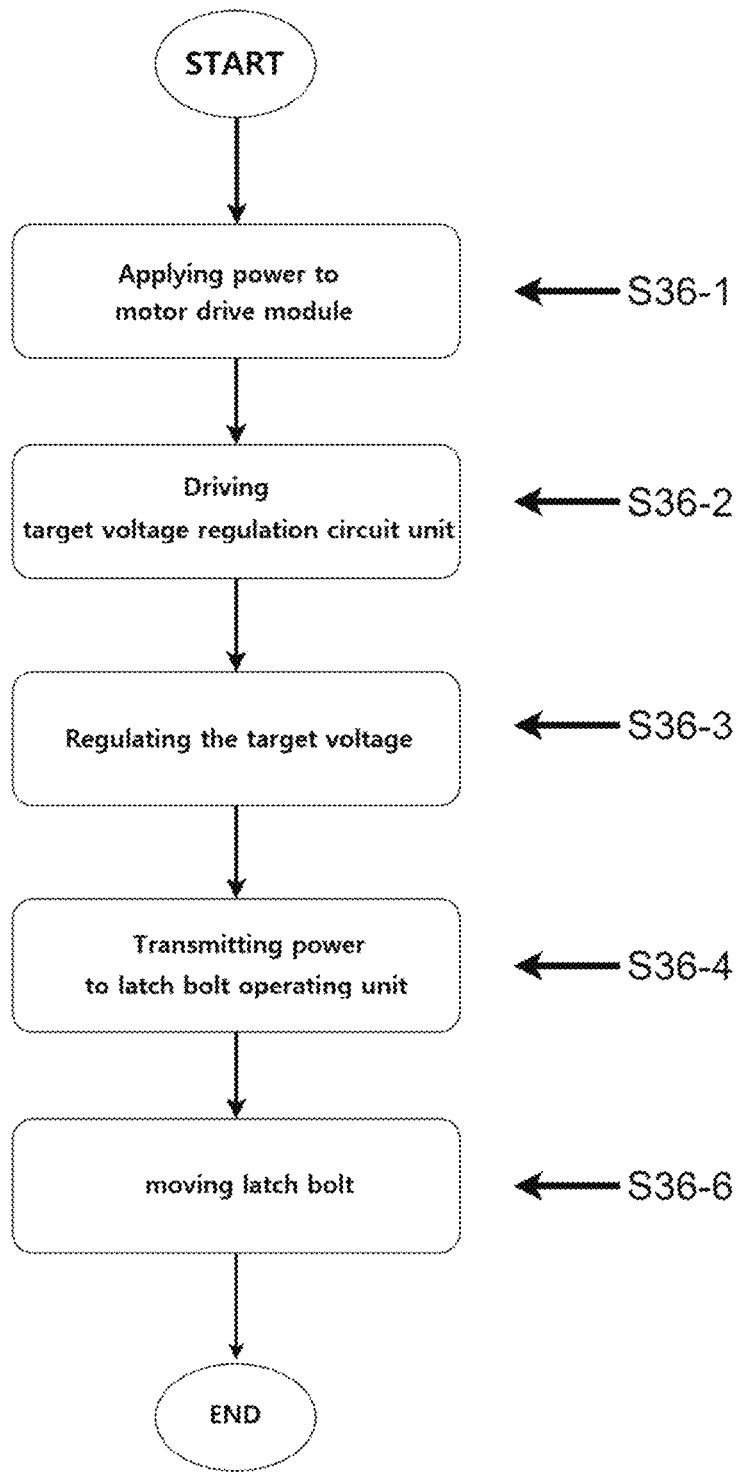
FIG. 36 shows a driving procedure of a motor drive module which is a component of the emergency power supply for digital door lock of the present invention.

FIG. 36 shows a driving procedure of a motor drive module which is a component of the emergency power supply for digital door lock of the present invention.

In the driving procedure of the motor drive module 500 according to FIG. 36, electric power is applied to the motor drive module 500 (S36-1). After that, it is converted into a voltage value preset by the target voltage regulation circuit unit 550 (S36-2). The electric power applied to the motor drive module 500 is applied from the first battery holder 600 and the second battery holder 700 and/or from the external battery holder 930. Further, the voltage value preset by the target voltage regulation circuit unit 550 is adjusted according to the connection of the first battery holder 600, the second battery holder 700, and the external battery holder 930. For example, when the first battery holder 600 and the second battery holder 700 are in parallel, the voltage output from the first battery holder 600 and the second battery holder 700 may be smaller than the series connection. When the voltage is small, even if electric power is applied to the latch bolt operating unit 520, the magnitude of the voltage is weak and the door lock drive is hindered. In this case, the target voltage regulation circuit unit 550 boosts the voltage to smoothly drive the emergency power supply for digital door lock 100. Further, the target voltage regulation circuit unit 550 steps down the voltage to prevent unnecessary waste of electric power. After that, the target voltage value transmitted to the latch bolt operating unit 520 via the target voltage adjusting circuit unit 550 is adjusted to 3 volts or 6 volts (S36-3). Power is transmitted to the latch bolt operating unit 520 at a predetermined voltage (S36-4), and the latch bolt 80 is moved to the inside of the digital door lock emergency power supply device 100 by driving the latch bolt operating portion 520 (S36-5). The latch bolt operating unit 520 operates after it is determined that the password information input by the internal circuit unit 850 corresponds to the preset password information. The driving procedure of the motor drive module 500 according to FIG. 36 can be applied to all the driving of the digital door lock emergency power supply device 100 according to the first to sixth embodiments of the present invention. The drive order of the motor drive module 500 according to FIG. 36 is not limited to a specific order. That is, it can occur at the same time regardless of time.

Figure 37:
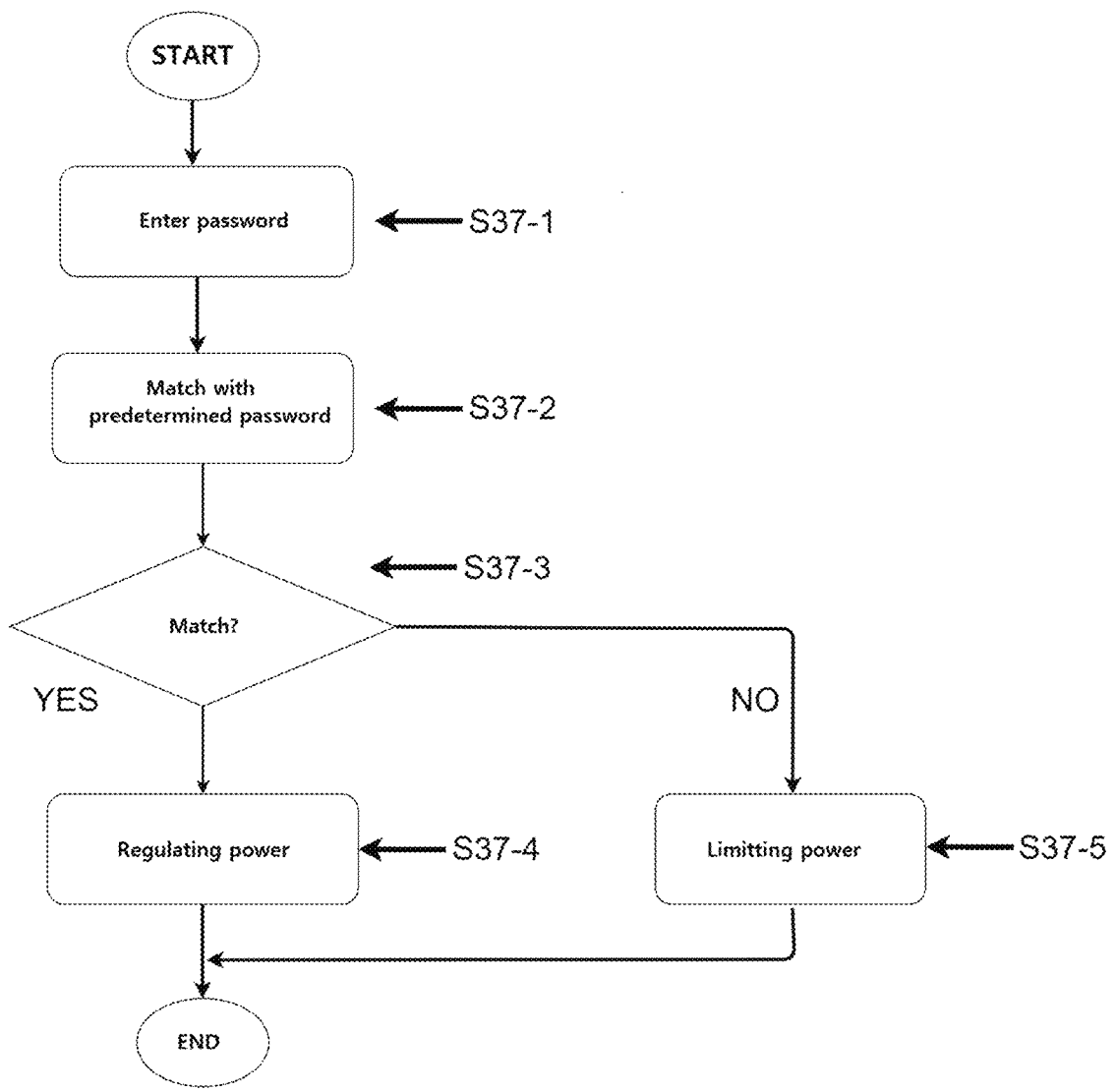
FIG. 37 shows a driving procedure of a password input unit and an internal circuit unit, which are components of the emergency power supply for digital door lock of the present invention.

FIG. 37 shows a driving procedure of a password input unit and an internal circuit unit, which are components of the emergency power supply for digital door lock of the present invention.

According to FIG. 37, the password information is input by the password input unit 800 (S37-1), and the password input by the password input unit 800 is collated with the preset password (S37-2). The internal circuit unit 850 determines whether or not the preset password and the input password match (S37-3). When it is determined that the password set by the internal circuit unit 850 and the entered password match, the power to the motor drive module 500 is adjusted (S37-4). When it is determined by the internal circuit unit 850 that the preset password and the input password information do not match, the power to the motor drive module 500 is restricted (S37-5). After all the drive steps described above, it is determined whether the emergency power supply for digital door lock 100 opens or closes. Then, it is determined whether or not the door on which the emergency power supply for digital door lock 100 is installed is open.

The driving procedure of the password input unit 800 and the internal circuit unit 850 according to FIG. 37 can be applied to the driving process of the digital door lock emergency power supply device 100 according to the first to sixth embodiments of the present invention.

The present invention has been described above with reference to the first to sixth embodiments. However, a skilled person skilled in the art can make various modifications from the invention described in the claims.

What is claimed is:

1. An emergency power supply for digital door lock comprising: a first battery holder that can accommodate one or more batteries; a second battery holder that can accommodate one or more batteries; a motor drive module that includes a target voltage regulation circuit unit and a latch bolt operating unit; a series-parallel changeover switch module that switches the electrical connection between the first battery holder and the second battery holder from series to parallel or from parallel to series; a target voltage regulation circuit selection switch module that adjusts the target voltage regulation circuit unit so that it is selectively applied in the process in which the voltage output from the first battery holder and the second battery holder is applied to the latch bolt operating unit.

2. The emergency power supply for digital door lock of claim 1,
wherein the series-parallel changeover switch module includes a first switch, a second switch, and a third switch,
wherein one end of the first switch is connected to the other end of the first battery holder,
wherein the other end of the first switch is connected to the other end of the second battery holder,
wherein one end of the second switch is connected to one end of the first battery holder,
wherein the other end of the second switch is connected to one end of the second battery holder,
wherein one end of the third switch is connected to the other end of the first battery holder,
wherein the other end of the third switch is connected to the other end of the second battery holder.

3. The emergency power supply for digital door lock of claim 2, wherein the electrical connection between the first battery holder and the second battery holder is switched from series to parallel by opening the first switch, shorting the second switch, and shorting the third switch.

4. The emergency power supply for digital door lock of claim 2,
wherein the electrical connection between the first battery holder and the second battery holder is switched from parallel to series by shorting the first switch, opening the second switch, and opening the third switch.

5. The emergency power supply for digital door lock of claim 1,
wherein the target voltage regulating circuit selection switch module includes a fourth switch, a fifth switch, a sixth switch, and a seventh switch,
wherein one end of the fourth switch is connected to one end of the first battery holder,
wherein the other end of the fourth switch is connected to the first input terminal of the target voltage adjustment circuit unit,
wherein one end of the fifth switch is connected to the other end of the second battery holder,
wherein the other end of the fifth switch is connected to the second input terminal of the target voltage adjustment circuit unit,
wherein one end of the sixth switch is connected to the other end of the second battery holder,
wherein the other end of the sixth switch is connected to the second input terminal of the latch bolt actuating module,
wherein one end of the seventh switch is connected to one end of the first battery holder,
wherein the other end of the seventh switch is connected to the first input of the latch bolt actuating module.

6. The emergency power supply for digital door lock of claim 5,
when the series-parallel changeover switch module switches the electrical connection between the first battery holder and the second electric holder from series to parallel, the fourth switch is shorted, the fifth switch is shorted, the sixth switch is opened, the second switch is opened, and the seventh switch The switch is opened.

7. The emergency power supply for digital door lock of claim 5,
when the series-parallel changeover switch module switches the electrical connection between the first battery holder and the second electric holder from parallel to series, the fourth switch is opened, the fifth switch is opened, the sixth switch is shorted, the second switch is shorted, and the seventh switch is shorted.

8. The emergency power supply for digital door lock of claim 1,
wherein the series-parallel changeover switch module is operated by a door lock opening/closing means or an external emergency switch.

9. The emergency power supply for digital door lock of claim 1,
the series-parallel changeover switch module switches the electrical connection between the first battery holder and the second battery holder from series to parallel or from parallel to series each time the door lock opening/closing means rotates in the direction opposite to the direction in which the door is opened.

10. The emergency power supply for digital door lock of claim 1, the series-parallel changeover switch module switches the electrical connection between the first battery holder and the second battery holder from series to parallel while maintaining the state in which the door lock opening/closing means is rotated in the direction opposite to the direction in which the door is opened.

11. The emergency power supply for digital door lock of claim 1,
wherein the target voltage regulation circuit selection switch module is operated by door lock opening/closing means or an external emergency switch.

12. The emergency power supply for digital door lock of claim 1, the target voltage regulation circuit selection switch module toggles each time the door lock opening/closing means rotates in the direction opposite to the direction in which the door is opened,
and when the series-parallel changeover switch module switches the electrical connection between the first battery holder and the second battery holder from series to parallel, the target voltage regulation circuit selection switch module apply the output voltage form the first battery holder and the second battery holder to the latch bolt operating unit via the target voltage regulation circuit unit.

13. The emergency power supply for digital door lock of claim 1,
the target voltage regulation circuit selection switch module apply the output voltage from the first battery holder and the second battery holder to the latch bolt operating unit via the target voltage regulation circuit unit while maintaining the state in which the door lock opening/closing means rotates in the direction opposite to the direction in which the door is opened.

14. The emergency power supply for digital door lock of claim 1 further comprising: a external battery insertion holder;
a external power switch module, when inserting a battery into the external battery insertion holder, the external power switch module replaces one of the batteries in the second battery holder with a battery inserted in the external battery insertion holder, connects the batteries in the second battery holder and the battery inserted in the external battery insertion holder in series, or selects only the battery of the external battery insertion holder as the power source applied to the latch bolt operating unit.

15. The emergency power supply for digital door lock of claim 14,
wherein the external power switch module includes a tenth switch and an eleventh switch;
wherein one end of the tenth switch is connected to the other end of the second battery holder,
wherein the other end of the tenth switch is connected to the second input end of the latch bolt operating part,
wherein one end of the eleventh switch is connected to the positive electrode of one of the batteries in the second battery holder,
wherein the other end of the eleventh switch is connected to one end of the external battery insertion holder.

16. The emergency power supply for digital door lock of claim 14,
wherein the external power switch module includes a tenth switch and an eleventh switch,
wherein one end of the tenth switch is connected to the other end of the second battery holder,
wherein the other end of the tenth switch is connected to the second input end of the latch bolt operating unit, wherein one end of the eleventh switch is connected to the other end of the second battery holder, wherein the other end of the eleventh switch is connected to one end of the external battery insertion holder.

17. The emergency power supply for digital door lock of claim 14, wherein the external power switch module includes a tenth switch and an eleventh switch, wherein one end of the tenth switch is connected to one end of the first battery holder, wherein the other end of the tenth switch is connected to one end of the seventh switch module of the target voltage regulation circuit selection switch module, wherein the other end of the eleventh switch is connected to one end of the seventh switch, wherein one end of the eleventh switch is connected to one end of the external battery insertion holder.

18. The emergency power supply for digital door lock of claim 14, wherein the external power switch module includes a tenth switch and an eleventh switch, wherein one end of the tenth switch is connected to the other end of the seventh switch module of the target voltage regulating circuit unit, wherein the other end of the tenth switch is connected to the first input terminal of the target voltage regulating circuit unit, wherein one end of the eleventh switch is connected to one end of the external battery insertion holder, wherein the other end of the eleventh switch is connected to the first input terminal of the target voltage regulating circuit unit.

19. The emergency power supply for digital door lock according to claim 15, wherein the other end of the external battery insertion holder is connected to the second input end of the latch bolt operating unit.

20. The emergency power supply for digital door lock according to claim 15, when the battery is inserted into the external battery insertion holder, the tenth switch is opened and the eleventh switch is shorted.

* * * * *